US012687098B2

(12) United States Patent (10) Patent No.: US 12,687,098 B2
Steele et al. (45) Date of Patent: Jul. 21, 2026

(54) CYCLONIC SOLIDS REMOVAL UNIT FOR DOWNHOLE OIL-WATER SEPARATION (DOWS)

(71) Applicant: Halliburton Energy Services, Inc., Houston, TX (US)

(72) Inventors: David J. Steele, Carrollton, TX (US); Matthew Bradley Stokes, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/647,393

(22) Filed: Apr. 26, 2024

(65) Prior Publication Data

US 2025/0101849 A1 Mar. 27, 2025

Related U.S. Application Data

(60) Provisional application No. 63/585,583, filed on Sep. 26, 2023.

(51) Int. Cl.
| | |
|---|---|
| *E21B 43/12* | (2006.01) |
| *B01D 17/02* | (2006.01) |
| *B01D 21/26* | (2006.01) |
| *E21B 43/38* | (2006.01) |

(52) U.S. Cl.
CPC ........ *E21B 43/385* (2013.01); *B01D 17/0214* (2013.01); *B01D 17/0217* (2013.01); *B01D 21/267* (2013.01); *E21B 43/128* (2013.01); *B01D 2221/04* (2013.01)

(58) Field of Classification Search
CPC ........ E21B 43/128; E21B 43/35; E21B 43/38; E21B 43/385; B01D 17/0214; B01D 17/0217; B01D 21/267; B01D 2221/04
See application file for complete search history.

(56) References Cited

U.S. PATENT DOCUMENTS

| | | | |
|---|---|---|---|
| 4,771,830 A | 9/1988 | Peate | |
| 5,107,927 A | 4/1992 | Whiteley et al. | |
| 5,165,450 A | 11/1992 | Marrelli et al. | |
| 5,295,537 A | 3/1994 | Trainer | |
| 5,314,018 A | 5/1994 | Cobb | |
| 5,564,509 A | 10/1996 | Dietzen | |

(Continued)

FOREIGN PATENT DOCUMENTS

| | | |
|---|---|---|
| CN | 102235162 | 11/2011 |
| CN | 104302738 | 1/2015 |

(Continued)

OTHER PUBLICATIONS

"PCT Application No. PCT/US2024/026360 International Search Report and Written Opinion", Aug. 19, 2024, 13 pages.

(Continued)

*Primary Examiner* — Matthew R Buck
(74) *Attorney, Agent, or Firm* — DeLizio, Peacock, Lewin & Guerra LLP

(57) ABSTRACT

An apparatus comprises one or more solids separators to be positioned downhole in a well formed in a subsurface formation, wherein each of the one or more solids separators are configured to receive a fluid from the subsurface formation and separate out sediment from the fluid, wherein the sediment is transported after separation to a destination location.

40 Claims, 35 Drawing Sheets

(56) References Cited

U.S. PATENT DOCUMENTS

| | | | |
|---|---|---|---|
| 5,597,042 A | 1/1997 | Tubel et al. | |
| 5,613,242 A | 3/1997 | Oddo | |
| 5,673,752 A | 10/1997 | Scudder et al. | |
| 5,690,708 A | 11/1997 | Danckaarts et al. | |
| 5,711,374 A | 1/1998 | Kjos | |
| 5,762,149 A | 6/1998 | Donovan et al. | |
| 5,837,152 A | 11/1998 | Komistek | |
| 5,996,690 A * | 12/1999 | Shaw | B04C 11/00 |
| | | | 166/250.15 |
| 6,082,452 A | 7/2000 | Shaw et al. | |
| 6,089,317 A | 7/2000 | Shaw | |
| 6,092,599 A | 7/2000 | Berry et al. | |
| 6,131,660 A | 10/2000 | Stuebinger et al. | |
| 6,170,580 B1 | 1/2001 | Reddoch | |
| 6,179,071 B1 | 1/2001 | Dietzen | |
| 6,189,613 B1 * | 2/2001 | Chachula | E21B 43/385 |
| | | | 166/265 |
| 6,213,208 B1 * | 4/2001 | Skilbeck | E21B 43/40 |
| | | | 166/105.1 |
| 6,277,286 B1 * | 8/2001 | S.o slashed.ntvedt | |
| | | | B01D 17/045 |
| | | | 166/267 |
| 6,336,504 B1 | 1/2002 | Alhanati et al. | |
| 6,378,608 B1 | 4/2002 | Nilsen et al. | |
| 6,394,183 B1 * | 5/2002 | Schrenkel | B01D 21/2455 |
| | | | 166/105.4 |
| 6,719,048 B1 * | 4/2004 | Ramos | E21B 43/38 |
| | | | 166/250.15 |
| 6,755,978 B2 | 6/2004 | Oddie et al. | |
| 7,017,663 B2 | 3/2006 | Polderman et al. | |
| 7,971,657 B2 | 7/2011 | Hollier et al. | |
| 8,286,805 B2 | 10/2012 | Hopper | |
| 8,505,627 B2 * | 8/2013 | Cox | E21B 43/385 |
| | | | 166/266 |
| 8,950,510 B2 | 2/2015 | Bender | |
| 9,289,700 B2 | 3/2016 | Andreussi et al. | |
| 9,334,699 B2 | 5/2016 | Bender et al. | |
| 9,359,878 B2 | 6/2016 | Whitney et al. | |
| 9,441,435 B2 | 9/2016 | Leitch | |
| 10,323,494 B2 | 6/2019 | Joshi et al. | |
| 10,344,570 B2 | 7/2019 | Steele et al. | |
| 10,583,373 B2 | 3/2020 | Braaten et al. | |
| 10,626,682 B2 | 4/2020 | Hope et al. | |
| 10,767,477 B1 | 9/2020 | Leeper et al. | |
| 10,844,699 B2 | 11/2020 | Xiao et al. | |
| 11,008,848 B1 | 5/2021 | Webber et al. | |
| 11,103,807 B2 | 8/2021 | Oneto et al. | |
| 11,143,009 B1 | 10/2021 | Novak et al. | |
| 11,173,427 B2 | 11/2021 | Bayati et al. | |
| 11,180,396 B2 | 11/2021 | Andreussi et al. | |
| 11,285,405 B2 | 3/2022 | Johnson | |
| 11,643,916 B2 | 5/2023 | Gonzales et al. | |
| 11,668,166 B2 | 6/2023 | Lopez De Cardenas et al. | |
| 11,708,746 B1 | 7/2023 | Xiao et al. | |
| 11,795,365 B1 | 10/2023 | Nguyen et al. | |
| 11,828,153 B2 | 11/2023 | Moraes et al. | |
| 11,913,322 B1 * | 2/2024 | Aleid | E21B 41/0035 |
| 12,006,816 B2 | 6/2024 | Al-dhafeeri et al. | |
| 12,305,498 B2 | 5/2025 | Fripp et al. | |
| 2002/0059866 A1 | 5/2002 | Grant et al. | |
| 2002/0153326 A1 | 10/2002 | Oddie | |
| 2003/0098799 A1 | 5/2003 | Zimmerman | |
| 2003/0205522 A1 | 11/2003 | Polderman et al. | |
| 2004/0118565 A1 | 6/2004 | Crawford | |
| 2006/0037746 A1 | 2/2006 | Wright et al. | |
| 2009/0242490 A1 | 10/2009 | Hopper | |
| 2010/0300684 A1 | 12/2010 | Kotsonis et al. | |
| 2011/0000675 A1 | 1/2011 | Hackworth et al. | |
| 2011/0079388 A1 | 4/2011 | Cox | |
| 2012/0006543 A1 | 1/2012 | Cox et al. | |
| 2012/0043088 A1 | 2/2012 | Mcallister et al. | |
| 2012/0080186 A1 | 4/2012 | Reed | |
| 2012/0285680 A1 | 11/2012 | Kumar | |
| 2013/0075098 A1 | 3/2013 | Janjua et al. | |

| | | |
|---|---|---|
| 2013/0092382 A1 | 4/2013 | Dykstra et al. |
| 2013/0112598 A1 | 5/2013 | Culver |
| 2013/0292327 A1 | 11/2013 | Andreussi et al. |
| 2013/0312955 A1 | 11/2013 | Medoff |
| 2013/0313200 A1 | 11/2013 | Andreussi et al. |
| 2014/0014358 A1 | 1/2014 | Leitch |
| 2014/0332391 A1 | 11/2014 | Munisteri |
| 2015/0075772 A1 | 3/2015 | Saponja et al. |
| 2015/0152715 A1 | 6/2015 | Cunningham et al. |
| 2015/0306520 A1 | 10/2015 | Grave et al. |
| 2015/0345264 A1 | 12/2015 | Johnson |
| 2016/0047176 A1 | 2/2016 | Martin |
| 2017/0009557 A1 | 1/2017 | Harman et al. |
| 2017/0022797 A1 | 1/2017 | Joshi et al. |
| 2017/0058659 A1 | 3/2017 | El-Bakry et al. |
| 2017/0174530 A1 | 6/2017 | Yin et al. |
| 2017/0234113 A1 | 8/2017 | Steele |
| 2018/0002995 A1 | 1/2018 | Dotson et al. |
| 2018/0051533 A1 | 2/2018 | Zbranek et al. |
| 2018/0100383 A1 | 4/2018 | Saponja et al. |
| 2018/0223642 A1 | 8/2018 | Zahran |
| 2018/0320500 A1 | 11/2018 | Williams |
| 2019/0032465 A1 | 1/2019 | Ayub |
| 2019/0145220 A1 | 5/2019 | Patel et al. |
| 2019/0186222 A1 | 6/2019 | Steele et al. |
| 2019/0203575 A1 | 7/2019 | Schlosser |
| 2019/0316443 A1 | 10/2019 | Haugland |
| 2019/0323331 A1 | 10/2019 | Zahran |
| 2020/0123888 A1 | 4/2020 | Saponja et al. |
| 2020/0215459 A1 | 7/2020 | Oneto et al. |
| 2020/0217187 A1 | 7/2020 | Wang et al. |
| 2020/0378235 A1 | 12/2020 | Gonzales et al. |
| 2021/0055146 A1 | 2/2021 | Bukhamseen et al. |
| 2021/0115771 A1 | 4/2021 | Berntsen et al. |
| 2021/0140297 A1 | 5/2021 | Webber et al. |
| 2021/0332688 A1 | 10/2021 | Donn et al. |
| 2021/0363836 A1 | 11/2021 | Jandhyala et al. |
| 2021/0379511 A1 | 12/2021 | Scott et al. |
| 2022/0034178 A1 | 2/2022 | Hughes |
| 2022/0049581 A1 | 2/2022 | Provost et al. |
| 2022/0056799 A1 | 2/2022 | Johnson et al. |
| 2022/0220838 A1 | 7/2022 | Capela Moraes et al. |
| 2022/0282695 A1 | 9/2022 | Peviani |
| 2023/0109781 A1 | 4/2023 | Alexander et al. |
| 2023/0175364 A1 | 6/2023 | Al-huwaider et al. |
| 2023/0313644 A1 | 10/2023 | Wang et al. |
| 2024/0076953 A1 | 3/2024 | Trifol et al. |
| 2024/0084687 A1 | 3/2024 | Saponja et al. |
| 2025/0067150 A1 | 2/2025 | Shakeel et al. |
| 2025/0067160 A1 | 2/2025 | Shukor et al. |
| 2025/0067164 A1 | 2/2025 | Gupta et al. |
| 2025/0084748 A1 | 3/2025 | Fripp et al. |
| 2025/0101817 A1 | 3/2025 | Steele et al. |
| 2025/0101822 A1 | 3/2025 | Steele et al. |
| 2025/0101823 A1 | 3/2025 | Steele |
| 2025/0101846 A1 | 3/2025 | Steele et al. |
| 2025/0101848 A1 | 3/2025 | Steele et al. |
| 2025/0109674 A1 | 4/2025 | Donovan et al. |
| 2025/0109675 A1 | 4/2025 | Steele et al. |
| 2025/0109676 A1 | 4/2025 | Butler et al. |
| 2025/0154860 A1 | 5/2025 | Steele et al. |

FOREIGN PATENT DOCUMENTS

| | | |
|---|---|---|
| CN | 112240194 | 1/2021 |
| CN | 116733440 | 9/2023 |
| CN | 117552765 | 2/2024 |
| CN | 117569792 | 2/2024 |
| CN | 118057000 | 5/2024 |
| EP | 0977621 | 7/2002 |
| EP | 0948702 | 3/2003 |
| JP | 2002370005 | 12/2002 |
| WO | 1992009379 | 6/1992 |
| WO | 1996004056 | 2/1996 |
| WO | 2004007908 | 1/2004 |
| WO | 2010118351 | 10/2010 |
| WO | 2011119675 | 9/2011 |
| WO | 2014172324 | 10/2014 |
| WO | 2025071675 | 4/2025 |

(56) References Cited

FOREIGN PATENT DOCUMENTS

| | | |
|---|---|---|
| WO | 2025071676 | 4/2025 |
| WO | 2025071677 | 4/2025 |
| WO | 2025071678 | 4/2025 |
| WO | 2025071679 | 4/2025 |
| WO | 2025071680 | 4/2025 |
| WO | 2025071682 | 4/2025 |
| WO | 2025071683 | 4/2025 |
| WO | 2025071684 | 4/2025 |
| WO | 2025106689 | 5/2025 |

OTHER PUBLICATIONS

"PCT Application No. PCT/US2024/026689 International Search Report and Written Opinion", 13 pages.

"PCT Application No. PCT/US2024/026896 International Search Report and Written Opinion", Aug. 19, 2024, 13 pages.

"PCT Application No. PCT/US2024/026900 International Search Report and Written Opinion", Aug. 19, 2024, 12 pages.

"PCT Application No. PCT/US2024/027103 International Search Report and Written Opinion", Aug. 19, 2024, 11 pages.

"PCT Application No. PCT/US2024/027105 International Search Report and Written Opinion", Oct. 10, 2024, 11 pages.

"PCT Application No. PCT/US2024/027565 International Search Report and Written Opinion", Sep. 6, 2024, 14 pages.

"PCT Application No. PCT/US2024/027573 International Search Report and Written Opinion", Sep. 9, 2024, 11 pages.

"PCT Application No. PCT/US24/28078 International Search Report and Written Opinion", Aug. 14, 2024, 9 pages.

"BaraCRI™ Cuttings Reinjection Operations Save More Than US 4 Million on Six-Year Project", Halliburton, www.halliburton.com, 2018, 2 pages.

"BaraCRI™ Cuttings Reinjection System Saves Operator USD 120,000 Per Month", Halliburton, www.halliburton.com, 2018, 2 pages.

"BaraCRI™ Services Help Reduce Environmental Impact in First CRI Application in Ecuador", Halliburton, www.halliburton.com, 2018, 2 pages.

"Cuttings Reinjection Video", SLB; https://www.slb.com/videos/cuttings-reinjection-service, Sep. 8, 2016, 4 pages.

"iWISE: Integrated waste injection services", Mi SWACO: a Schlumberger Company, 2016, 6 pages.

"WHIRLAWAY Gas Handlers", ChampionX Artificial Lift, Nov. 4, 2020, 2 pages.

"Workstring Orientation Tool: Orientation Accuracy in Multilateral Completion Operations", Halliburton Completion Tools, 2020, 2 pages.

Alshmakhy, et al., "Use of Downhole Oil-Water Separation System in Horizontal Wells", 2021 SPE Annual Technical Conference and Exhibition, Sep. 2021, 5 pages.

Catala, "Fluid Flow Fundamentals", Oilfield Review, 1996, 4 pages.

Ezell, et al., "First Successful Field Utilization of Cuttings Re-Injection (CRI) in the Offshore Field of Saudi Arabia as an Environmentally Friendly and Cost Effective Waste Disposal Method", SPE Annual Technical Conference and Exhibition held in Denver, Colorado, USA, Nov. 2011, 14 pages.

Guo, et al., "Increased Assurance of Drill Cuttings Reinjection: Challenges, Recent Advances, and Case Studies", Paper IADC/SPE 87972 presented at the IADC/SPE Asia PacificDrilling Technology Conference and Exhibition, Jun. 2007, 7 pages.

Hagan, et al., "Engineering and Operational Issues Associated with Commingled Drill Cuttings and Produced Water Re-injection Schemes", SPE International Conference on Health, Safety and Environment in Oil and Gas Exploration and Production held in Kuala Lumpur, Malaysia, Mar. 2022, 9 pages.

Hernandez, et al., "Drill Cutting Reinjection Feasibility Study in a Critical Environment, Apaika Field, Ecuador", SPE Latin American and Caribbean Health, Safety, Environment and Sustainability Conference held in Bogotá, Colombia, Jul. 2015, 21 pages.

Kuhnen, et al., "Destabilizing Turbulence in Pipe Flow", Nature Physics vol. 14, 386-390 (2018), 2018, 36 pages.

Kuhnen, et al., "Like Cures Like: How to Destroy Turbulence With Turbulence", APS Physics; YouTube Video https://youtu.be/gZgtT-JxmtM?si=zBHluksDm75LCQuw, Nov. 14, 2017.

Ladmia, et al., "Downhole Oil Water Separation to Handle Produced Water Study Case Onshore & Offshore Fields Abu Dhabi", SPE Annual Technical Conference and Exhibition, Dubai, UAE, Sep. 2021, Sep. 15, 2021.

Marusic, et al., "An Energy-Efficient Pathway To Turbulent Drag Reduction", Nature Communications vol. 12, Article No. 5805 (2021), 2021, 8 pages.

Mccoy, et al., "Evaluation and Performance of Packer-Type Downhole Gas Separators", SPE Production and Operations Symposium, Mar. 2023, 14 pages.

Muktadir, et al., "Review and Applicability of Downhole Separation Technology", 2016, 13 pages.

Poclin, et al., "Commingled Reinjection of Cuttings and Produced Water Provides a Zero-Discharge Solution for the Development Phase of the Pirana Field in the Peruvian Amazon Region", SPE Latin American and Caribbean Petroleum Engineering Conference held in Quito, Ecuador, Nov. 2015, 18 pages.

Samy, "Cutting Re-injection CRI Uncertainty and Risk Assessment", SPE Abu Dhabi International Petroleum Exhibition & Conference to be held in Abu Dhabi, UAE,, Nov. 2021, 15 pages.

Scarselli, et al., "Turbulence Suppression By Cardiac-Cycle-Inspired Driving of Pipe Flow", Nature vol. 621, pp. 71-74 (2023), Sep. 6, 2023.

Schuh, et al., "Case History: Cuttings Reinjection on the MurdochDevelopment Project in the Southern Sector of the North Sea", Paper SPE 26680 presented at The Offshore European Conference held in Aberdeen, 1993, 16 pages.

Yang, et al., "Application of DOWS (Downhole Oil Water Separation) Technology Used in High Water-Cut Oilfield: Case Study", SPE/IATMI Asia Pacific Oil & Gas Conference and Exhibition, Oct. 2015, 8 pages.

Zunce, et al., "Study on the Flow Pattern of Downhole Oil-Water Separator with Different Inlet Patterns", 2009 3rd International Conference on Bioinformatics and Biomedical Engineering, Jun. 2009, 4 pages.

"PCT Application No. PCT/US2024/055948 International Search Report and Written Opinion", Mar. 7, 2025, 13 pages.

"U.S. Appl. No. 18/646,388 Non-Final Office Action", Jan. 30, 2025, 11 pages.

"U.S. Appl. No. 18/647,015 Restriction Requierement", Jan. 22, 2025, 7 pages.

"U.S. Appl. No. 18/647,581 Restriction Requirement", Feb. 5, 2025, 7 pages.

"U.S. Appl. No. 18/656,389 Restriction Requirement", Feb. 5, 2025, 7 pages.

"U.S. Appl. No. 18/647,581 Non-Final Office Action", Apr. 22, 2025, 17 pages.

"U.S. Appl. No. 18/647,015 Non-Final Office Action", Jun. 4, 2025, 19 pages.

"U.S. Appl. No. 18/648,824 Non-Final Office Action", Mar. 27, 2025, 11 pages.

"U.S. Appl. No. 18/649,236 Non-Final Office Action", May 13, 2025, 13 pages.

"U.S. Appl. No. 18/651,918 Non-Final Office Action", Jun. 4, 2025, 15 pages.

"U.S. Appl. No. 18/653,061 Non-Final Office Action", Mar. 18, 2025, 16 pages.

"U.S. Appl. No. 18/656,389 Non-Final Office Action", Apr. 24, 2025, 20 pages.

"U.S. Appl. No. 18/647,015 Final Office Action", Oct. 2, 2025, 24 pages.

"U.S. Appl. No. 18/647,581 Non-Final Office Action", Oct. 28, 2025, 17 pages.

"U.S. Appl. No. 18/649,236 Final Office Action", Sep. 11, 2025, 17 pages.

"U.S. Appl. No. 18/651,918 Final Office Action", Sep. 30, 2025, 23 pages.

(56)     References Cited

OTHER PUBLICATIONS

"U.S. Appl. No. 18/653,061 Final Office Action", Jul. 3, 2025, 20 pages.
"U.S. Appl. No. 18/945,016 Non-Final Office Action", Jul. 22, 2025, 10 pages.
"U.S. Appl. No. 18/653,061 Final Office Action", Feb. 5, 2026, 15 pages.
"U.S. Appl. No. 18/647,015 Final Office Action", Apr. 9, 2026, 8 pages.

* cited by examiner

2500

A

| 2502 | Separate and discharge solids into temporary holding tanks |

| 2504 | Transport solids for disposal |

| 2506 | Transport solids to injector |

| 2508 | Mix solids at injector |

| 2510 | Inject solids/slurry |

| 2512 | Transport of solids-laden fluid |

| 2514 | Monitor and control of injection process |

B

END

CYCLONIC SOLIDS REMOVAL UNIT FOR DOWNHOLE OIL-WATER SEPARATION (DOWS)

BACKGROUND

Oil and gas wells produce significant amounts of water in their lifetime. The percentage of water produced from these wells is called the water cut, the ratio of the water produced from the well compared to the volume of the total liquids produced. Most wells produce an ever-increasing water cut throughout their productive life. In many oil fields around the world the percentage of water recovered with oil has risen to be greater than the percentage of the oil. In fact, in many fields, the percentage of oil has decreased to be from about 20% in an excellent field to about 2% in a relatively poor field.

The end of a well's productive life is often determined by the water cut. A well is typically shut in when the value of the hydrocarbons produced is no longer sufficient to economically cover the operating costs of the well and the cost of disposing of the produced water. Indeed, disposing of the produced water is not environmentally and economically friendly as energy is used to power the pump to lift the produced water to the surface, to separate the produced water from the oil, to transport the separated water as it cannot be disposed on the surface in most cases. Thus, the separated water must be transported to a remote well site to be reinjected into a subterranean formation. Therefore, decreasing the water cut of a well increases the value of the produced fluids and directly decreases the disposal costs of the produced water.

One method of reducing the water cut of a well is to separate produced water from the hydrocarbons downhole, rather than at surface. Downhole separation increases the value of the fluids produced to the surface. Downhole separation also facilitates disposal of the separated water. The separated water can be reinjected into the same production zone or into a different zone. Another way to improve the productivity of a well is to increase the length of the intersection of the productive zone by the well completion. One way of increasing this intersection length is by using multilateral wells. A multilateral well is a conventional well that has a lateral well that is drilled from a point in the original well. The lateral well increases productivity by allowing additional intersection length along the productive zone without the cost and delay involved in redrilling the upper part of the well. While multilaterals enable multiple intersections within the same productive zone, multilaterals also enable fluid communication with different productive zones within a reservoir. In certain reservoirs, operators can leverage this approach to improve reservoir production by accessing numerous production zones or by increasing the contact area between a wellbore and a formation with minimal increase in drilling and completion costs. These techniques also reduce the environmental footprint of drilling rigs and subsequent production trees, particularly for land operations. Therefore, the use of multilateral well increases the potential production of a well and can also enable disposal of the produced water in a different zone.

BRIEF DESCRIPTION OF THE DRAWINGS

Implementations of the disclosure may be better understood by referencing the accompanying drawings.

DESCRIPTION

Figure 1:
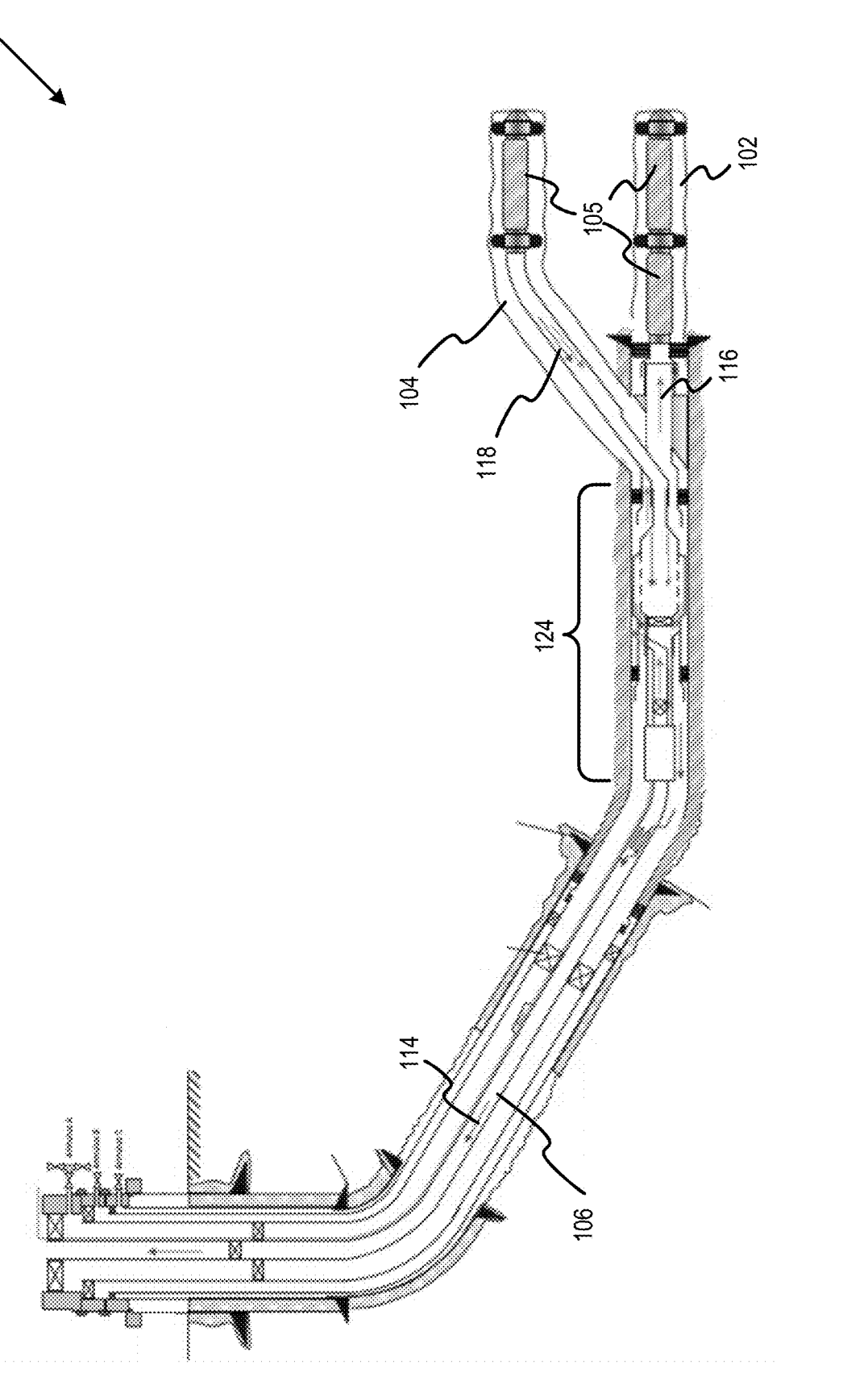
FIG. 1 is a perspective view in partial cross section of a multilateral well system that includes downhole fluid separation, according to some implementations.

The description that follows includes example systems, methods, techniques, and program flows that embody aspects of the disclosure. However, it is understood that this disclosure may be practiced without these specific details. In some instances, well-known instruction instances, protocols, structures, and techniques have not been shown in detail in order not to obfuscate the description.

Some implementations are in reference to a "multilateral well" and "multi-bore well." Such terms may be used interchangeably. In other words, a multilateral well may be defined to include any type of well have more than one bore, wellbore, branch, lateral, etc. For example, a multilateral well may include a main bore with one or more laterals branching therefrom. In another example, a multilateral well may also include any type of multi-bore well configuration with such bores at any angles relative to each other. Additionally, while example implementations may be used in reference to a multilateral or multi-bore well, some implementations may also be used in a single bore well. Also, the terms Downhole Oil-Water Separation (DOWS) System and Downhole Oil-Water-Solids Separation (DOWSS) System herein may be used interchangeably. Moreover, the acronyms DOWS and DOWSS herein may be used interchangeably.

The cyclonic solids separator described herein may be a solids separator (also referenced as a hydrocyclone, helical separator, etc.) installed in hydrocarbon recovery wells. The function of the cyclonic solids separator is to utilize centrifugal movement of fluid and/or solids to separate fluid phases and/or solids from fluid. For example, water may be separated from hydrocarbons, gas may be separated from oil, sediment may be separated from water, sediment may be separated from formation fluid, etc. While described herein as a cyclonic solids separator configured to generate a centrifugal movement in the fluid to separate sediment and/or fluid phases, the cyclonic solids separator described herein may utilize gravity to perform the aforementioned separation. Example implementations may include a wellbore system that includes a downhole fluid separator. For example, the system may be part of a multilateral well completion design that includes a fluid separator system at the junction between the main bore and a lateral well on the upper completion. A fluid separator system may provide separation of different types of fluids. For example, the fluid separator may separate a formation fluid (received from the formation surrounding on the main bore) into production fluid and nonproduction fluid. For instance, the fluid separator may include an oil/water separator and a gas/oil/water separator, oil/water/solids separator, etc. In some implementations, the system may include a pump (such as an electrical submersible pump (ESP), progressive cavity pump (PCP), rod pump, etc.) at the junction to pump the nonproduction fluid (such as water) into the lateral well so that the nonproduction fluid is injected into the subsurface formation surrounding the lateral well. The same or different pump may pump other fluids to other locales such as the surface or other lateral wellbore(s).

Example implementations may also include downhole separation of solids from fluid(s) (formation fluid(s), production fluid(s) and/or nonproduction fluid(s) or any combination thereof)-thereby avoiding injectivity impairment caused by solids plugging. For instance, example implementations may include separation of solids from the nonproduction fluid to minimize or prevent plugging of the subsurface formation surrounding the lateral well where the nonproduction fluid is to be disposed. Solids (e.g., basic sediments, sand, silt, etc.) may be naturally produced with the formation fluids. Separation/removal of solids prior to the fluids passing through pumps and/or other equipment may decrease erosional wear and maintenance (i.e., replacement of ESP pump(s)) costs.

Example implementations may include using one or more cyclonic solids separators to separate solids out of fluid (such as the formation fluid, the production fluid, the nonproduction fluid, etc.). For example, one or more hydrocyclones, helical separators, or a combination thereof may be positioned downhole in a well to separate sediment from fluid. Some implementations may include gathering and removal of the sediment discharged from the cyclonic solids separators and transporting the sediment to a destination location. Examples of such removal and transportation may include circulating the solids to the surface of the multilateral well, transporting the solids to a dump site located elsewhere downhole, injecting, or depositing the solids downhole, or producing the solids at the surface in a control, reliable operation.

In some implementations, product (such as the formation fluid, the production fluid, the nonproduction fluid, etc.) may be input into one or more cyclonic solids separators (such as a hydrocyclone) under a certain pressure. This may create a centrifugal movement, pushing the heavier phase outward and downward alongside the wall of the conical part. The decreasing diameter in the conical part may increase the speed and so enhances the separation. Finally, the concentrated solids may be discharged through the apex. The vortex finder in the overflow part may create a fast rotating upward spiral movement of the fluid in the center of the conically shaped housing. The fluid may be discharged through the overflow outlet. Similarly, a helical separator may be configured with a helical profile to generate the same centrifugal movement in fluid. Thus, sediment may be separated from the fluid. In some implementations, when sediment does not need to be separated from the fluid (such as when the sediment size is too small (e.g., 0.02 mm (20 microns, 0.06 mm (60 microns), or 0.25 mm (250 microns)), the volume of sediment in the fluid is below a threshold (i.e., less than 7% by volume), etc.) the cyclonic solids separators may be utilized to separate the formation fluid into production fluid and nonproduction fluid. In some implementations, the cyclonic solids separators may be utilized to separate out oil from water (such as when emulsion occurs), water from oil in an oil flow path, gas from oil, etc.

Example implementations may be part of a downhole oil-water separation (DOWS) operation that may include one or more cyclonic solids separators to separate, accumulate, transport, and dispose of the solids to a location that will not interfere with the continued operation of the DOWS equipment and other related equipment. For example, some implementations may be applicable to a multilateral downhole oil water separator system.

Additionally, some implementations may include replacing worn parts of the cyclonic solids separators. The worn parts may be retrieved and/or replaced via a deployment mechanism such as wireline, coiled tubing, jointed tubing, etc. For example, the cyclonic solids separator, the solids accumulator, and/or solids mover may be removed from the DOWS while the DOWS remains in the well. In such implementations, there is no need to pull electrical submersible pump (ESP), the ESP wire, etc.

Thus, example implementations may include using one or more cyclonic solids separators to separate solids out of the produced fluid in a downhole environment. Also, example implementations may comprise devices and methods to gather the solids discharge from the hydrocyclone and then remove the solids by one or more methods such as circulating to surface, transporting them to a destination location located elsewhere is the well, injecting or depositing the solids downhole, or producing the solids the surface in a control, reliable fashion. In addition, example implementations may replace worn parts on the cyclonic solids separators with as little as a wireline or coiled tubing trip. Thus, there may be no need to pull components out of the DOWS when replacing worn parts such as the ESP, ESP cable, etc.

Example System

FIG. 1 is a perspective view in partial cross section of a multilateral well system that includes downhole fluid separation, according to some implementations. FIG. 1 depicts a multilateral well that includes a main bore 102 and a lateral bore 104. The main bore 102 may include an open hole horizontal well. The lateral bore 104 may be an open hole inclined well. Screens 105 may be positioned in the main bore 102 and the lateral bore 104. For example, one of the screens 105 may be positioned in the lateral bore 104 at the point where the formation fluid 118 enters the tubing to prevent the larger solids from even entering the tubing. While described as being screens, alternatively or in addition, slotted liners, perforated tubing, etc. may be used to prevent the larger solids from entering the tubing. In some implementations, the screens 105 may prevent larger solids from entering the formation (such as when the formation is being utilized to store non-production fluid).

Figure 2:
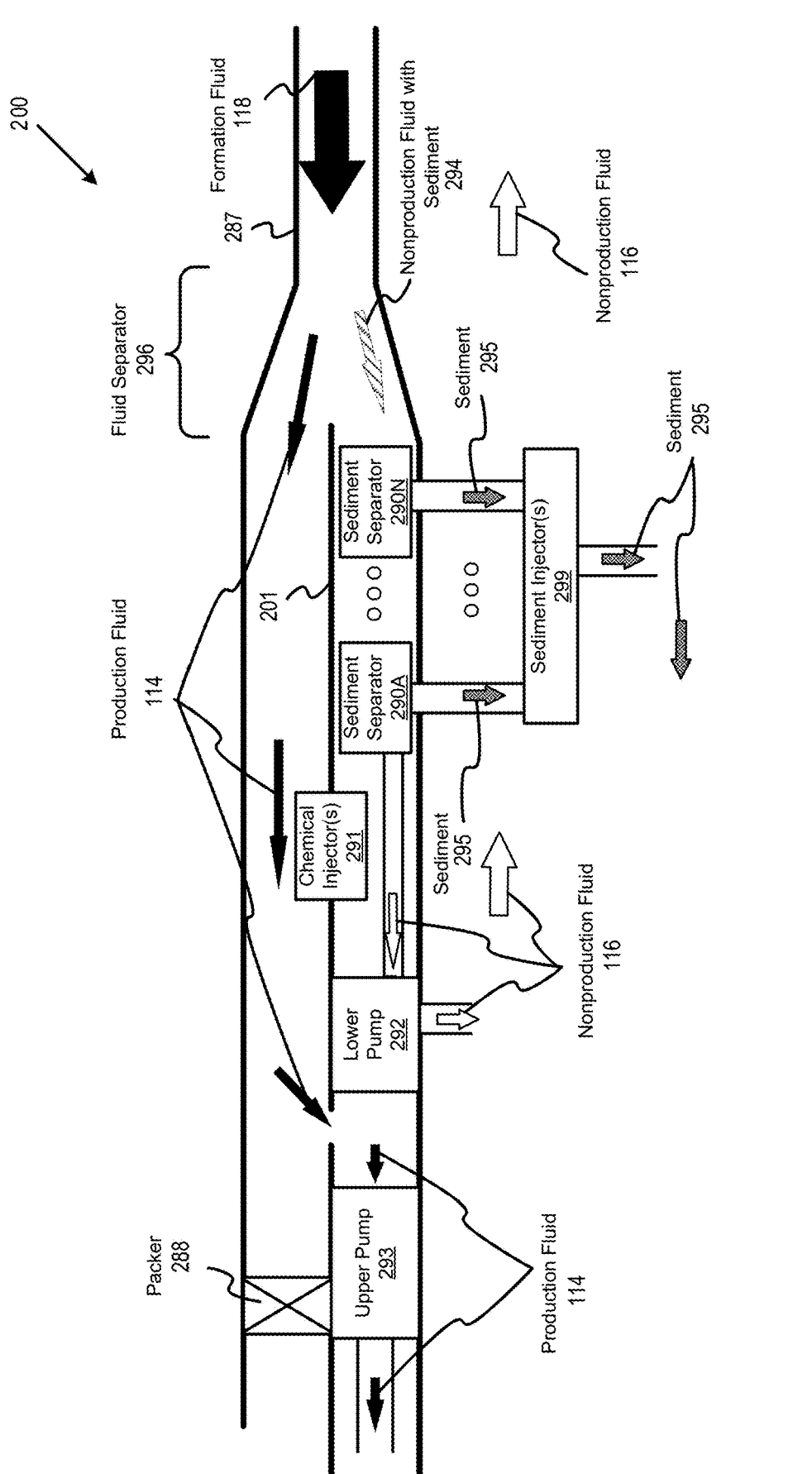
FIG. 2 is side view of an example downhole separation system (including a fluid separator, sediment separator(s), and sediment injector(s)), according to some implementations.

In FIG. 1, a system 100 includes a separation system 124 that may include a combination of separators for both fluid and solids (such as sediment). The separation system 124 may include pumps and sediment injectors. An example of the separation system 124 is depicted in FIG. 2 (which is further described below). A formation fluid 118 from the lateral bore may be drawn into the separation system 124. The separation system 124 may include a fluid separator to separate the formation fluid 118. The fluid separator may separate the formation fluid 118 into a production fluid 114 (such as hydrocarbons (e.g., oil)) and a nonproduction fluid 116 (such as water). The production fluid 114 may be delivered uphole through a production tubing string 106. The nonproduction fluid 116 may be delivered to the main bore 102 for injecting into the surrounding formation. Thus, example implementations may separate the nonproduction fluid downhole such that the nonproduction fluid may be directed back to the formation without any need to pump it back to the surface for separation and any transportation needed for storage. In some implementations, another wellbore may be drilled in the subsurface formation (i.e., a well with a surface location different than the multilateral well), where the nonproduction fluid 116 may be transported to for storage. For example, the nonproduction fluid 116 may be transported to the surface, via the multilateral well depicted in FIG. 1, and transported to another well for storage.

The nonproduction fluid 116 may include sediment. In some implementations, the sediment may be separated out from the nonproduction fluid 116 prior to the nonproduction fluid 116 being injected back a subsurface formation. For example, a cyclonic solids separator may separate the sediment from the nonproduction fluid 116. Therefore, the separation system 124 may also include sediment separator(s) to separate out sediment from the nonproduction fluid 116.

In some implementations, the sediment that has been separated out may be stored downhole (at least temporarily). In some implementations, the sediment may be delivered to the surface of the multilateral well or another downhole location using a flow channel (such as a tubing string). Examples of another downhole location may include a cavern, a disposal wellbore, a thief zone, etc. This flow channel may be the production tubing string 106 used to deliver production fluid to a surface of the multilateral well. In some implementations, this flow channel may be a separate tubing string for delivery of the sediment and/or other fluids to the surface of the multilateral well or to a different downhole location.

In some implementations, the separation system 124 may include sediment injector(s) to receive the sediment separated out by the sediment separator(s). The sediment injector(s) may inject this sediment into the production tubing string 106 (used to deliver the production fluid to a surface of the multilateral well) to deliver this sediment to the surface of the multilateral well. Alternatively, or in addition, the sediment injector(s) may inject this sediment into a separate tubing string to deliver this sediment to the surface of the multilateral well or to a different downhole location.

FIG. 2 is side view of an example downhole separation system (including a fluid separator, sediment separator(s), and sediment injector(s)), according to some implementations. For example, FIG. 2 depicts a separation system 200 that may be an example of the separation system 124 depicted in FIG. 1. The separation system 200 includes a tubing 287 that includes a fluid separator 296, sediment separators 290A-290N, chemical injector(s) 291, a lower pump 292, an upper pump 293, sediment injector(s) 299, a separator 201, a packer 288, and a computer 270. Also, while the separation system 200 is depicted in a given order, example implementations include a separation system with components that are reordered or changed.

The formation fluid 118 flows into the fluid separator 296. In this example, the fluid separator 296 comprises a gravity-based separation that includes the separator 201. As shown, the formation fluid 118 moves from a smaller to a larger diameter of the tubing 287. This may decrease the velocity of the flow of the formation fluid 118—which allows the separation. In particular, most, or at least a majority of the production fluid 114 may separate into a flow above the separator 201, while most or at least a majority of the nonproduction fluid with sediment 294 may separate into a separate flow below the separator 201. This may allow most of the sediment to be captured in the lower portion of the tubing 287 (below the separator 201).

While depicted as having the separator 201, in some implementations, there is no separator 201. Rather, the production fluid 114 and the nonproduction fluid with sediment 294 may naturally separate in a horizontal pipe because of their different density. Accordingly, even in a same tubing without the separator 201, most of the production fluid 114 would be above the nonproduction fluid 116 because of the differences in weight between the two types of fluid.

The nonproduction fluid with sediment 294 flows into the sediment separators 290A-290N, which may represent one to any number and type of separators. For example, the sediment separators 290A-290N may include cyclonic solids separators. In some implementations, each of the sediment separators 290A-290N may separate some of the sediment in the nonproduction fluid with sediment 294. For example, the first sediment separator 290 may be used to separate and collect the largest size (denser) sediment; the second sediment separator 290 may be used to separate and collect the next largest size sediment; the third sediment separator 290 may be used to separate and collect the next largest size sediment; etc. (as the flow moves from right to left through the different sediment separators 290A-290N). For example, at least one of the sediment separators 290 may be a hydrocyclone—wherein larger (denser) particles in the rotating stream have too much inertia to follow the tight curve of the stream. Such particles may thus strike the outside wall and fall to the bottom of the cyclone where they may be removed. In some implementations, each of the sediment separators 290 may store the sediment that was collected into an associated storage area or tank (i.e., a solids accumulator).

In some implementations, the separation system 200 and/or any one or more of the components within the separation system 200 may be oriented with respect to gravity. For example, components such as the fluid separator 296, separator 201, sediment separators 290A-N, etc. may be oriented with respect to gravity such that gravity may assist in separating the phases of the formation fluid 118, sediment 295 from the formation fluid 118, etc.

Additionally, the chemical injector(s) 291 may inject one or more chemicals into at least one of the formation fluid 118, the production fluid 114, the nonproduction fluid with sediment 294, the nonproduction fluid 116, or the sediment 295. While depicted such that chemicals are injected downhole, alternatively or in addition, chemicals may be injected from the surface of the multilateral well. Also, different chemicals may be injected for different purposes. For example, a flocculant or deflocculant may be injected to promote or not promote aggregation or settling of suspended particles in a liquid. Other examples of chemicals being injected may include paraffin, solvents, dispersants, etc. being added to the production fluid 114, a scavenger being added to the production fluid 114 to remove corrosive gases ($H_2S$) therefrom, etc. In particular, crude oils often contain paraffins which precipitate and adhere to the liner, tubing, sucker rods and surface equipment as the temperature of the producing stream decreases in the normal course of flowing, gas lifting or pumping. Heavy paraffin deposits are undesirable because they reduce the effective size of the flow conduits and restrict the production rate from the well. Where severe paraffin deposition occurs, removal of the deposits by mechanical, thermal, or other means is required, resulting in costly down time, and increased operating costs.

In some implementations, these different collections of the sediment by the different sediment separators 290 may be injected into a same or different line or tubing for disposal. As shown, the sediment injector(s) 299 are coupled to receive the sediment collected by the different sediment separators 290.

Periodically, sediment may need to be emptied from the different sediment separators 290 via the sediment injector(s) 299. The decision of when may be based on different criteria. For example, pressure and/or production flow may be monitored at the surface of the multilateral well. If the pressure and/or production flow start to degrade, it may be an indication that sediment needs to be emptied from the sediment separators 290.

In some implementations, sensors may be coupled to each of the tanks of the sediment separators 290. A signal from a given sensor may indicate when the associated sediment separator 290 needs to be emptied. A controller (downhole or at the surface of the multilateral well) may be communicatively coupled to the sensors such that the controller may initiate a sequence to empty one or more of the tanks of the sediment separators 290.

In some implementations, each of the temporary storage tanks (i.e., solids accumulators) for the corresponding sediment separator 290 may be configured with a solid mover, such as an auger. When a sediment separator needs to be emptied, the solids mover may be activated to empty the solids from the solids accumulator.

In some implementations, the sediment injector(s) 299 may dispose of these sediments by injecting them into a tubing for delivery to the surface of the multilateral well. For example, the sediment may be delivered to the surface using the production tubing or a separate tubing. If the production tubing is used, the solids may be included with the production fluid that is being delivered to the surface. In such implementations, separation operations may be performed at the surface to separate out the solids from the production fluid 114.

Accordingly, if sediment is included with the production fluid 114 being delivered to the surface, the production fluid 114 may be delivered to surface equipment that provides for separation of the sediment. Alternatively, during the time when the sediment is not being included with the production fluid 114, the production fluid 114 may be delivered to different surface equipment that does not include such separation of sediment.

Alternatively, or in addition, the sediment injectors 299 may deliver the sediment to a different downhole location (such as a different lateral well, a thief zone (having a high porosity, high permeability downhole zone that may include a low pressure), etc.). In some implementations, sediment may be disposed to different locations depending on their size. For example, for sediment having a size greater than X, such solids may be delivered to the surface of the multilateral well for disposal. For sediment having a size less than X but greater than Y, such sediment may be disposed in a first downhole location (such as a thief zone). For the remaining sediment that have a size less than Y, such solids may be disposed in a second downhole location (such as a lateral well).

Accordingly, example implementations may detect the accumulation of solids in DOWS equipment. An operator (or other device) may be signaled that the solids should be removed. In response, an operational change in the DOWS equipment may be initiated to allow solids removal. For example, this may include shut down or reduction of DOWS-related operations (decrease or shut down pumps, switch valves that direct fluids to the surface and/or other location, etc.). Preparation of the solid's removal process may be initiated. For example, access sleeves and flushing ports may be opened, solids directional control equipment may be adjusted (e.g., change position), injection devices, sleeves, ports, valves, etc. may be closed, solids processing/removal equipment (from surface and/or downhole) may be deployed, etc. Additionally, flushing, dislodging, scrapping, chemically treating, fluidically treating, mechanically treating, etc. of downhole solids from one or more locations downhole may be enabled. Solids and related debris from the DOWS system (DOWSS) may be displaced. In some implementations, solids and other materials may be collected from the DOWSS. The solids and other materials may be transported from the DOWSS. Fluids, chemicals, solvents, acids, liquids, abrasive media, solids and other materials may be transported from the surface to the DOWSS.

Items such as water, chemicals and other items listed above may be transported in a controlled manner. For example, the transporting in a controlled manner may be based on speed, velocity, volumes, ratios, time-based (e.g., until a certain amount of time has passed), function-based (e.g., until a certain pressure-drop is experienced, until fluid has been circulated "bottoms up", etc.). For example, the transporting in a controlled manner may be based on when Z number of tubing strings of fluid has been pumped or until X-amount (e.g., pounds, mass, volume, etc.) of debris has been recovered, collected, injected, disposed, transferred, etc. Tools, devices, flow, etc. may be moved, shifted, directed, etc. to improve the solids collecting, removal, retaining, and flushing process(es). For example, a direction of a jetting nozzle may be changed, one flushing port may be closed while opening another, etc. Tools, devices, components, strings, etc. may be repositioned from one location to another to continue the one-or-more above processes. Additionally, tools, devices, components, strings, etc. may be repositioned to dispose of solids in a preferred location.

One or more fluids, chemicals, solvents, acids, liquids, abrasive media, solids and other materials may be moved from the surface of the well to the DOWSS to enhance the longevity of the DOWSS. This may include applying and/or re-applying friction reducing coatings, replacing components-filters, stators, pumps, rotors, bearings, bearing assemblies, worn parts, eroded parts, electrical components, sensors, computers, controllers, logic devices, parts intend to be consumed including wear pads, erosion pads, corrosion pads, filters, screens, etc.

Also, the shutting down of the solid's removal process may be initiated. For example, access sleeves and flushing ports may be closed, solids directional control equipment may be adjusted. Injection devices, sleeves, ports, valves, etc. may be opened. Solids processing and removal equipment may be retrieved (from the surface and/or other location downhole. Used or worn devices from well may be retrieved. Such devices may include filters, stators, pumps, rotors, bearings, bearing assemblies, worn parts, eroded parts, electrical components, sensors, computers, controllers, logic devices, parts intend to be consumed including wear pads, erosion pads, corrosion pads, filters, screens, etc.

An operational change in the DOWS equipment may be initiated to allow fluid separation again. This may include "turning on" or increase of DOWSS-related operations (e.g., increase or turn-on pumps, switch valves that direct fluids to the surface and/or downhole, etc.). Also, the operator (or other device) may be signaled that the DOWSS equipment has been re-configured out of the solids-removal status and is ready to begin fluid separation operations. The DOWS may then return back to fluids separation mode. Additionally, there may be provided a continuous or occasional status check of the "health" of DOWS equipment.

It should be noted that the DOWS system and components noted may be inclusive of items from the wellhead to the toe of each wellbore and more. The cables and/or energy conduits that provide power to the one or more ESPs and/or other pumps and prime movers (downhole and on surface) may be inclusive. The surface components that transport the fluids and solids (everything) out of the well may be included. Subsea trees, subsea DOWS equipment, platform, land-base, jack up, drillship, etc. types of equipment may be inclusive. Data lines, data processing, sensors, in the well and outside of the well may be inclusive. Fluid processing equipment and processes in the well and outside of the well may be inclusive. Solids processing equipment and processes in the well and outside of the well may be inclusive.

Example implementations may be applied to other types of remote operations where the tools, operations, processes are separated from the operators by distances, barriers, adverse environments, etc. The ability to remotely test to determine or verify whether functions were performed successfully and then communicate or report the tests results to a locale inhabitable by humans (e.g. the earth's surface) makes example implementations suitable for use in other remote locations with harsh environments such as outer space (e.g., satellites, spacecrafts, etc.), aeronautics (aircrafts, drones), on-ground (swamps, marshes, power generation, hydrogen or other gas extraction and/or transportation, etc.), below ground (mines, caves, etc.), ocean (on surface and subsea), subterranean (mineral extraction, storage wells (carbon sequestration, carbon capture and storage (CCS), etc.)), and other energy recovery activities (geothermal, steam, etc.). The unhabitable environments may comprise corrosive fluids (hydrocarbons, H2S fluids, C02 fluids, acids, bases, gases, etc.), contaminants (sand, debris, paraffins, asphaltenes, etc.), high-temperature fluids (fluids from geothermal formations, injected fluids, etc.), cryogenic fluids, etc. Example implementations may be utilized in harsh conditions (e.g., corrosive environments or contaminated fluids), extreme pressures (e.g., >5,000-psi differential), extreme temperatures (e.g., >−20° F. or >300° F.), etc. In other instances, well-known instruction instances, protocols, structures, and techniques have not been shown in detail to avoid confusion.

Thus, in some implementations, the separators, pumps, and injectors may be installed at the junction between the main bore and the lateral bore. In other implementations, such devices may be installed below this junction or above this junction. Further, the main bore or one or more lateral bores may include one or more orientation devices which provides depth and orientation control. While example implementations include a given gravity-type separator, other types of separators may be used. For example, other gravity-type separators (e.g., fluid separators) and other non-gravity separators may be used.

Example implementations may include weir skimmers that function by allowing the oil floating on the surface of the water to flow over a weir. In some implementations, the weir skimmers may require the weir height to be manually adjusted. Alternatively, the weir skimmers may be such that the weir height is automatic or self-adjusting. While manually adjusted weir skimmer types may have a lower initial cost, the requirement for regular manual adjustment makes self-adjusting weir types more popular in most applications. Weir skimmers may collect water if operating when oil is no longer present. To overcome this limitation, the weir type skimmers may include an automatic water drain on the oil collection tank.

Some implementations are in reference to a "multilateral well." A multilateral well may be defined to include any type of well that has more than one bore, wellbore, branch, lateral, etc. For example, a multilateral well may include a main bore with one or more laterals branching therefrom. In another example, a multilateral well may also include any type of multi-bore well configuration with such bores at any angles relative to each other.

In some implementations, the separation system 200 may be installed at the junction between the main bore and the lateral bore. In other implementations, such devices may be installed below this junction or above this junction. Further, the main bore or one or more lateral bores may include one or more orientation devices which provides depth and orientation control. While example implementations include a given gravity-type separator, other types of separators may be used. For example, other gravity-type separators (e.g., FluidSep) and other non-gravity separators may be used.

The multilateral junction may be placed above or inside the target formation. In some implementations, this configuration may be accomplished in a two-trip multilateral completion that includes a lower completion with orientation liner hanger connected to additional lower completion, and an upper completion that includes the fluid separator, an electrical submersible pump, and an upper packer. This simplifies the installation. This reduced complexity allows the fluid separator to be installed into existing wells, i.e., retrofitting existing wells. Further, the lateral bore 104 may be a target formation. In this implementation, the main bore 102 passes through a target production formation and the lateral bore 104 passes through a target injection formation which is a separate formation from the production formation. The existing wells do not require a tangent section at the junction for the placement of the fluid separator, significantly increasing the number of oil well candidates for installation of the fluid separator according to example implementations.

Example implementations may be used in non-horizontal applications (inclined wells, extended reach wells, slant hole wells, vertical wells, S-wells, or combination thereof, etc.). In some applications, such as inclined wells, a flow diverter may be used in conjunction with other devices. The other devices may be one or more destabilizers, a gravitational separator, a non-gravitational separator, a combination of both gravitational and non-gravitational, a coalescing device, a cleaning device, another flow diverting device, a leveling device, an inclination device to monitor, sense, adjust, change the inclination of one or more devices with respect to gravity and/or the inclination of the well, an orientation device to monitor, sense, adjust, change the orientation and/or azimuthal position of one or more devices, systems etc. One or more orientation devices (powered and non-powered) may be used. Example implementations may include cartridges.

The design of the installed completion equipment may be critical for the downhole fluid separator to function as intended. By installing the fluid separators, pumps, and sediment injector in the main bore at or near the junction between the main bore 102 and the lateral bore 104, an existing watered out well may be re-entered. This decreases the overall cost involved in installing the separators, pumps, and sediment injector according to example implementations as compared with installing it at the completion of the well at the beginning of the life of the well. It also decreases the risks associated with installing these devices according to example implementations in existing wells that may be poor producers and represent a smaller cost if the well is lost during the trial as compared with selecting a potential well before well completion is finished. Using these separators and injectors in a downhole setting combined with a multilateral junction may provide efficiency gains.

This includes converting poor performing wells, wherein the percentage of oil has decreased to about 2% for example, into a downhole water injector combined with a better producing well. Additional benefits include lower flow rate and pressure rating requirements, a lighter fluid column, and increased recovery. Example implementations may be particularly useful in low flow rate wells (in the 200 barrel per day range or less), which tend to be shallow, and relatively inexpensive to drill. Moderate flow rate wells, for example 500-5000 barrels of fluid per day, may also be potential candidates for incorporating example implementations. Finally, it will also be useful for most multilaterals with very high flow rate wells, up to 50,000 barrels of fluid per day, for example.

Example implementations reference a production tubing string 106 for the delivery of fluids, sediment, etc. to the surface of the multilateral well or other downhole location. However, example implementations may use any type of flow channel, conduit, etc. for such delivery. For example, the sediment flow channel may be the annular space around the production tubing string 106. Additionally, while depicting the separation being performed uphole relative to the junction between the main bore 102 and the lateral bore 104, example implementations may position the separation at any other location downhole. For instance, the separation may be performed at the junction, below the junction, etc.

The DOWSS may include flow inlet devices, oil-separation devices, water-separation devices, self-deprecation devices, flow outlet devices, flow outlet conduits (tubing, screens, y's, tees, splitters, etc.), fluid transport devices, fluid screening devices, formation support devices (liners, casings, screens, injection ports, and valves (including Outflow Control Devices (including automatic, chokes, restrictors, regulating, etc.). The outflow control devices may comprise one or more features similar to inflow control devices such Inflow Control Devices (ICD's), Automatic Inflow Control Devices (AICD's), Gravity-based ICD's, AIDC's, etc., Viscous-based ICD's, AIDC's, etc., Inertial-based ICD's, AIDC's, etc., pumps, regulators, sensors, controllers, relays, transmitters, floats, etc.

Examples implementations may include an injecting-while-producing system—wherein one pump may be used to force fluid into one formation and a second pump may be used to produce fluid from a second zone. This single-bore water-flood solution maintains downhole pressure to reduce cycling and recover more oil in struggling wells. The injecting-while-producing system may inject from an upper zone and produce from the lower with the aid of isolation packers, or it can inject in the bottom zone and produce from a zone higher in the well.

Example Fluid Separator

In horizontal wells, the fluids may separate into at least two different immiscible phases with a mixing layer in between leads to what is called a flow structure. To illustrate, FIGS. 3A-3C are side views of a two-layer flow structure in a horizontal wellbore that includes water and oil immiscible layers at total flow rates of 600, 1500, and 6000 Barrels Per Day (B/D), respectively, according to some implementations.

Figure 3:
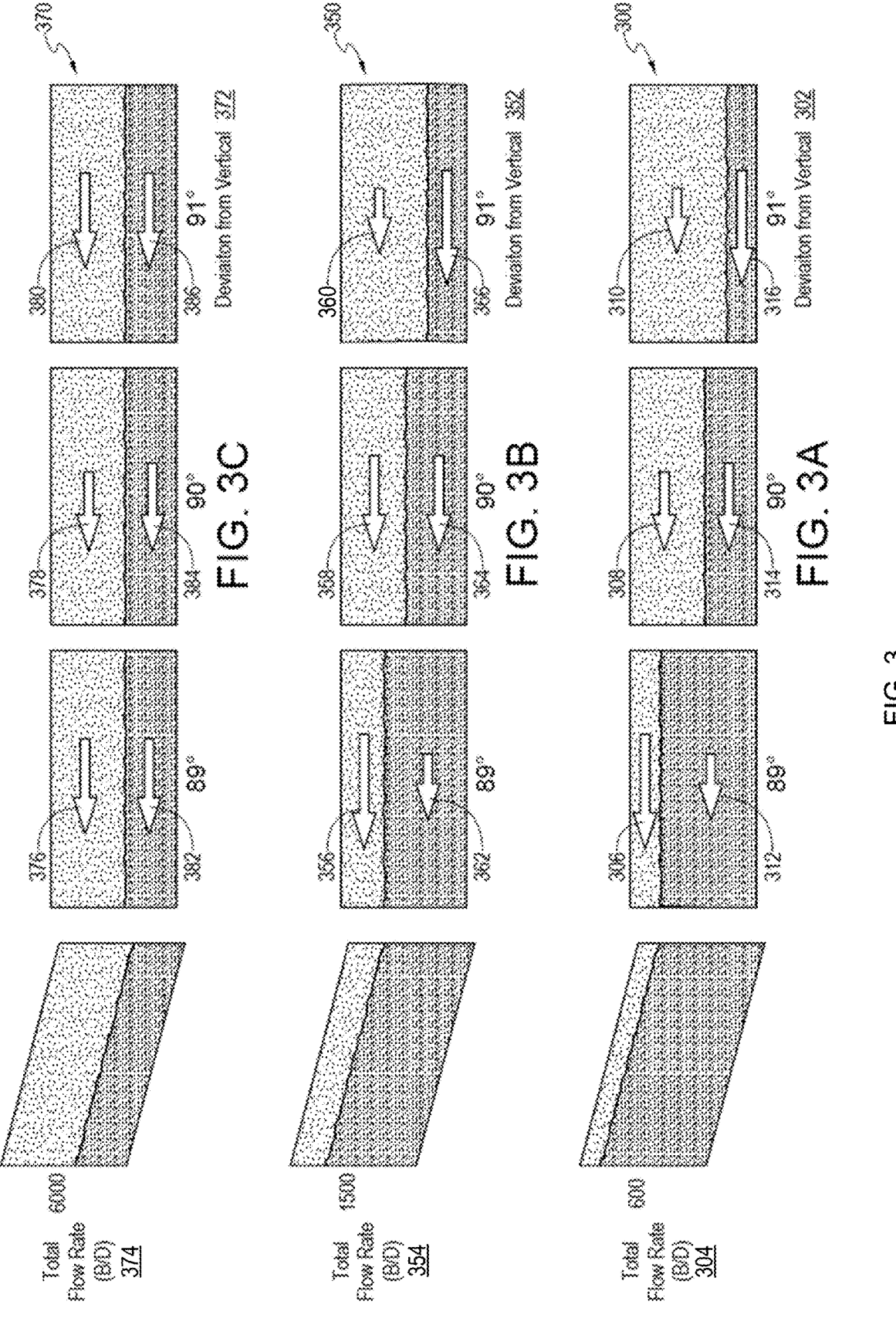
FIGS. 3A-3C are side views of a two-layer flow structure in a horizontal wellbore that includes water and oil immiscible layers at total flow rates of 600, 1500, and 6000 Barrels Per Day (B/D), respectively, according to some implementations.

FIG. 3A includes a pictorial graph 300 having a horizontal axis 302 that is a deviation from vertical and a vertical axis 304 that is the total flow rate. FIG. 3A depicts three example two-layer flow structures for a total flow rate of 600 B/D. A first example two-layer flow structure of FIG. 3A includes a production fluid 306 and a nonproduction fluid 312 at an angle of 89 degrees. A second example two-layer flow structure of FIG. 3A includes a production fluid 308 and a nonproduction fluid 314 at an angle of 90 degrees. A third example two layer flow structure of FIG. 3A includes a production fluid 310 and a nonproduction fluid 316 at an angle of 91 degrees.

As shown in FIG. 3A with the wellbore inclined at 89-degrees, the oil, which is lighter than the water, accelerates under the action of the buoyancy forces. As a consequence, the water velocity decreases (see the nonproduction fluid 312) and the interface level rises between the nonproduction fluid 312 and the production fluid 306. In this case, the water holdup is high. The effect is large, even at 89°, because the longitudinal buoyancy forces are already large compared to the frictional shearing forces. Here the water is flowing uphill, and therefore flows more slowly than the lighter oil. In some implementations, the leveling system (as described herein) may be adjusted to cause the phenomena described above (or prevent related phenomena). Alternatively, or in addition, the flow dividers may be controlled to create the phenomena too (or prevent related phenomena). Alternatively, or in addition, the leveler and/or the flow dividers may be used (or controlled) to reduce or prevent these phenomena.

Also, as shown in FIG. 3A with the wellbore inclined at 91-degrees, the water flows downhill much faster (see the nonproduction fluid 316) than the oil (see the production fluid 310) because its density is higher. The oil-water interface level drops, and the water holdup is low. At high flow rates, the dependence on borehole deviation is smaller because the increasing shear frictional forces against the wall and interface dominate. Under high flow-rate conditions, the position of the interface, and therefore average water holdup, is not as dependent on borehole deviation as is the case in lower rates of flow.

FIG. 3B includes a pictorial graph 350 having a horizontal axis 352 that is a deviation from vertical and a vertical axis 354 that is the total flow rate. FIG. 3B depicts three example two-layer flow structures for a total flow rate of 1500 B/D. A first example two-layer flow structure of FIG. 3B includes a production fluid 356 and a nonproduction fluid 362 at an angle of 89 degrees. A second example two-layer flow structure of FIG. 3B includes a production fluid 358 and a nonproduction fluid 364 at an angle of 90 degrees. A third example two-layer flow structure of FIG. 3B includes a production fluid 360 and a nonproduction fluid 366 at an angle of 91 degrees.

FIG. 3C includes a pictorial graph 370 having a horizontal axis 372 that is a deviation from vertical and a vertical axis 374 that is the total flow rate. FIG. 3C depicts three example two-layer flow structures for a total flow rate of 6000 B/D. A first example two-layer flow structure of FIG. 3C includes a production fluid 376 and a nonproduction fluid 382 at an angle of 89 degrees. A second example two-layer flow structure of FIG. 3C includes a production fluid 378 and a nonproduction fluid 384 at an angle of 90 degrees. A third example two-layer flow structure of FIG. 3C includes a production fluid 380 and a nonproduction fluid 386 at an angle of 91 degrees.

Example implementations may address the problem of efficiently separating the water from the oil downhole. By taking advantage of the two-layer flow structure, most of the separation process may be handled by taking advantage of the naturally occurring two-layer flow structure shown in FIGS. 3A-3C.

Figures 4A, 4B:
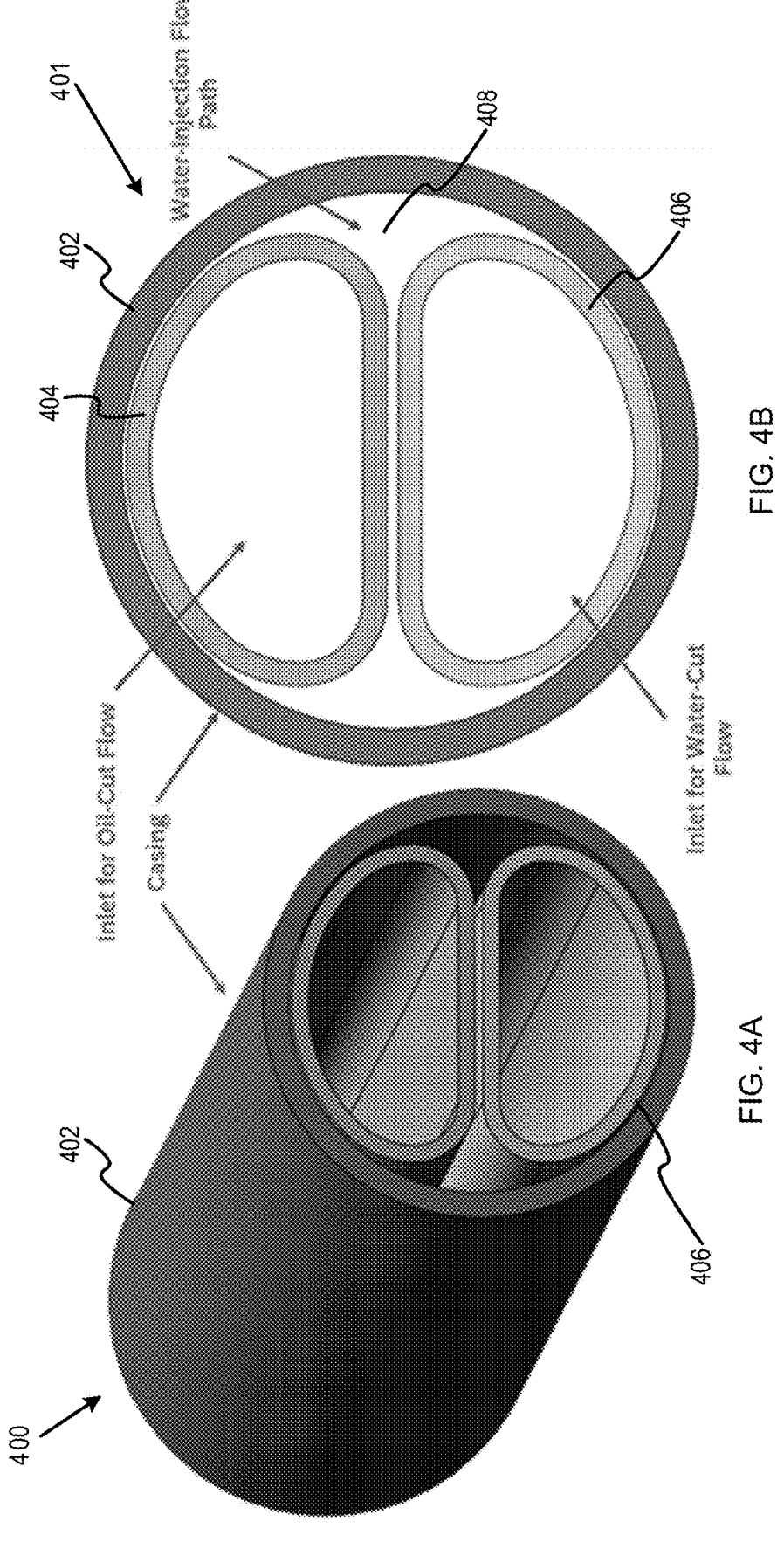
FIGS. 4A-4B are partial cross sectional views of a separated flow path, according to some implementations.

To help illustrate, FIGS. 4A-4B are partial cross sectional views of a separated flow path, according to some implementations. In particular, FIGS. 4A-4B include a fluid separator 400 configured to separate fluids, such as production fluid and nonproduction fluid, by taking advantage of the two layered flow structure (as described in FIGS. 3A-3C). When oil (production fluid) may be separated from water (nonproduction fluid), the oil may travel in an oil inlet 404 positioned in a casing 402. Likewise, the water may travel in the water inlet 406 positioned in the casing 402. In some implementations, the water may flow back through the water injection-injection flow path, where it may be ultimately injected into the subsurface formation surrounding a wellbore, transported to the surface for disposal, etc. The fluid separator 400 may be components of the separator system 200 described in FIG. 2, such as the separator 201. In some implementations, the fluid separator 400 may include one or more components to assist in channeling the production fluid and nonproduction fluid into their respective inlets. For example, the fluid separator 400 may include a diverter arm, a float, and/or a diverter fin configured to divert production fluid to the oil inlet 404 and nonproduction into the water inlet 406.

Example Hydrocyclone Separator

Figure 5:
FIG. 5 is a cross sectional side view of a hydrocyclone according to some implementations.
Figure 5:
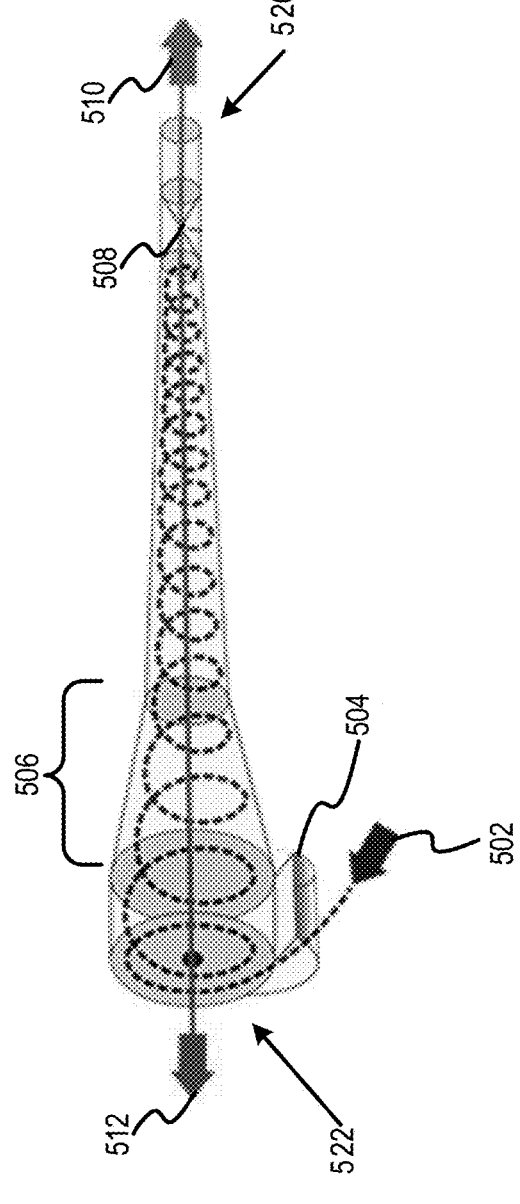

FIG. 5 is a cross sectional side view of a hydrocyclone according to some implementations. In particular, FIG. 5 depicts a hydrocyclone 500 configured to separate sediment from the fluid 502. The hydrocyclone 500 may be implemented into the separation system 124 of FIG. 1 or the sediment separator 290 of FIG. 2. The fluid 502 may enter the hydrocyclone 500 via an inlet 504. In some implementations, the fluid 502 may include nonproduction fluid, production fluid, or a combination of the like in addition to sediment. The inlet 504 may be tangential to the body of the hydrocyclone 500 such that the velocity of the fluid 502 may converted to tangential velocity, imparting a centripetal force on the fluid 502. In some implementations, there may be more than one inlet 504. The configuration of the hydrocyclone 500 and the position of the inlet 504 may cause the fluid 502 to flow in a helical path, generating a centrifugal movement of the fluid 502. In implementations with multiple inlets 504, the hydrocyclone 500 may include multiple helical flow paths, each corresponding to an inlet 504, thus increasing the tangential velocity. The centrifugal movement of the fluid 502 may push the heavier phases (such as sediment, water, etc.) outward toward the outer wall of the hydrocyclone 500 and downward (towards the apex 520). The lighter phases (hydrocarbons, silt, etc.) may migrate towards the center of the hydrocyclone 500. As the fluid 502 continues towards the distal end in a helical path, the fluid enters the reducing section 506. The reducing section 506 (i.e., where the internal diameter decreases) may cause the tangential velocity to increase, thus increasing the centripetal force on the fluid 502 and enhancing the separation of the heavier phased from the lighter phases. In some implementations, the sediments in the rotating stream of fluid 502 may have too much inertia to follow the tight curve of the stream. Such sediment may thus strike the outside wall and fall to the bottom of the hydrocyclone 500. The conical shape of the reducing section 506 may create a rotating upward (i.e., towards the apex 522) movement, which may then discharge the lighter phases from the hydrocyclone as overflow 512.

In some implementations, the hydrocyclone 500 may be oriented with respect to gravity. For example, the hydrocyclone 500 may be oriented to allow gravity to assist in the separation of sediment and phases. The bottom of the hydrocyclone 500 may be where the sediment may fall when separated from the fluid (due to gravity). Accordingly, the lighter phases may be discharged at the top (i.e., away from gravity) of the hydrocyclone 500, thus allowing gravity to assist in the separation.

The heavier phases (i.e., sediment concentration 510 that has been separated from the fluid 502) may continue in the direction of the apex 520 and be discharged from the hydrocyclone 500. Thus, the sediment may be separated from the fluid. In some implementations, a backpressure device 508 may be positioned proximate the apex 520 to control the pressure in the hydrocyclone 500. In some implementations, the one or more pressure sensors may be positioned proximate to and/or in place of the backpressure device 508 to measure parameters of the fluid/sediment exiting the hydrocyclone 500 via the apex 520, such as pressure, flow rate, etc. Measurements obtained by the one or more sensors may be utilized to adjust parameters such as pump rates to control flow rate through the cyclone, adjust the backpressure device 508, etc. In some implementations, measurements obtained by the one or more sensors may be utilized to monitor the condition of the hydrocyclone 500 and ultimately provide necessary actions to maintain efficient operations of the hydrocyclone 500.

In some implementations, most (such as greater than 50%) and/or all of the fluid may exit the hydrocyclone 500 through the apex 522 as overflow, and the sediment may exit the hydrocyclone 500 via the apex 520. For example, if nonproduction fluid enters the hydrocyclone 500 via the inlet 504, a portion of the nonproduction fluid may exit the apex 520 with the sediment concentration 510, and the rest may exit the hydrocyclone as overflow 512. In some implementations, at least a portion of the overflow 512 may be recirculated back into the fluid 502 if/when there is not enough formation fluid to provide the tangential velocity required for the hydrocyclone 500 to function.

Figure 6:
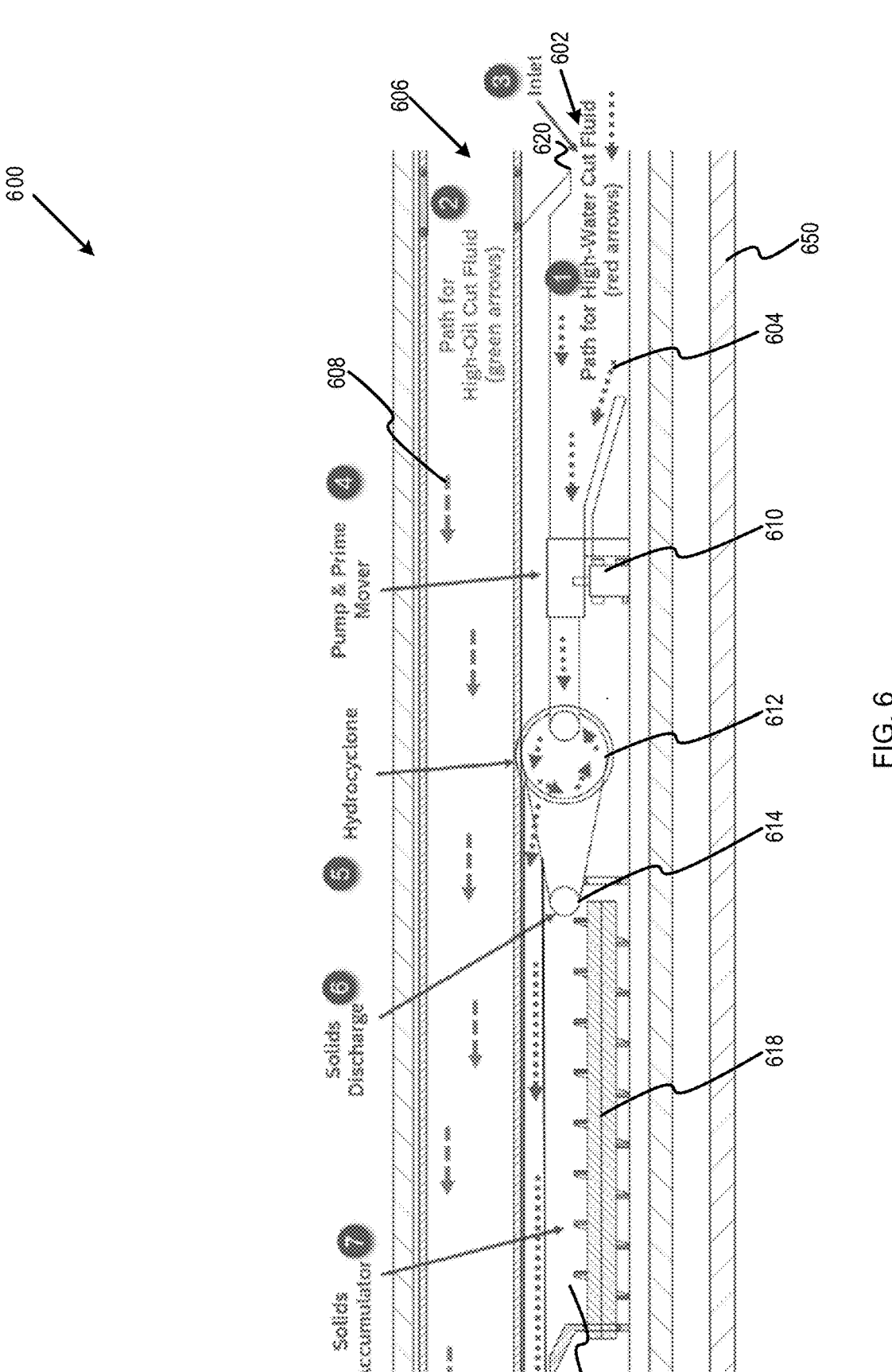
FIG. 6 is a partial cross sectional side view of an example separator system configured with a hydrocyclone, according to some implementations.

FIG. 6 is a partial cross sectional side view of an example separator system configured with a hydrocyclone, according to some implementations. In particular, FIG. 6 depicts a separator system 600 that may be representative of one of the separation system 200 of FIG. 2. The separator system 600 may include a casing 650 where components of the separator system 600 may be positioned.

As shown in FIGS. 3A-3C, the flows of FIG. 6 may be separated so that high-oil cut fluid 608 may be collected at the top and channeled through the upper flow path 606. The high-water cut fluid 604 may be channeled through the lower flow path 602. A hydrocyclone 612 may be positioned in the lower flow path 602 to separate sediment from the high-water cut fluid 604. In some implementations, the hydrocyclone 612 may be a desander (its geometry, flow regime, etc. may be designed to remove "sand" particles). Other geometries, etc. can be used to remove silt-sized particles; such a device is called a desilter. Other implementations may be implemented as well. For example, a centrifuge, such as a mud-centrifuge used on a drilling rig may be implemented.

Fluid may enter the hydrocyclone 612 via the intel 620. A pump 610 may be positioned downstream of the inlet 620 to increase the flow rate of the fluid so cyclone-type flow properties may be used. The pump 610 may be a centrifugal pump and the prime mover may be a hydraulic pump. The hydraulic pump may receive hydraulic fluid under pressure from a remote source such as from a downhole electric motor. That motor may be the same motor used to power an Electrical Submersible Pump (ESP). The prime mover may be its own electric motor.

The pump may discharge the high-water cut fluid 604 into the hydrocyclone 612. The hydrocyclone 612 may be sized/configured to remove a certain type of solid. For example, the hydrocyclone 612 may be configured to remove solids with a diameter, density, etc. above a certain threshold. In some implementations, the heavier/larger sized solids may be separated out first by the hydrocyclone 612. The discharge from the hydrocyclone 612 may then feed into another hydrocyclone to remover smaller size particles (such as silt-sized). In some implementations, the de-silted fluid may continue to another solids removal piece of equipment which may be another cyclone-type piece of equipment or another type of equipment such as a filter, coalescer, or other device.

The sediment may be discharged from the hydrocyclone 612 via the solids discharge outlet 614. The high-water cut fluid 604 may be discharged from the hydrocyclone 612 as overflow to be disposed of in another location (e.g., injected back into a subsurface formation, transported to surface, etc.). The sediment may be discharged into a solids accumulator 616. In some implementations, the solids accumulator 616 may temporarily store the sediment. The solids accumulator 616 may have one or more solids movers 618 to help distribute the solids, flush the solids, weigh, unload, transport, etc. For example, the solids mover 618 may transport the sediment to a sediment injector (such as the sediment injector 299 of FIG. 2) for disposal of the sediment to its destination location.

In some implementations, the hydrocyclone 612, solids accumulator 616, and/or solids mover 618 may be configured with one or more sensors to detect the accumulation of solids, oil, water, and other items (weight, volume, size, etc.). Moreover, the one or more sensors may detect the performance of hydrocyclone 612 in the accumulation and processing of solids, oil, water, and other items. The one or more sensors may communicate to an operator (or other device) that the solids must be removed from the solids accumulator 616, enable flushing/dislodging/scrapping/chemically treating/fluidically treating/mechanically treating, etc. of the hydrocyclone 612 and its byproducts (solids and fluids) from one or more separator systems 600.

In some implementations, the start and operation of the system may be monitored to determine sufficient sediment separation. Parameters, such as pressure, flow rate, etc., may be measured and adjusted to ensure sufficient sediment separation may occur. For example, one or more sensors may detect sediment concentration in water downstream of the separator system 600. Accordingly, one or more parameters such as pressure, choke size, etc. may be adjusted until sediment concentration is below a threshold. In some implementations, the separator system 600 may be sidetracked, shut down, switched to a safe mode function, etc. based on measurements of the separator system such as pressure, flow rate, sediment concentration, etc. at various points in the separator system 600.

In some implementations, a controller/computer 270 (downhole and/or at the surface of the well) may be communicatively coupled to a hydrocyclone 612, solids accumulator 616, and/or solids mover 618 and other components (e.g., actuators, speed controllers, etc.) such that the computer 270 may initiate one or more sequences to adjust, diagnose, test, repair, maintain, etc. one or more of a hydrocyclone 612, solids accumulator 616, and/or solids mover 618 or related assemblies and/or components.

In some implementations, computer 270 is communicatively coupled to system 100, separation system 124, separation system 200, separator system 600 and/or one or more components of the systems 100, 124, 200, 600, etc.

For one example, computer 270 may control one or more parameters of solids accumulator 616 and/or solids mover 618 in order to increase the life of the separator system 600. In other words, the solids mover 618, its components, separation system 600, its components, and system 100 will operate longer and more efficiently by specifically having the computer 270 monitoring, controlling, diagnosing, and maintaining solids mover 618 and/or solids accumulator 616.

Continuing with this example of solids mover 618, computer 270 may address one or more specific conditions or problems with solids mover 618. For example, computer 270 may monitor the sediment load in solids mover 618. If the electrical power demand is too high. The computer 270 may send a signal to solids mover 618 to reduce the speed of the auger. Computer 270 will continue to monitor the load on solids mover 618.

Continuing with the above example, if the electrical power demand is low, it may mean the sediment separating process can be increased.

In this case of the electrical power demand is too high, the computer 270 can perform one or more of the following within a short amount of time (e.g., microseconds, milliseconds, seconds, etc.):

1. instantaneously detect the increase in the electrical power demand of the solid mover 618,
2. adjust the auger speed of solid mover 618,
3. and then, check again the electrical power demand of the solid mover 618,
4. Computer 270 can quickly determine (e.g., in microseconds, milliseconds, seconds, etc.) if a positive (desirable/good) change in the electrical power demand of the solid mover 618 has occurred. It is essential to make a determination quickly to avoid damage or catastrophic failure to the electrical power demand of the solid mover 618, its components, the DOWs system and/or to another of the well's components.
   a. At this point, the computer 270 can determine whether to:
      i. Change the auger speed again, or
      ii. maintain the auger pump speed, and,
      iii. input data into an AI/ML processor or algorithm and/or another device for data analysis and/or storage,
      iv. perform data analysis, which will happen the fastest if by performed by computer 270's on-chip or on-board processor and algorithm. Saving time is critical to prevent equipment failure in fast-moving devices such as electrical power demand of the solid mover 618 motor, the DOW's pump, etc.),
      v. read output data/instructions from the AI/ML processor or algorithm and/or another device,
      vi. perform another action based upon data analysis of computer 270, and/or one or more other inputs (e.g., computed analysis, human intervention, etc.), etc.
5. If a negative (undesirable/bad) change in the electrical power demand of the solid mover 618 has occurred,
   a. the computer 270 can quickly (e.g. in microseconds or milliseconds) determine whether to:
      i. change the auger speed again, or
      ii. maintain current auger speed, or
      iii. enter a diagnostic mode to determine reason(s) why electrical power demand of the solid mover 618 is at an undesirable level.
      1. A diagnostic mode may include:
         a. Determining if one or more components are worn, damaged, or in a non-normal state, etc. by
            i. Conducting one or more tests (e.g. run solids mover 618 through a few tests (e.g. check mass-movement versus speed at various speeds, check for vibrations at various speeds, etc.)
            ii. Analyze tests results. This may be performed fastest if performed by computer 270's on-chip or on-board processor and/or algorithm,
         b. Troubleshoot/Maintenance Tests which may include one or more of the following:
            i. Backflush solids mover 618 and/or system to clear trapped debris or eliminate a gas lock, etc.
            ii. Inject grease/lubricant in area(s) that may require lubrication for longer life, etc.
            iii. Inject sealant to repair gaskets, etc.
            iv. Replace worn parts (e.g. auger blades, nozzles, bushings, liners, etc.)
            v. Change operating parameters of solids mover to reduce further wear, etc.
            vi. Analyze troubleshooting and/or maintenance results via computer 270's on-chip/on-board processor and/or algorithm, vii. Shut down auger/system,
            viii. Transfer duties to a backup auger/system (either temporarily or long term)
            ix. Notify operator (supervisory computer, human, etc.) of condition(s) and actions taken.
         c. Perform other actions, analysis, function(s) to aid in returning the auger/system to a better state (e.g., higher operating efficiency, increased processed sediments/solids, etc.)
         d. Input data into computer 270's onboard AI/ML/Processor device and algorithm and/or another device for data analysis and/or storage,
         e. Perform data analysis via computer 270's on-chip or on-board processor and/or algorithm,
         f. Read output data from computer 270 and/or another device.
         g. Perform another activity/function via computer
      iv. Perform an emergency shut down command from computer 270,
      v. Perform another action controlled by computer 270.
      vi. Exit computer 270's Diagnostic mode.

6. Return to monitoring mode.

The above example exemplifies how computer 270 may increase the life of system 100, separation system 124, separation system 600, and/or one or more components of the systems 100, 124, 600. Computer 270 is able to monitor, control, diagnose, maintain and repair, etc., said systems and component to prevent premature failure.

The above example also exemplifies how computer 270 may increase the efficiency of systems 600, 124, and/or 100 and their respective components. As noted, computer 270 may monitor, adjust, optimize the systems and components to achieve one or more goals (e.g., maximize fluid production, reduce operating costs, increase life, etc.).

Figure 24:
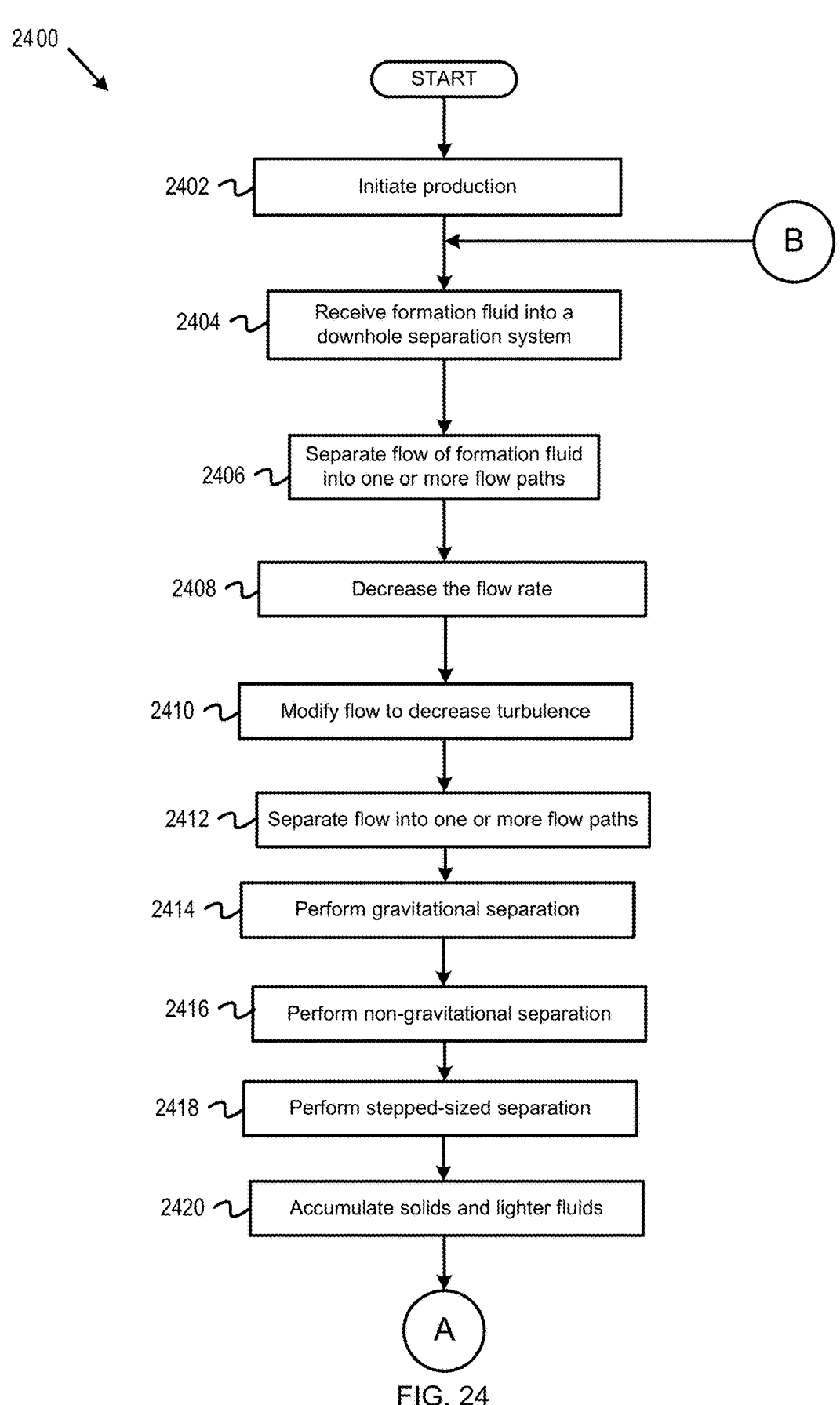
FIGS. 24-25 is a flowchart of example operations for downhole fluid and solid separation, according to some implementations.
Figure 25:
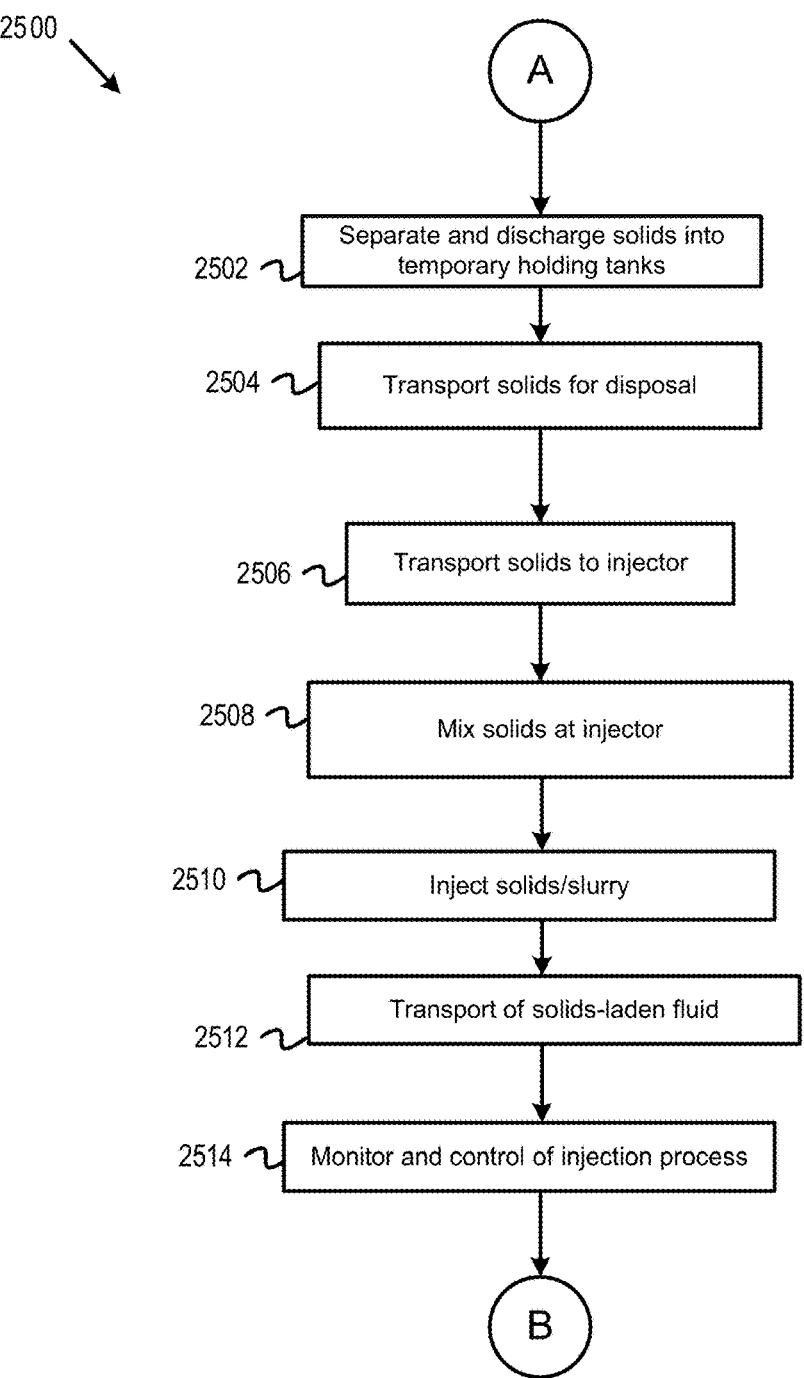
Figure 25:
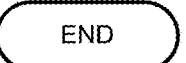

The computer/controller 270 may comprise devices, hardware, software, etc. including but not limited to: switches, power supplies, connectors, transmission lines, logic devices, software, hardware, artificial intelligence, machine learning, algorithms, and other devices known and not known in the current realm of controls, computers, material processing, energy industry, etc. FIGS. 24 and 25 provide examples of other processes and components that may be monitored, controlled and optimized by sensors and computer/controller 270.

Figure 7:
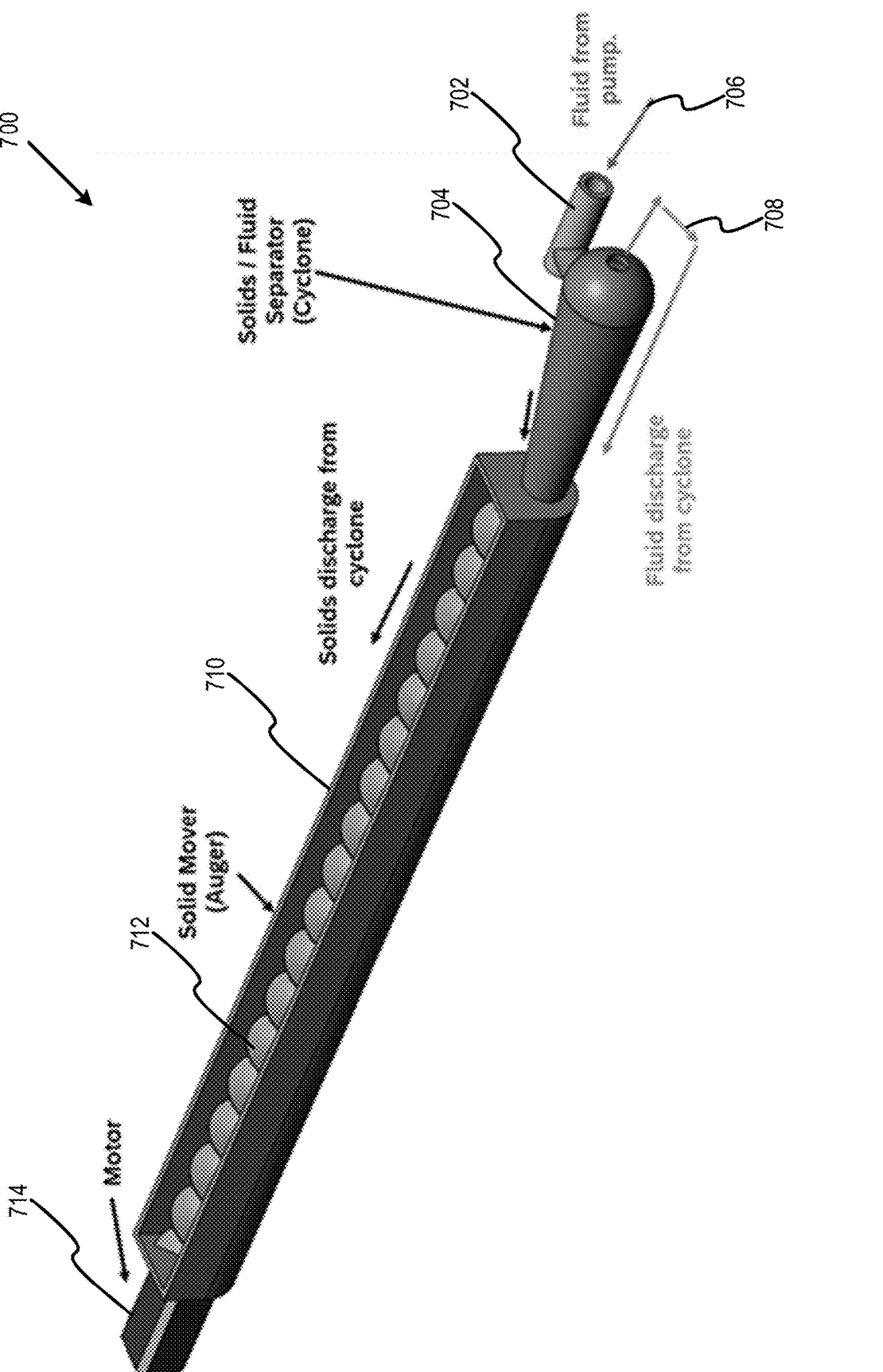
FIG. 7 is an image of an example hydrocyclone separator system, according to some implementations.

FIG. 7 is an image of an example hydrocyclone separator system, according to some implementations. In particular, FIG. 7 depicts a hydrocyclone separator system 700 that may be representative of one of the sediment separators 290 of FIG. 2. Fluid 706 (such as nonproduction fluid separated from formation fluid) may enter the hydrocyclone 704 via an inlet 702. The hydrocyclone 704 may separate sediment from the fluid 706. Clean fluid 708 may be discharged from the hydrocyclone 704 as overflow. Sediment may be discharged from the hydrocyclone 704 into a solids accumulator 710. The solids accumulator 710 may be configured with a solids mover 712 (such as an auger) that may transport the sediment out of the solids accumulator. A motor 714 may be coupled to the solids mover 712 to power the solids mover 712.

Figure 8:
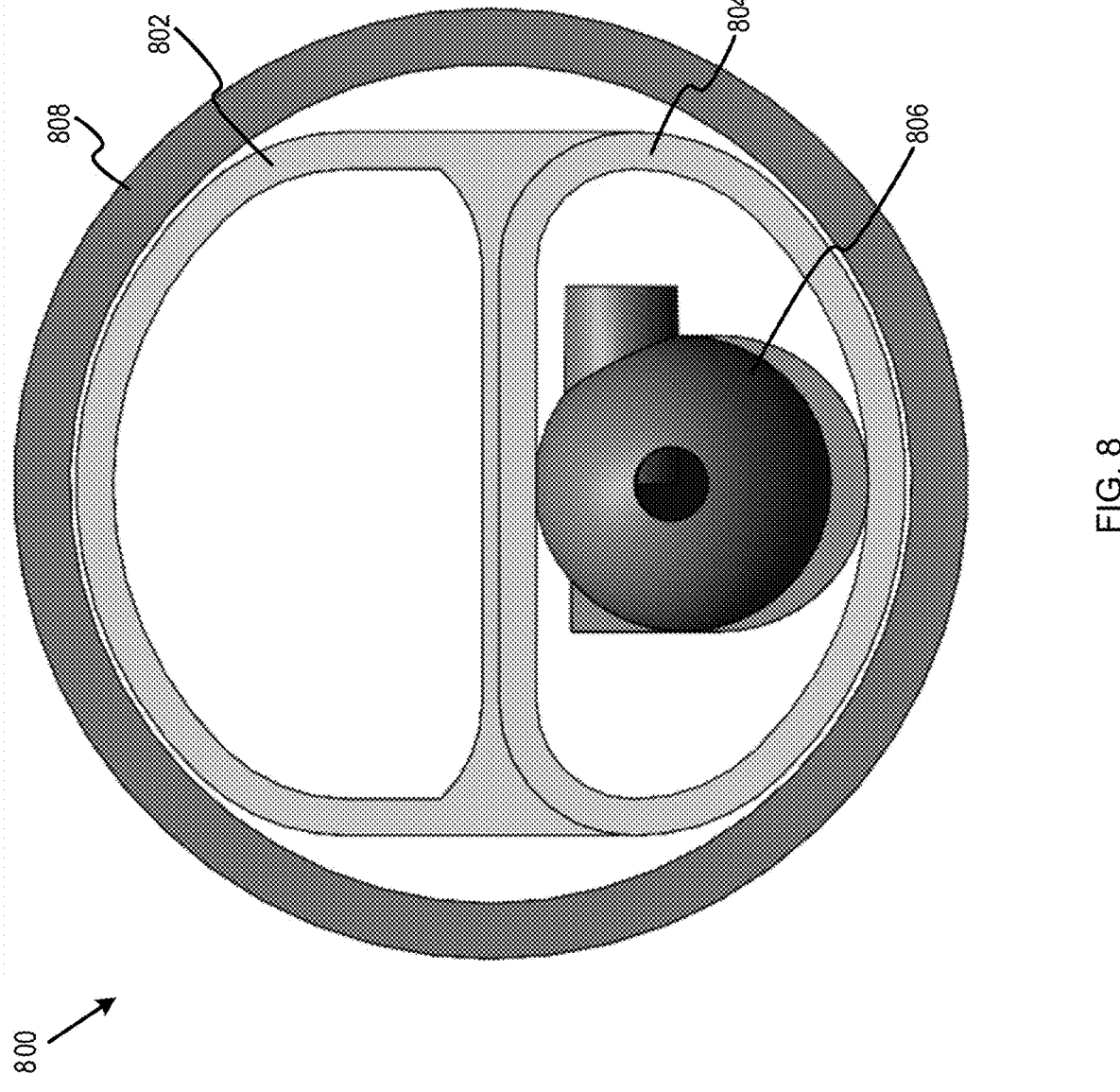
FIG. 8 is a partial cross section of an example hydrocyclone separator system positioned in a separated flow path, according to some implementations.

FIG. 8 is a partial cross section of an example hydrocyclone separator system positioned in a separated flow path, according to some implementations. In particular, FIG. 8 depicts a separator system 800 that may be representative of one of the separator 201 of FIG. 2. An upper flow path 802 and a lower flow path 804 may be positioned in a casing 808. As shown in FIGS. 3A-3C, the flows of FIG. 6 may be separated so that high-oil cut fluid may be collected at the top and channeled through the upper flow path 802. The high-water cut fluid may be channeled through the lower flow path 804. A hydrocyclone separator system 806 (which may include a hydrocyclone, a solids accumulator, a solids mover, etc.) may be positioned in the lower flow path 804 to separate sediment from the high-water cut fluid flowing through the lower flow path 804.

Figure 9:
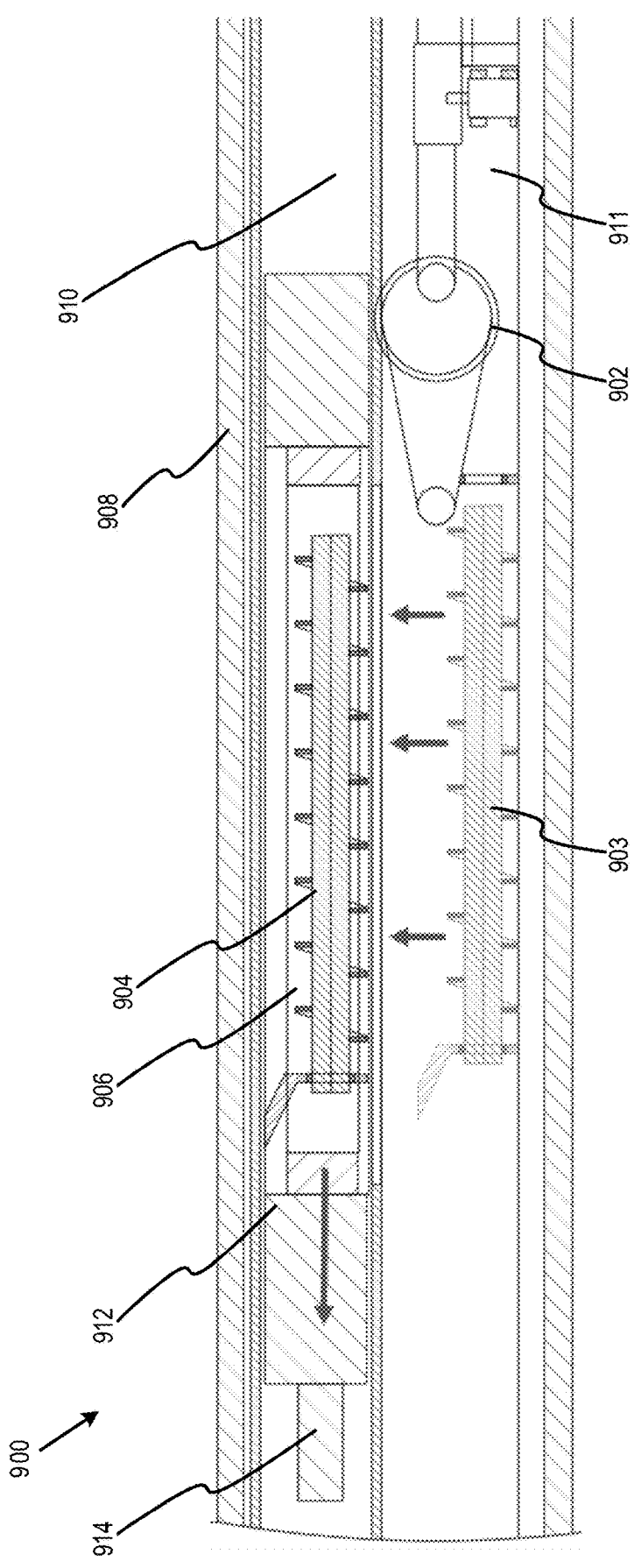
FIG. 9 is a cross sectional side view of a solids accumulator and solids mover of a hydrocyclone separator being removed for repair or replacement, according to some implementations.

FIG. 9 is a cross sectional side view of a solids accumulator and solids mover of a hydrocyclone separator being removed for repair or replacement, according to some implementations. In particular, FIG. 9 includes a separation system 900 (that may be representative of separation system 200 described in FIG. 2) inside a casing 908. The separation system 900 that may include an upper flow path 910 and a lower flow path 911, where a hydrocyclone 902 (or any other suitable cyclonic solid separator) and a solids accumulator 906 configured with a solids mover 904 may be positioned in the lower flow path 911 (as described in FIG. 6). In some implementations, the solids accumulator 906 and/or the solids mover 904 may become damaged, worn, etc. and need to be repaired and/or replaced. For example, the solids accumulator 906 and/or the solids mover 904 may become worn due to the abrasiveness of the sediment passing through the components. Thus, the solids accumulator 906 and the solids mover 904 may be removed from the downhole oil-water-separator system 900 for repair, while the downhole oil-water-separator system 900 and corresponding components (such as the hydrocyclone 902), the completion string, tubular string, etc. may remain in position in the well. A retriever 912 may be coupled to the distal end of a deployment mechanism 914 (such as coiled tubing, wireline, jointed pipe, etc.). The retriever 912 may be deployed in the well and into the upper flow path 910. The retriever 912 may retrieve the solids accumulator 906 configured and the solids mover 904 from its initial position 903 in the lower flow path 911. The solids accumulator 906 configured and the solids mover 904 may then be transported to the surface via the retriever 912. In some implementations, the separation system 900 may be configured with an access panel between the upper flow path 910 and the lower flow path 911 where the solids accumulator 906 may be transferred through when being replaced/installed. In some implementations, the retriever 912 may be configured to open and/or shut the access panel.

Figure 10:
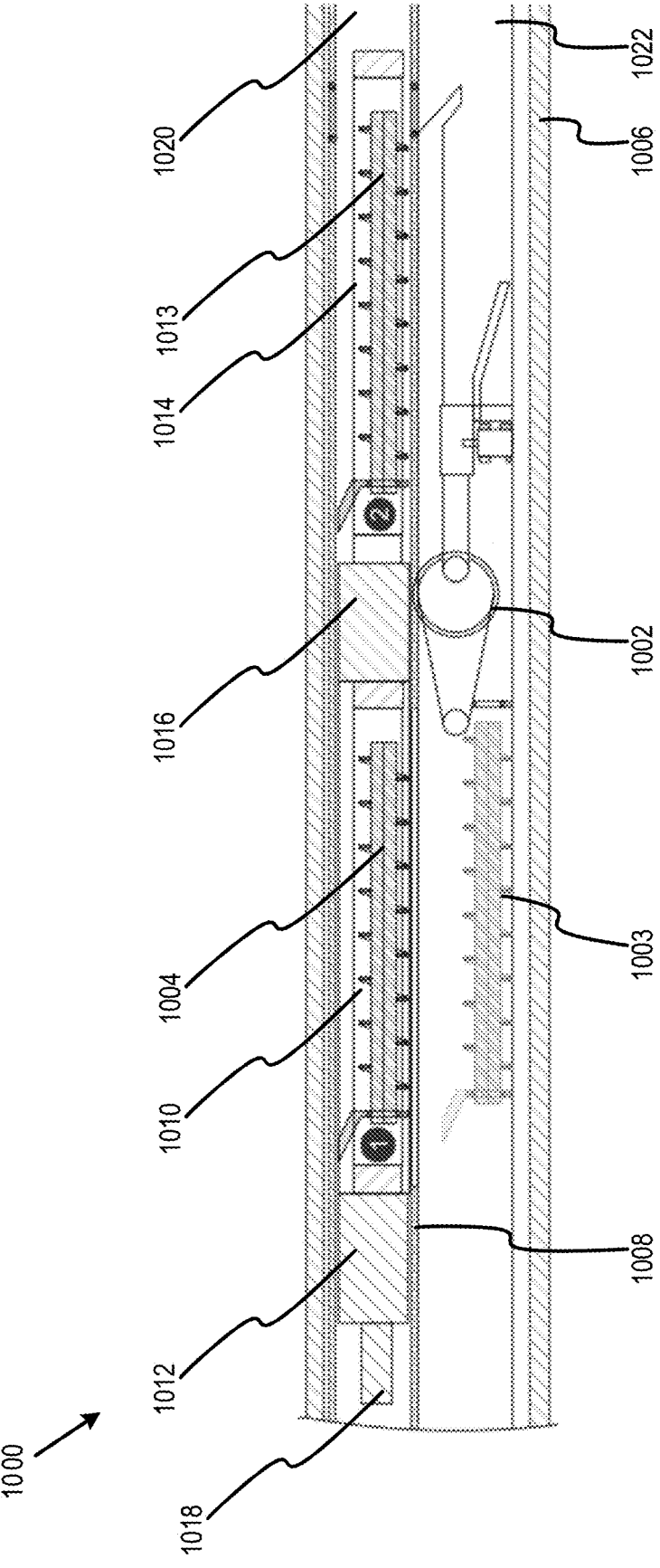
FIG. 10 is a cross sectional side view of a solids accumulator and solids mover of a hydrocyclone separator being removed for repair or replacement, according to some implementations.

FIG. 10 is a cross sectional side view of a solids accumulator and solids mover of a hydrocyclone separator being removed for repair or replacement, according to some implementations. FIG. 10 includes similar components as FIG. 9. For example, a separation system 1000 (that may be representative of separation system 200 described in FIG. 2) positioned in a casing 1006 of a wellbore may include an upper flow path 1020 and a lower flow path 1022, where a hydrocyclone 1002 (or any other suitable cyclonic solid separator), a solids accumulator 1010 configured with a solids mover 1004 may be positioned in the lower flow path 1022 (as described in FIG. 6). A retriever 1012 may be coupled to the distal end of a deployment mechanism 1018 (such as coiled tubing, wireline, etc.). The retriever 1012 may be deployed in the well and into the upper flow path 1020. The retriever 1012 may remove the solids accumulator 1010 with the solids mover 1004 from its initial position 1003 in the lower flow path 1022.

The retriever 1012 may also include a replacement solids accumulator 1014 and replacement solids mover 1013. The replacement solids accumulator 1014 and replacement solids mover 1013 may be deployed in the well with the retriever 1012, via a connector 1016. The replacement solids accumulator 1014 and replacement solids mover 1013 may be uphole and/or downhole of the solids accumulator 1010 with the solids mover 1004 when retrieved from its initial position 1003. After the solids accumulator 1010 and the solids mover 1004 are removed from the initial position 1003, the retriever 1012 may be repositioned in the upper flow path to then deploy the replacement solids accumulator 1014 and replacement solids mover 1013 in the lower flow path 1022 to replace the solids accumulator 1010 and the solids mover 1004. The retriever 1012 may then return to surface with the solids accumulator 1010 with the solids mover 1004.

FIGS. 9-10 depict the solids accumulators 906, 1010 and solids movers 904, 1004, respectively, being removed. In some implementations, the hydrocyclones 902, 1002 may be removed and/or replaced via a retriever 912, 1012, respectively.

Figure 11:
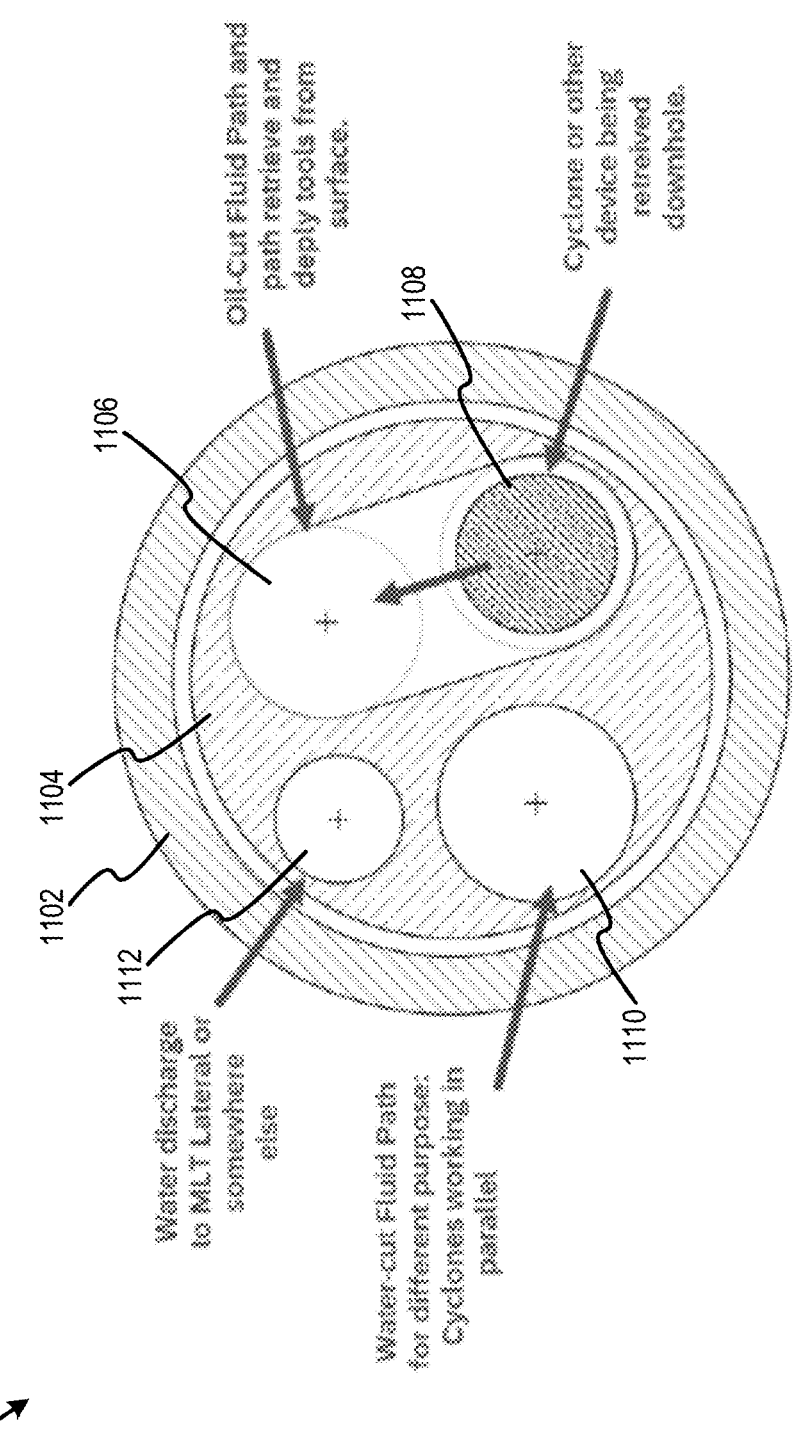
FIG. 11 is a cross sectional view of the removal pathway for a cyclonic solids separator, according to some implementations.

FIG. 11 is a cross sectional view of the removal pathway for a cyclonic solids separator, according to some implementations. In particular, FIG. 11 includes a partial cross sectional view of a separation system 1100 (that may be representative of separation system 200 described in FIG. 2) that includes a separator 1104 positioned downhole in a casing 1102 of a well. The separator 1104 includes similar components as separator system 600 of FIG. 6. For example, oil-cut fluid may flow through an upper flow path 1106 and water-cut fluid may flow through a lower flow path 1108. A cyclonic solids separator and additional components such as a solids accumulator and solids mover may be positioned in the lower flow path 1108. If any one or more of the cyclonic solids separator, solids accumulator and solids mover needs to be retrieved and installed (as described in FIG. 9 and FIG. 10), the one or more components may be transferrable between the lower flow path 1108 and the upper flow path 1106. The upper water flow path 1112 may act as a water discharge path such that the water (once separated from the formation fluid and sediment) may be discharged to its destination location such as a subsurface formation surrounding a bore of a multi-bore well. In some implementations, the separator 1104 may include a second lower flow path 1110 which may function as a secondary flow path for water and may function in parallel with the lower flow path 1108. In some implementations, the second lower flow path 1110 may also include a cyclonic solids separator, solids accumulator, and/or a solids mover.

Figure 12:
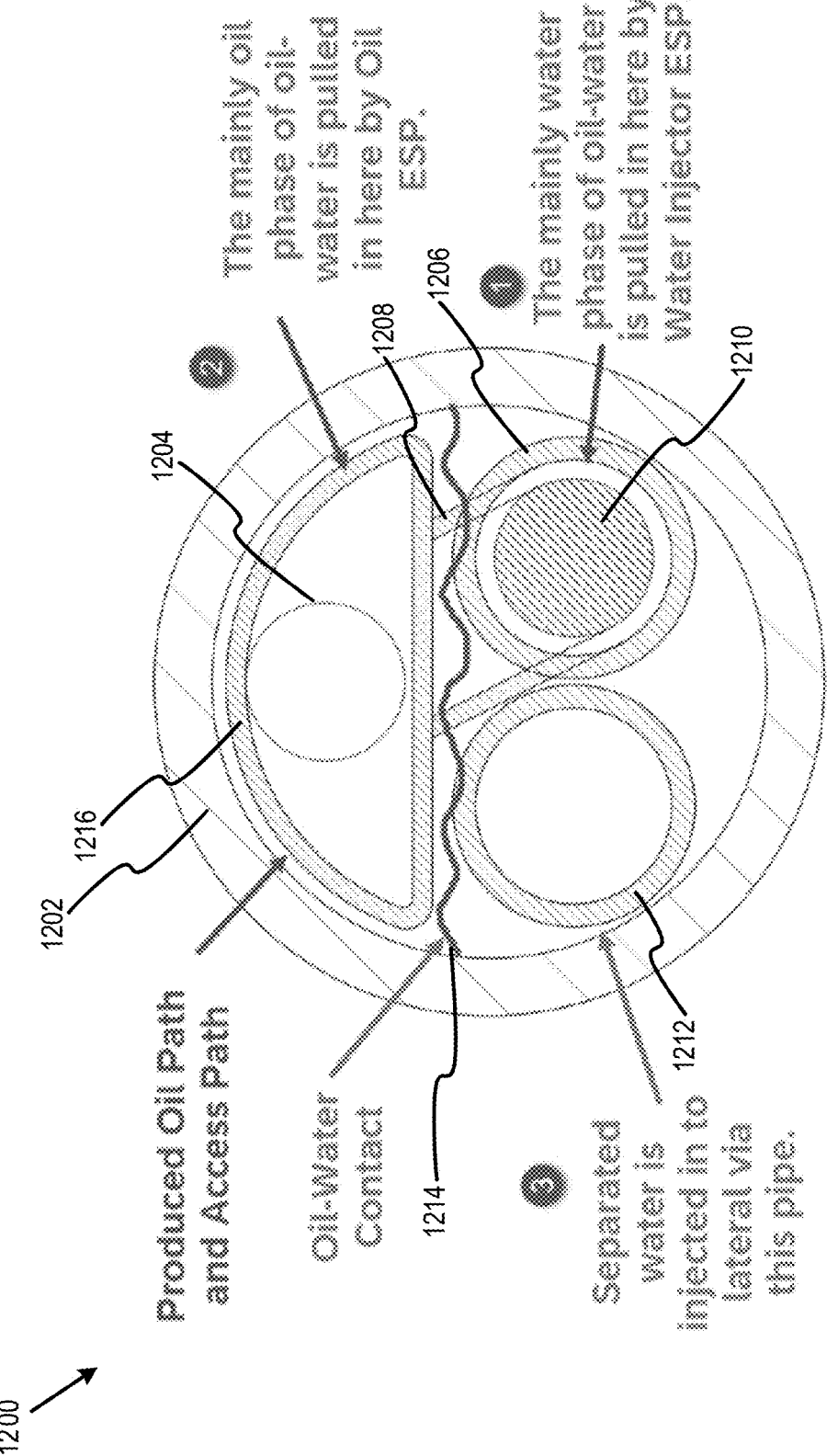
FIG. 12 is a cross sectional view of the removal pathway for a cyclonic solids separator, according to some implementations.

FIG. 12 is a cross sectional view of the removal pathway for a cyclonic solids separator, according to some implementations. In particular, FIG. 12 includes a partial cross sectional view of a separation system 1200 (that may be representative of separation system 200 described in FIG. 2) that includes a separator 1202 positioned downhole in a well. The separator 1202 includes similar components as the separation system 1100 of FIG. 11. For example, formation fluid may separate (as described in FIGS. 3A-3C) and oil-cut fluid above the oil-water contact 1214 may flow through an upper flow path 1216 and water-cut fluid below the oil-water contact 1214 may flow through a lower flow path 1206. A cyclonic solids separator 1210 and additional components such as a solids accumulator and solids mover may be positioned in the lower flow path 1206. If any one or more of the cyclonic solids separator 1210, solids accumulator and solids mover needs to be retrieved and installed (as described in FIG. 9 and FIG. 10), the one or more components may be transferrable between the lower flow path 1206 and the approximate position 1204 in the upper flow path 1216, via the path 1208. The lower water flow path 1212 may function as a water discharge path such that the water (once separated from the formation fluid and sediment) may be discharged to its destination location such as a subsurface formation surrounding a bore of a multi-bore well.

Figure 13:
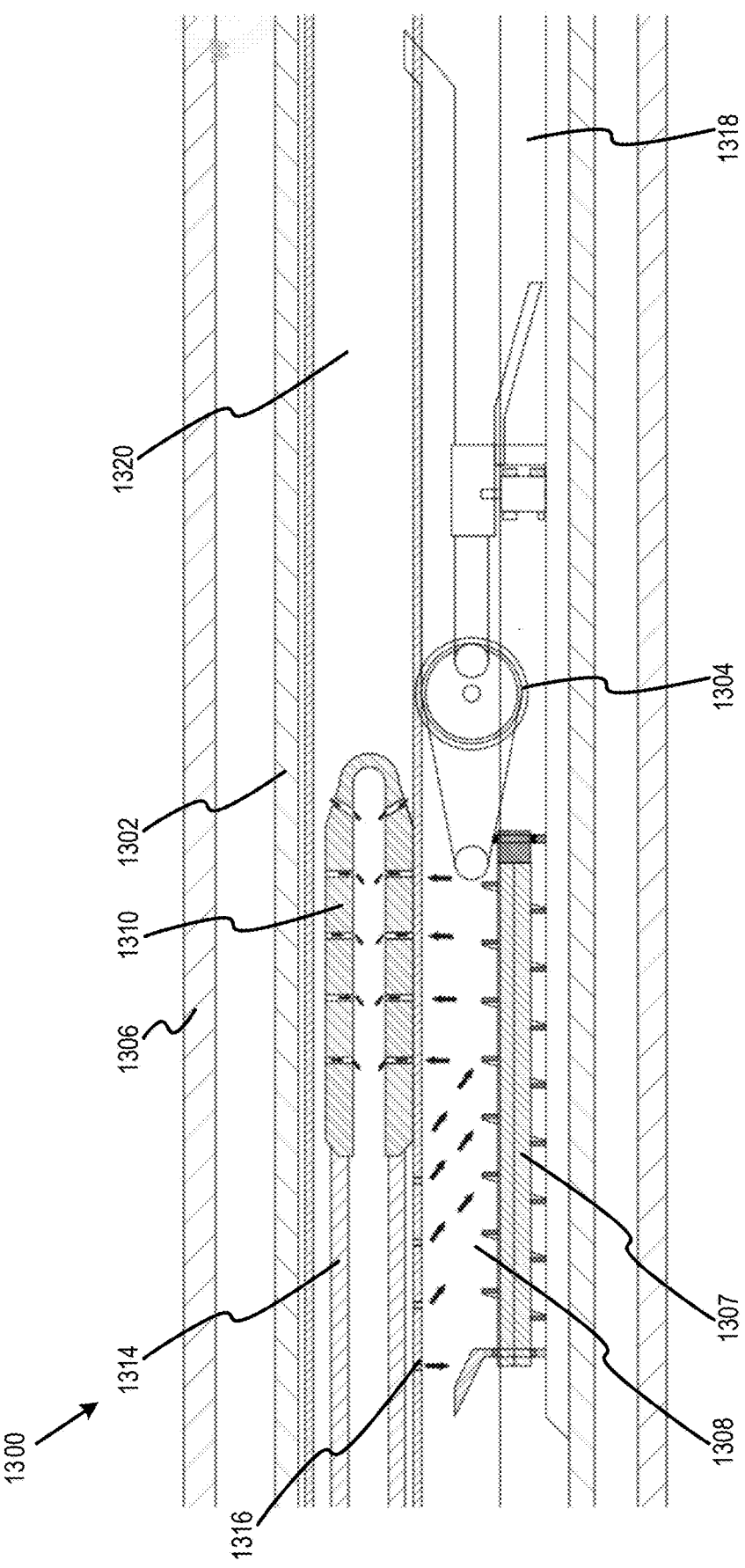
FIG. 13 is a cross sectional side view of a jetting tool to clean and remove debris from a cyclonic solids separator and other equipment, according to some implementations.

FIG. 13 is a cross sectional side view of a jetting tool to clean and remove debris from a cyclonic solids separator and other equipment, according to some implementations. In particular, FIG. 13 includes a partial cross section of a separation system 1300 (that may be representative of separation system 200 described in FIG. 2) positioned downhole in a casing 1306 of a wellbore. The separation system 1300 includes a hydrocyclone 1304 (or any other suitable cyclonic solids separator), a solids accumulator 1308 with a solids mover 1307 positioned in a lower flow path 1318 within the body 1302 of the separation system 1300. In some implementations, debris such as sand, scale, paraffin, etc. may build up on the hydrocyclone 1304, the solids accumulator 1308 and/or the solids mover 1307. A jetting tool 1310 may be deployed in the upper flow path 1320 via a deployment mechanism 1314 (such as coiled tubing, wireline, etc.). In some implementations, fluid may be pumped into the upper flow path and circulated through the jetting tool 1310, through the deployment mechanism 1314, and ultimately to the surface. The fluid may be circulated through ports 1316 to clear the hydrocyclone 1304, the solids accumulator 1308 and/or the solids mover 1307 of debris. The fluid may transport the debris freed from the components into the jetting tool, and back to surface to remove the debris from the well. In some implementations, the fluid may be circulated from the jetting tool 1310, to the upper flow path 1320. The jetting tool 1310 may be configured to increase the velocity of the fluid to free the debris from the components in the lower flow path 1322. The jetting tool 1310 may be deployed further downhole, past the hydrocyclone 1304, the solids accumulator 1308 and/or the solids mover 1307 of debris, to clear other components of the separation system 1300 of debris.

Figure 14:
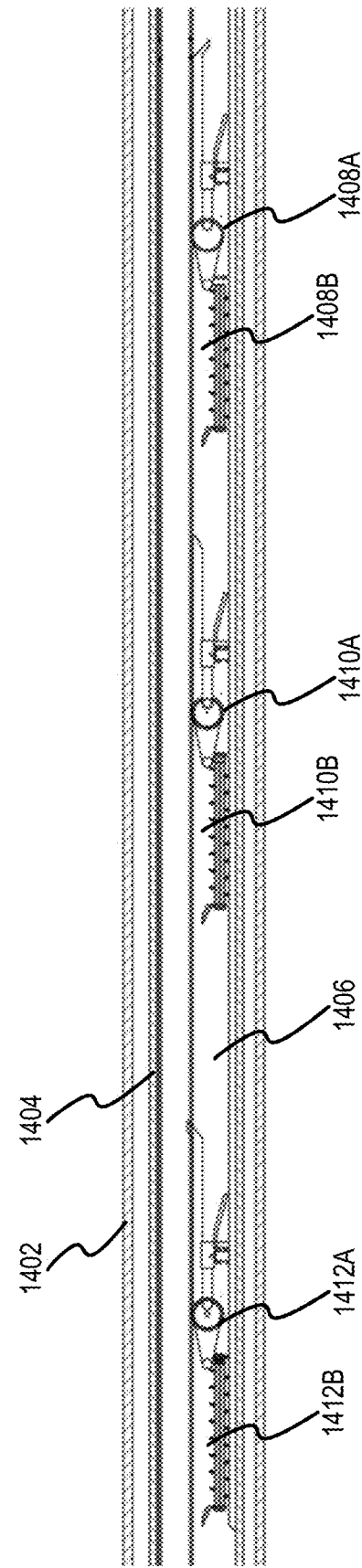
FIG. 14 is a partial cross sectional side view of example cyclonic solids separators in series, according to some implementations.

FIG. 14 is a partial cross sectional side view of example cyclonic solids separators in series, according to some implementations. In particular, FIG. 14 includes a partial cross section of a separation system 1400 (that may be representative of separation system 200 described in FIG. 2) positioned downhole in a casing 1402 of a wellbore. The separation system 1400 includes cyclonic solids separators 1408A-1412A with corresponding solids accumulators 1408B-1412B, respectively positioned in the lower flow path 1406. The cyclonic solids separators 1408A-1412A may be in series and configured to separate out various sizes of sediment to remove approximately all of the sediment from the fluid flowing through the lower flow path 1406. For example, cyclonic solids separator 1408A may be a desander that may separate out larger solids, cyclonic solids separator 1410A may be a desilter and then cyclonic solids separator 1412A may be a centrifuge may separate out the solids smaller than the solids removed in cyclonic solids separators 1408A and cyclonic solids separators 1408B. In some implementations, cyclonic solids separators 1408A-1412A may be run in a parallel arrangement or other arrangements and configurations.

Figure 15:
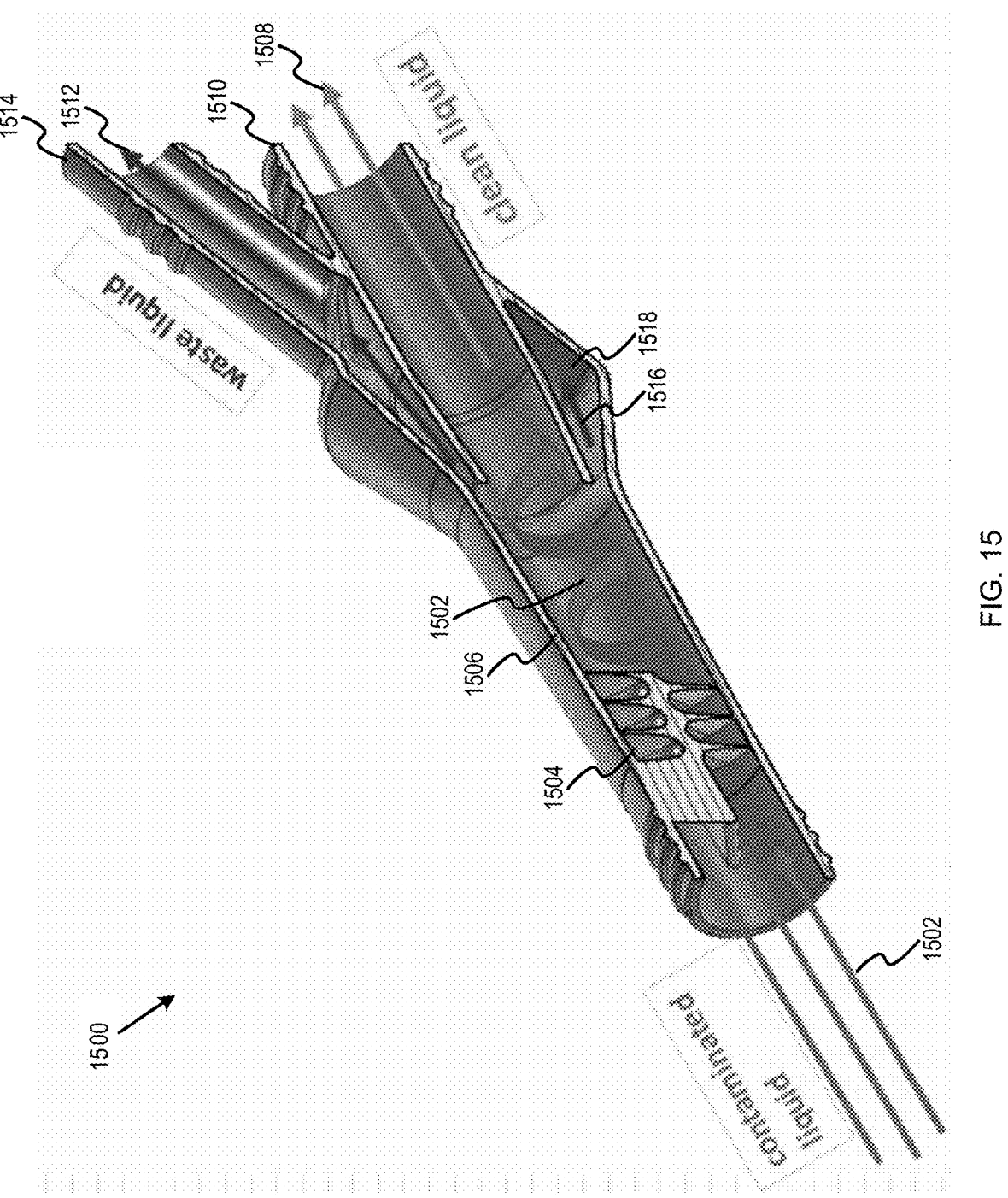
FIG. 15 is a partial cross sectional side view of an example cyclonic solids separator, according to some implementations.

FIG. 15 is a partial cross sectional side view of an example cyclonic solids separator, according to some implementations. In particular FIG. 15 includes a cyclonic solids separator 1500 that may be implemented in a separation system in a wellbore (such as separation system 200 described in FIG. 2). For example, the separator system may be configured with one or more cyclonic solids separators 1500 in the flow path of the high-oil cut fluid and/or the flow path of the high-water cut fluid. Fluid 1502 may enter the cyclonic solids separator 1500 and pass through a hydrocyclone 1504 (or any other suitable cyclonic solids separator such as a desilter).

The hydrocyclone 1504 may be configured to function similar to the hydrocyclone 500 described in FIG. 5. For example, the hydrocyclone 1504 may generate a centrifugal movement of the fluid as the fluid exits the hydrocyclone and enters the pipe 1506. The centrifugal movement may push the heavier phases (such as sediment, water, etc.) outward toward the outer wall of the pipe 1506. In some implementations, the sediments 1516 in the rotating stream of fluid 1502 may have too much inertia to follow the tight curve of the stream. Such sediment 1516 may thus strike the outside wall and fall to the bottom of the pipe 1506 and enter the sediment discharge 1518. In some implementations, at least a portion of the heavier phases of fluid (such as water) may also enter the sediment discharge 1518. Thus, a sediment slurry may enter the sediment discharge 1518. The sediment 1516 may further be transported to its destination location (e.g., the surface, a storage area in the wellbore, injected into the subsurface formation, etc.). In some implementations, the cyclonic solids separator 1500 may be oriented with respect to gravity. Accordingly, the sediment discharge 1518 may be positioned at the bottom of the cyclonic solids separator 1500 to allow gravity to assist in the separation and ensure the sediments 1516 may eventually enter the sediment discharge 1518.

The heavier phases of fluid, i.e., waste liquid 1512 (such as water), may enter the waste liquid discharge 1514 and ultimately be transported to its destination location. The lighter phases, i.e., clean liquid 1508 (such as hydrocarbons) may migrate towards the center of the pipe 1506 and proceed to the clean liquid discharge 1510, where the clean liquid 1508 may ultimately be transported to the surface. In some implementations, the sediment discharge 1518 may be coupled with the clean liquid discharge 1510 such that the sediment may be injected into the stream of clean liquid to be transported to surface and removed from the wellbore.

Figure 16:
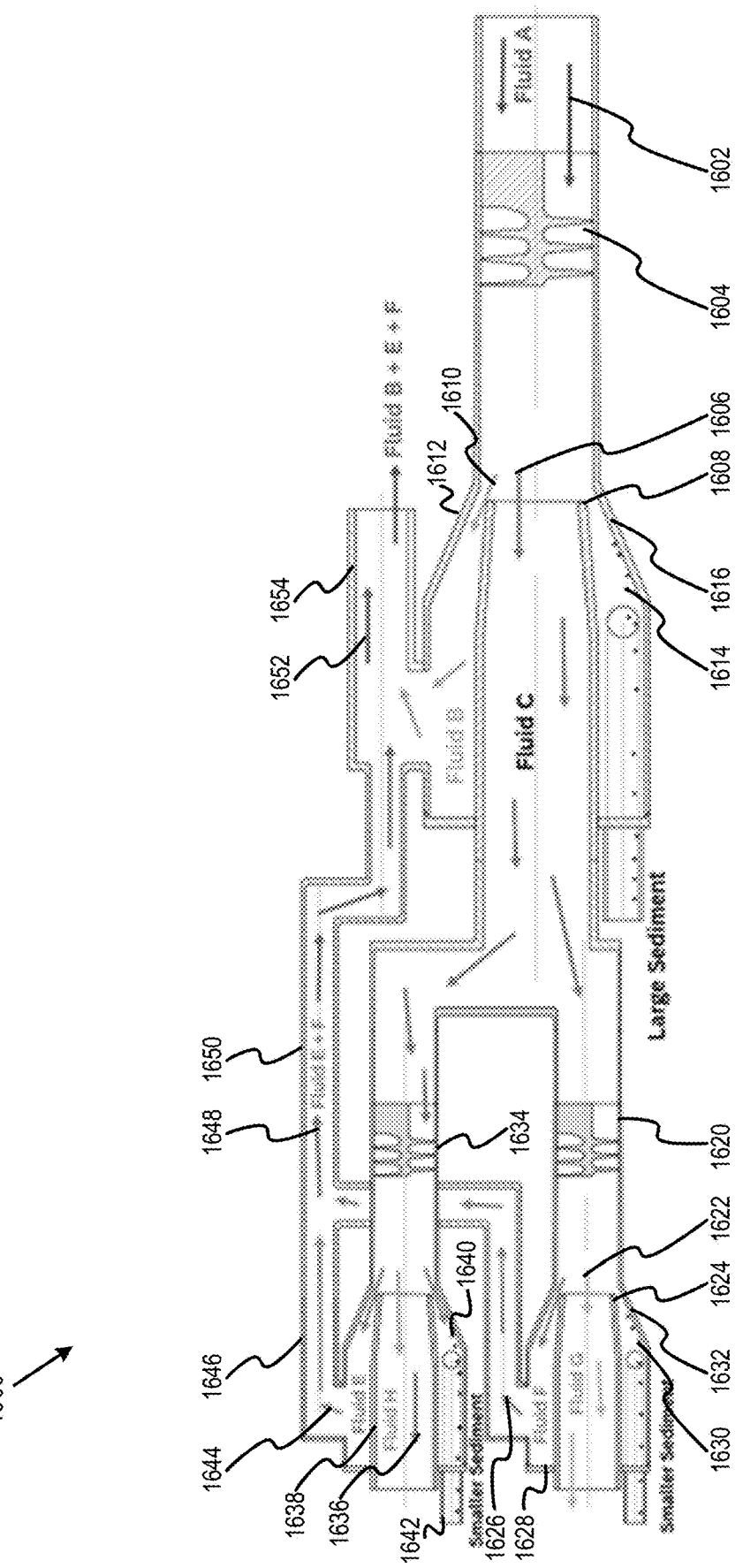
FIG. 16 is a partial cross sectional side view of an example group of cyclonic solids separators, according to some implementations.

FIG. 16 is a partial cross sectional side view of an example group of cyclonic solids separators, according to some implementations. In particular, FIG. 16 includes a partial cross section of a separation system group 1600 (that may be representative of separation system 200 described in FIG. 2) positioned downhole in a wellbore. The separation system group 1600 depicts an example configuration of a group of separation systems each configured with hydrocyclones. In some implementations, each of the separation systems may be configured with any suitable cyclonic separation system, such as a helical separator. The group of separation systems may be configured to separate formation fluid from a subsurface formation into production fluid (e.g., hydrocarbons) and nonproduction fluid (e.g., water). Additionally, or alternatively, each of the separation systems may be configured to separate sediment from the formation fluid. A first separation system may be in series with a subset of separation systems (a second separation system and a third separation system). The second separation system and third separation system may be parallel to one another. Each of the separation systems may be representative of the cyclonic solids separator 1500 described in FIG. 15.

For example, fluid A (formation fluid) may enter the first hydrocyclone 1604. Sediment 1614 may be knocked out of the formation fluid 1602 and discharged to the sediment discharge 1616. In some implementations, the sediment discharge 1616 may be configured with a solids mover to transport the sediment to a destination location. Heavier phase liquids, i.e., fluid B 1610 (water), may be discharged to the waste liquid discharge 1612. Clean fluid, i.e., fluid C 1606 (hydrocarbons) may be discharged to the clean fluid discharge 1608. In some implementations, not all of the sediment and/or heavier phase liquids may be separated from the clean liquid. For example, emulsion may result in water being transported with the oil, silt may not be knocked out of the oil, etc. Thus, at least a portion of fluid C 1606 may then proceed to hydrocyclone 1620 and the remaining portion of fluid C 1606 may proceed to the hydrocyclone 1634 to further separate waste fluid from fluid C. Moreover, sediment smaller than the sediment knocked out from the hydrocyclone 1604 may be separated from fluid C via hydrocyclone 1620 and/or hydrocyclone 1634.

At least a portion of fluid C 1606 may enter the hydrocyclone 1620. The hydrocyclone 1620 may be configured to at least partially separate out any remaining sediment suspended in the fluid C and water in fluid C. Sediment 1630 may be knocked out of fluid C 1606 and discharged to the sediment discharge 1632. In some implementations, the sediment discharge 1632 may be configured with a solids mover to transport the sediment to a destination location. Heavier phase liquids, i.e., fluid F 1626 (water), may be discharged to the waste liquid discharge 1628. Clean fluid, i.e., fluid G 1622 (hydrocarbons) may be discharged to the clean fluid discharge 1624. The clean fluid discharge may lead to a tubing string, pump, etc. to transport the fluid G to the surface.

The other portion of fluid C 1606 may enter the hydrocyclone 1634. The hydrocyclone 1620 may be configured to at least partially separate out any remaining sediment suspended in the fluid C and water in fluid C. Sediment 1640 may be knocked out of fluid C 1606 and discharged to the sediment discharge 1642. In some implementations, the sediment discharge 1642 may be configured with a solids mover to transport the sediment to a destination location. In some implementations, sediment discharge 1642 may be coupled with sediment discharge 1630 and/or sediment discharge 1616 to dispose of the respective sediments 1640, 1630, 1614 in a destination location such as a sediment injector configured to inject the sediment to a tubular string with a fluid (production fluid and/or nonproduction fluid) to transport to surface, to inject into a subsurface formation surrounding a bore of a multi-bore well, etc.

Clean fluid, i.e., fluid H 1636 (hydrocarbons) may be discharged to the clean fluid discharge 1638. The clean fluid discharge may lead to a tubing string, pump, etc. to transport the fluid H to the surface. In some implementations, clean fluid discharge 1638 may be coupled with clean fluid discharge 1624 to combine clean fluid G with clean fluid H and transport said combined fluids to the surface.

Heavier phase liquids, i.e., fluid E 1644 (water), may be discharged to the waste liquid discharge 1646. Waste liquid discharge 1646 may be coupled with waste liquid discharge 1628 such that fluid E 1644 may be combined with 1626 in flow path 1650 to form fluid E+F 1648. The waste liquid discharge 1612 may be coupled with the flow path 1650 such that fluid B 1610 may be combined with fluid E+F 1648 to form fluid B+E+F 1652 in flow path 1654. The flow path 1654 may discharge fluid B+E+F 1652 to be disposed of, such as injected into a subsurface formation surrounding a bore of a multi-bore well.

In example implementations, cyclonic solids separator liners and parts may be of at least one of aluminum oxide (Al$_2$O$_3$), silicon carbide (SiC), Zirconium, monolithic castables, nitride bonded SiC, reaction bonded SiC, sintered alpha SiC, zirconia toughened alumina, fused cast AZS, silicon carbide, etc. In example implementations, the cyclone linings may be composed of ceramic.

Example Helical Separator

Figure 17:
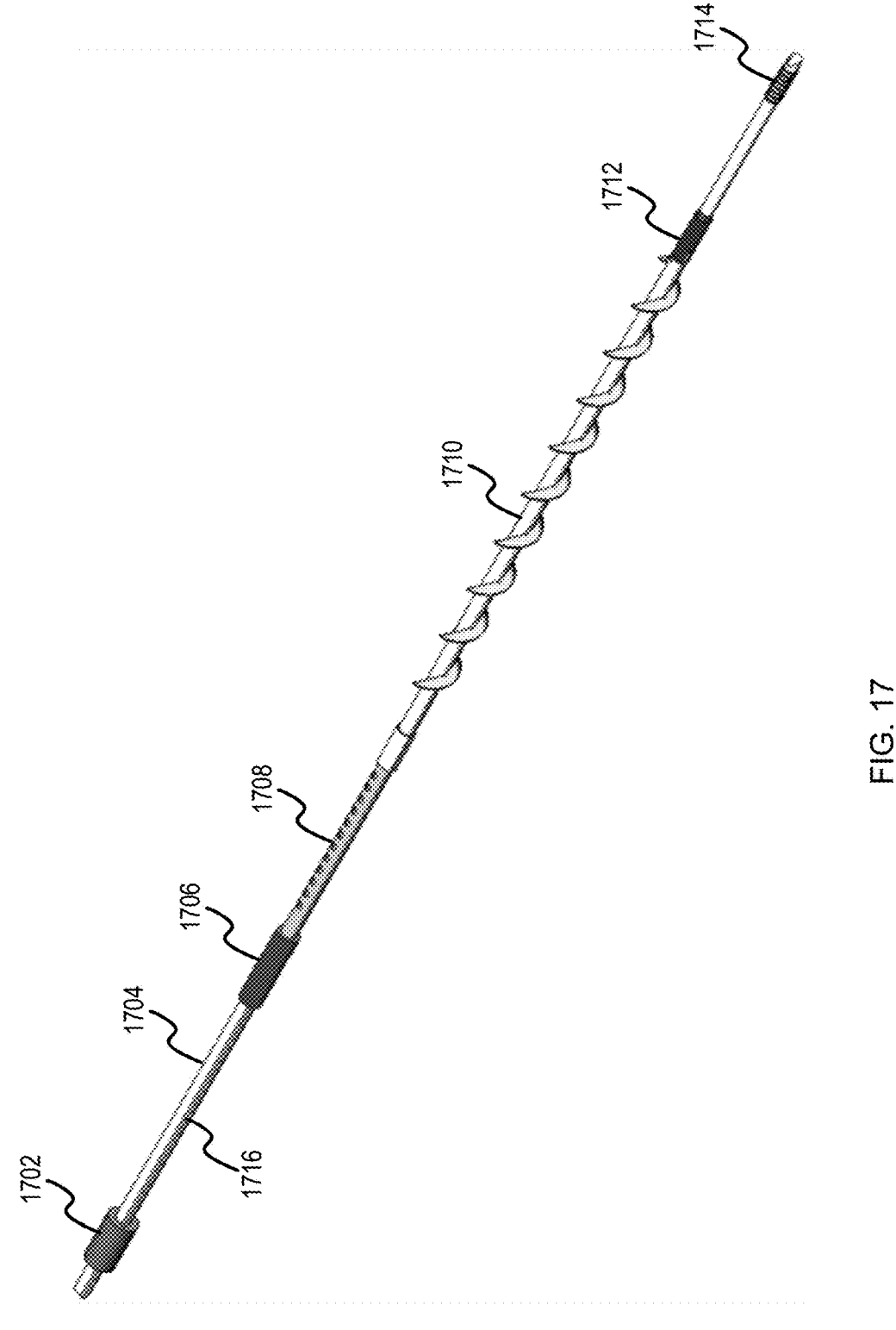
FIG. 17 is a schematic of a helical separator, according to some implementations.

FIG. 17 is a schematic of a helical separator, according to some implementations. In particular, FIG. 17 depicts a helical separator 1700 configured to separate sediment from the fluid produced from a subsurface formation. For example, the helical separator 1700 may be positioned uphole (downstream) of a fluid separator (such as the separator 201 of FIG. 2) to separate sediment from the nonproduction fluid, and return the sediment to the production fluid to be transported to surface. The remaining nonproduction fluid may then be injected back into the subsurface formation for disposal (such as in a subsurface formation surrounding a bore of a multi-bore well). In some implementations, the helical separator 1700 may be configured to separate production fluid and nonproduction fluid.

The helical separator 1700 may be implemented into the separation system 124 of FIG. 1 and/or the sediment separator 290 of FIG. 2.

The helical separator 1700 depicted in FIG. 7 may be positioned in a tubular in a well. The seal 1714 may allow for the helical separator 1700 to be positioned in a profile in the tubular. Fluid may travel on the outside of the helical separator 1700 across the helical profile 1710, generating a centrifugal movement in the fluid. The centrifugal movement of the fluid may push the heavier phases outward (away from the central axis of the helical separator 1700), and the lighter phases inward towards the body of the helical separator 1700. For example, a fluid may include water and sediment. The helical profile 1710 may push the sediment (heavier than the water) outward, and the water (lighter than the sediment) may continue to flow uphole. The lighter phases may then be drawn in to a ported sub 1708, via a pump 1712, where the lighter phases may then be injected to another flow path. For example, the water may be drawn into the ported sub 1708 and pumped into a flow path to then be injected into a subsurface formation. A cable 1716 may provide power, control signals, etc. to the pump 1712. A packer 1702 may prevent the fluid from flowing uphole past the helical separator 1700. Thus, the fluid must flow outward to another flow path (such as a ported tubing transferring production fluid) and/or into the ported sub 1708 to be transferred to another location. A flow control device 1706, such as an inflow control valve (ICV), may be positioned above the ported sub 1708 and configured to allow flow uphole once drawn into the ported sub 1708. For example, the flow control device 1706 may be utilized to allow the water (that has been separated from the sediment via the helical profile 1710) to be transported further uphole for testing, further refining, storage, etc. The cable 1716 may also provide power, control signals, etc. to the flow control device 1706. In some implementations, the cable 1716 may provide power, control signals, etc. to other devices in the wellbore. In other implementations, the cable 1716 may also communicate signals, data, etc. to devices, processors, etc.

In some implementations, the helical separator 1700 may include one or more sensors to monitor the condition, properties, etc. of the one or more fluids, volumes, flow rates, solids content, etc. flowing through the DOWSS. Likewise, the sensors and/or measurements obtained by the sensors may be captured by other devices not associated with the helical separator 1700.

Figures 18A, 18B:
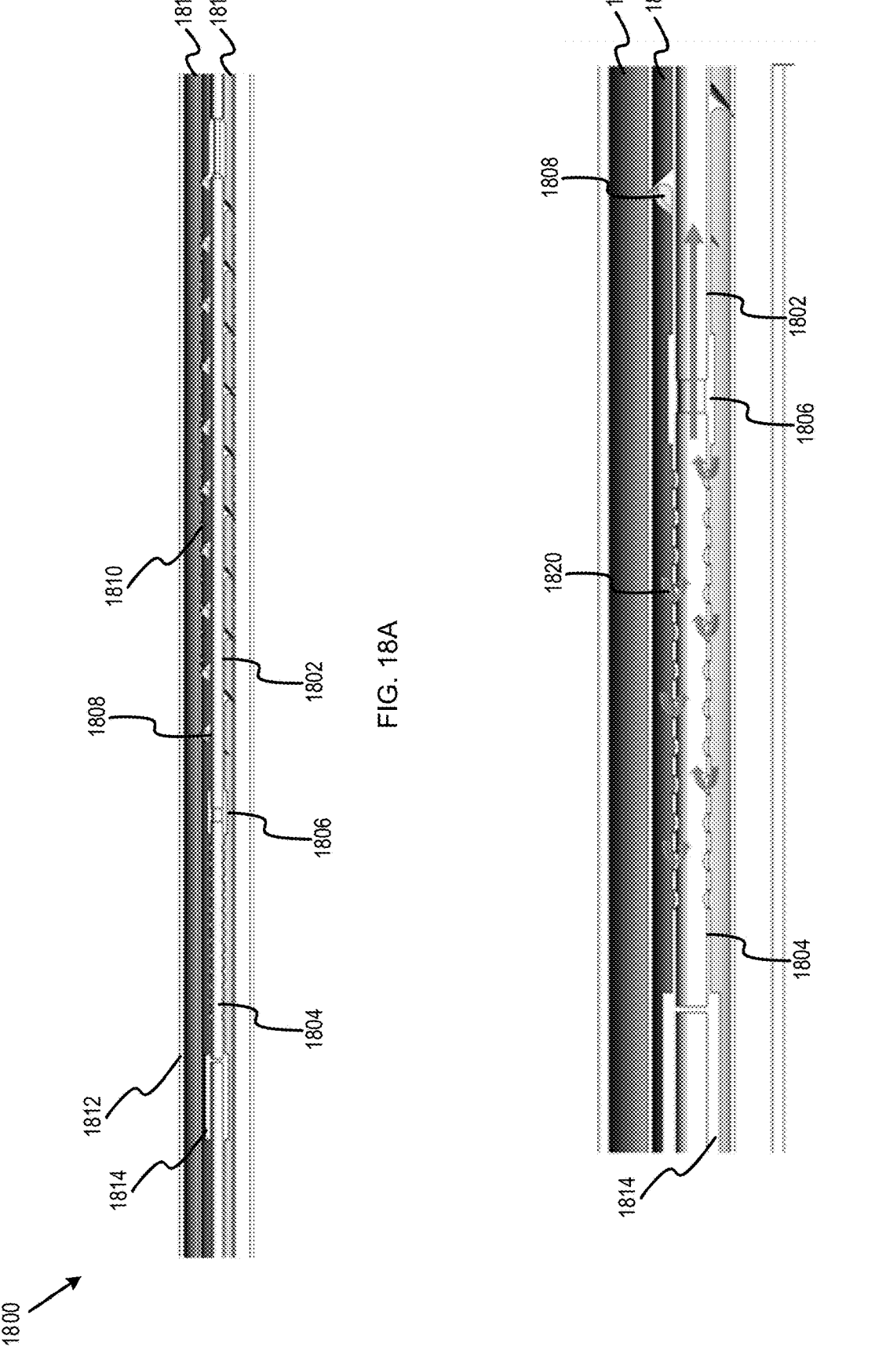
FIGS. 18A-18B are partial cross section side views of a helical separator, according to some implementations.

FIGS. 18A-18B are partial cross section side views of a helical separator, according to some implementations. In particular, FIGS. 18A-B includes a helical sediment separator 1800 (that may be representative of the helical separator 1700 described in FIG. 17), where a helical separator 1802 is positioned in a section of ported tubing 1810 downhole in a wellbore and configured to separate sediment from fluid. In some implementations, the helical sediment separator 1800 may be positioned downstream of a fluid separator such that production fluid is separated from nonproduction fluid 1820. Accordingly, the flow path between the casing 1812 and the ported tubing 1810 may function as a flow path for production fluid and the nonproduction fluid 1820 may flow in the ported sub 1804 and interact with the helical profile 1808 on the helical separator 1802. A ported sub 1804 (such as the ported sub 1708 of FIG. 17) may be coupled with the helical separator 1802 via a connection 1806 and positioned uphole of the helical separator 1802. In some implementations, the helical sediment separator 1800 may be configured with a flow control device 1814 (that may be representative of flow control device 1706 described in FIG. 17).

Figure 19:
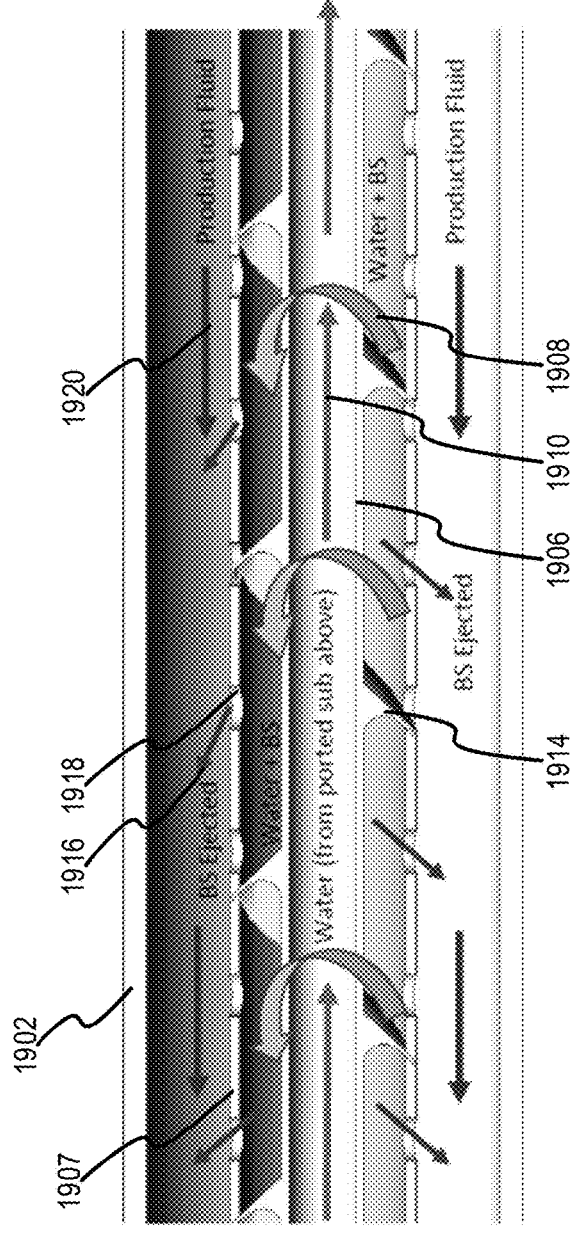
FIG. 19 is a partial cross section side view of a helical separator positioned in a section of ported tubing, according to some implementations.

FIG. 19 is a partial cross section side view of a helical separator positioned in a section of ported tubing, according to some implementations. In particular, FIG. 19 includes a partial section of a helical sediment separator 1900 (that may be representative of the helical separator 1700 described in FIG. 17). Nonproduction fluid 1908 (water and basic sediment) may flow between the ported sub 1907 and the helical separator 1906 to interact with the helical profile 1914. The centrifugal movement of the nonproduction fluid 1908 generated by the helical profile 1914 may result in sediment 1916 being separated from the water 1910 and pushed outwards (radially away from the helical separator 1906). The sediment 1916 may be pushed through one or more ports 1918 in the ported sub 1907 and into the flow path of production fluid 1920, between the ported sub 1907 and a tubular 1902. The water may continue uphole and enter the helical separator 1906 via a ported sub (such as the ported sub 1804 of FIGS. 18A-18B). The flow of the water may be driven by a pump (e.g., an electric submersible pump (ESP)) such as the pump 1712 of FIG. 17.

Figure 20:
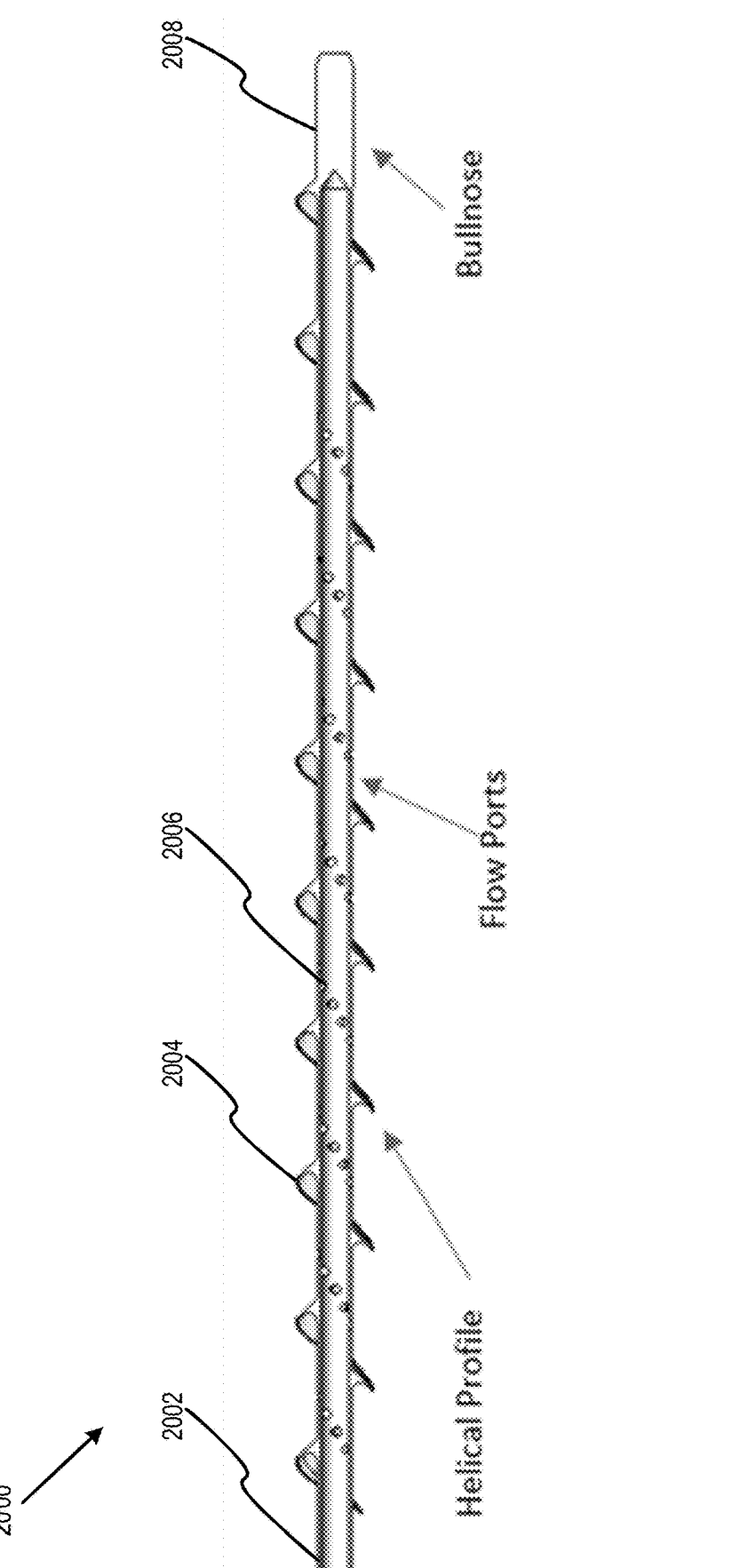
FIG. 20 is a partial cross section of an example helical separator, according to some implementations.

FIG. 20 is a partial cross section of an example helical separator, according to some implementations. In particular, FIG. 20 includes a helical fluid separator 2000 to be positioned in a tubular in a wellbore and configured to separate nonproduction from production fluid. For instance, the helical fluid separator 2000 may be representative of the fluid separator 296 described in FIG. 2. The helical fluid separator 2000 may be positioned in a production tubing, above or below a junction in a multi-bore well, such as below the junction in the lateral or main bore leg, above the junction in the main bore production tubing, in production string to include main bore and lateral leg production, etc. Similar to the helical separator 1700 described in FIG. 17, the helical fluid separator 2000 may include components such as a packer, flow control device, ESP, etc. in any suitable position and/or combination, or may not include any additional components. The helical fluid separator 2000 may be configured with a helical profile 2004 on a body 2002. The pitch and/or width of the helical profile 2004 may be constant along the body 2002 and/or variable along the body 2002. The body 2002 may also include ports 2006 and a bullnose 2008. The operations of the helical fluid separator 2000 are described in FIG. 21.

Figure 21:
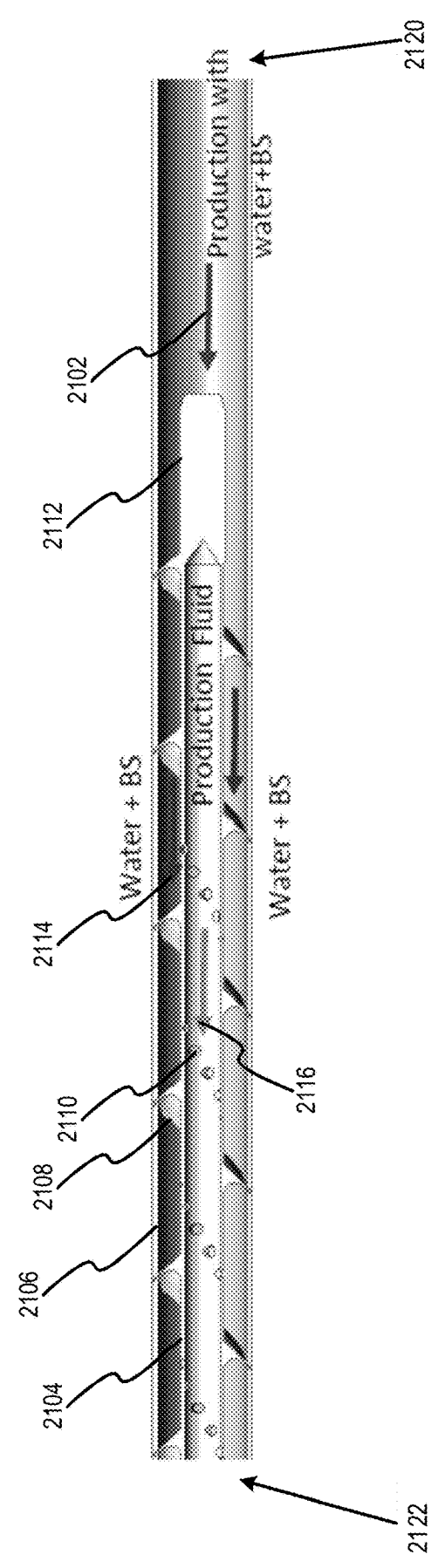
FIG. 21 is a partial cross section of an example helical separator, according to some implementations.

FIG. 21 is a partial cross section of an example helical separator, according to some implementations. In particular, FIG. 21 includes a helical fluid separator 2100 to be positioned in a tubular in a wellbore and configured to separate nonproduction from production fluid. For instance, the helical fluid separator may be representative of the fluid separator 296 described in FIG. 2 and helical fluid separator 2000 described in FIG. 20. Formation fluid 2102 (i.e., production fluid with water and sediment) may flow in a tubing 2106 from downhole 2120 towards uphole 2122. The formation fluid 2102 may interact with the helical profile 2180 on the helical separator 2104, resulting in a centrifugal movement of the formation fluid 2102. The centrifugal movement may push heavier phases (such as water and sediment 2114) outward toward the wall of the tubing 2106. Lighter phases (such as production fluid 2116, e.g., hydrocarbons) may be drawn radially inward. Thus, the production fluid 2116 may be drawn into the helical separator 2104 via one or more ports 2110 while the water and sediment 2114 remain on the outside of the helical separator 2104. Accordingly, the production fluid 2116 may be separated from the water and sediment 2114.

Figure 22:
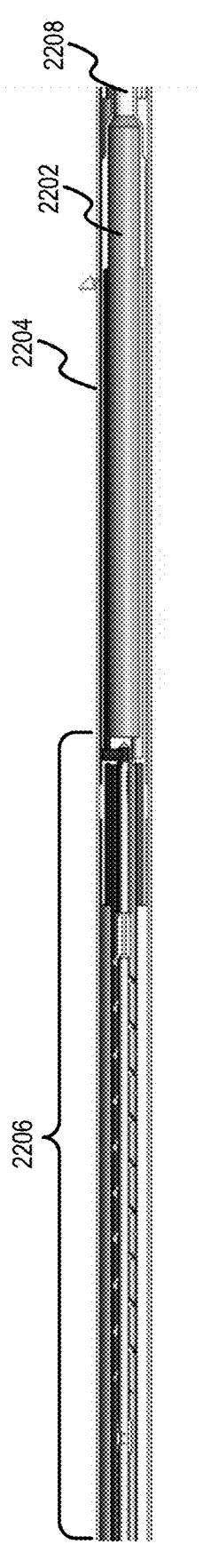
FIG. 22 is a partial cross section side view of a helical separator, according to some implementations.

FIG. 22 is a partial cross section side view of a helical separator, according to some implementations. In particular, FIG. 22 includes a separator system 2200 (that may be representative of separation system 200 described in FIG. 2) that may be positioned above or below (uphole or downhole) the junction, or in one or both laterals of a multi-bore lateral. The separator system 2200 include a helical separator 2206 (configured to separate sediment from fluid and/or production fluid from nonproduction fluid, as described in FIGS. 17-21), a gravity-type fluid separator 2202 configured to separate production fluid from nonproduction fluid (as described in FIGS. 3A-3C), and an inlet 2208 where formation fluid may enter the separator system 2200. The aforementioned components may be positioned in a casing 2204 of a well.

Figures 23A, 23B:
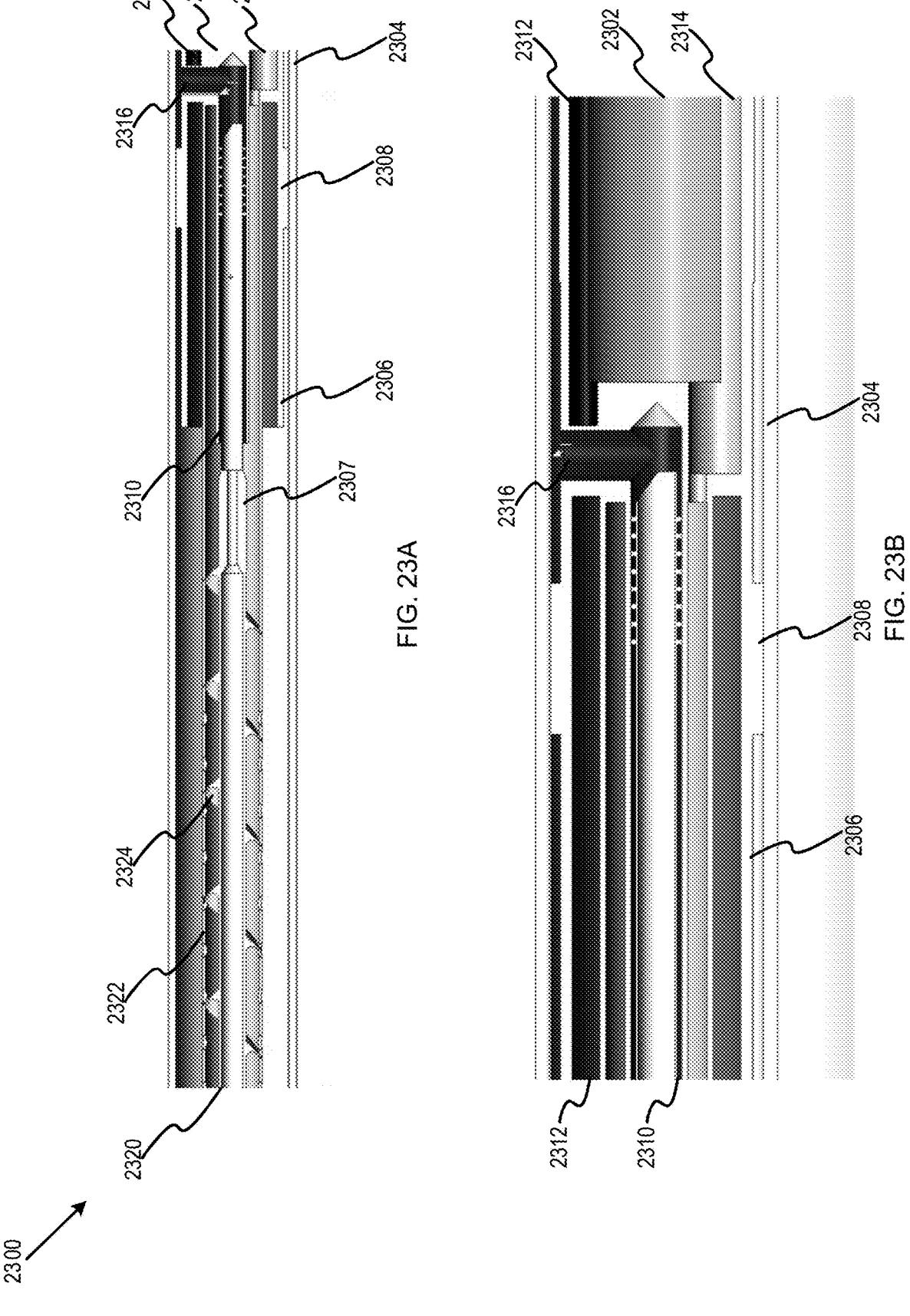
FIGS. 23A-23B are partial cross section views of a helical separator, according to some implementations.

FIGS. 23A-23B are partial cross section views of a helical separator, according to some implementations. In particular, FIGS. 23A-23B include a separator system 2300 (that may be representative of separation system 200 described in FIG. 2) that may be positioned above or below (uphole or downhole) the junction, or in one or both laterals of a multi-bore lateral. A gravity-type fluid separator 2302 may separate formation fluid into nonproduction fluid and production fluid. After separation, the production fluid may flow in the flow path 2312 between the casing 2304 and the ported tubing 2322. The nonproduction tubing may flow in the flow path 2314 and into the ported tubing 2322. Similar to the a helical sediment separator 1900 described in FIG. 19 the nonproduction fluid (water and basic sediment) may flow between the ported tubing 2322 and the helical separator 2320 to interact with the helical profile 2324. The centrifugal movement of the nonproduction fluid generated by the helical profile 2324 may result in sediment being separated from the water and pushed outwards (radially away from the helical separator 2320. The sediment may be pushed through one or more ports in the ported tubing 2322 and into the flow path 2312 of production fluid, between the ported tubing 2322 and a casing 2304. The water may continue uphole and enter the helical separator 2320 via a ported sub (not shown). A pump 2307 (such as an ESP) may pump the water through an outlet 2316 and into the annulus of the casing 2304. A packer 2308 may be positioned uphole of the outlet 2316 such that the water may be forced to flow downhole (i.e., towards a later or main bore of a multi-bore well to be injected into a subsurface formation surround the respective bore).

The helical profiles described in FIGS. 17-23 may be made of any suitable material such as elastomer, metal, etc. and integrated into the body of the helical separators. The pitch and width of the helical profiles may be variable to operate as a traditional hydrocyclone device and/or may be constant. The helical separators may function as sediment separators and/or fluid separators. In some implementations, a helical separator configured with a pump may be utilized as a sediment injector (such as the sediment injector 299 of FIG. 2). The helical separators may be removable to repair/ replace while the separation system remains in position in the wellbore. The helical separators may be cleaned of debris via a jetting tool (as described in FIG. 13) and/or flushed from the surface. In some implementations, one or more helical separators may be positioned in series or in parallel with one another to refine fluid (series), increase volume capacity (parallel), etc. In some implementations, one or more helical separators may be run in series or in parallel with one or more hydrocyclones.

One or more computers, such as computer 270, and sensors may monitor, control, diagnose, maintain, and repair, etc., the hydrocyclones, separators, devices, systems shown in FIGS. 4-23 in order to prevent premature failure(s) and increase efficiencies as described within.

Example Operations

Example operations are now described. FIGS. 24-25 is a flowchart of example operations for downhole fluid and solid separation, according to some implementations. Flowcharts 2400-2500 of FIGS. 24-25, respectively, are described in reference to FIGS. 1-2. However, other systems and components can be used to perform the operations now described. Operations of the flowcharts 2400-2500 continue between each other through transition points A and B. Operations of the flowchart 2400 start at block 2402.

At block 2402, production is initiated. For example, with reference to FIGS. 1-2, production may be initiated by the formation fluid 118 entering the main bore 102 and/or the lateral bore 104.

At block 2404, formation fluid is received into a downhole separation system. For example, with reference to FIGS. 1-2, the formation fluid 118 may be received into the separation system 124.

At block 2406, flow of formation fluid is separated into one or more flow paths. For example, with reference to FIGS. 1-2, the formation fluid 118 may flow into the fluid separator 296, wherein most or at least a majority of the production fluid 114 may separate into a flow above the separator 201, while most or at least a majority of the nonproduction fluid with sediment 294 may separate into a separate flow below the separator 201. Accordingly, if the formation fluid is at least partially segregated into oil-cut and water-cut, example implementations may take advantage of such a segregation to separate these fluids into two flow paths. Lower-density (oil-cut) fluids may flow through a top flow path. Higher-density (water-cut) may flow through a bottom flow path.

At block 2408, the flow rate is decreased. For example, with reference to FIG. 2, the formation fluid 118 moves from a smaller to a larger diameter of the tubing 287. This may decrease the velocity of the flow of the formation fluid 118—which allows the separation. In particular, most, or at least a majority of the production fluid 114 may separate into a flow above the separator 201, while most or at least a majority of the nonproduction fluid with sediment 294 may separate into a separate flow below the separator 201. This allows most of the sediment to be captured in the lower portion of the tubing 287 (below the separator 201). Accordingly, example implementations may reduce flow from a high-turbulent flow to a slower, less turbulent flow. Example implementations may provide more flow area (an increased pipe inner diameter, increased wellbore size, multilateral wellbore for settling ponds, distributing flow, etc.). Example implementations may also provide more time (start and stop flow, slow pumping action, etc.)

At block 2410, flow is modified to decrease turbulence. For example, example implementations may also stabilize turbulence and reduce flow from a turbulent flow to a laminar flow (or transitional flow) by one or means (including those mentioned above).

At block 2412, flow is separated into one or more flow paths. For example, with reference to FIG. 2, the formation fluid 118 may be separated into one or more flow paths via the fluid separator 296. Such separation may be applicable to different flows (e.g., formation fluids, oil-cut, water-cut, gas, liquid, liquid-gas, slurries (solids-laden fluids, production fluids, fluids to be disposed, fluids to be injected, etc.).

At block 2414, gravitational separation is performed. For example, with reference to FIG. 2, the fluid separator 296 may comprise a gravity-based separation that includes the separator 201.

At block 2416, non-gravitational separation is performed. For example, with reference to FIG. 2, the formation fluid 118 may be separated using different types of non-gravitational operations.

At block 2418, stepped-sized separation is performed. For example, with reference to FIG. 2, the sediment separators 290A-290N may separate the sediment 294 from the non-production fluid 116. For example, the sediment separators 290A-290N may separate out the largest or densest solids first, then separate out the next largest or densest solids, etc. Example implementations may include allowing for settling and separation of solids to separate from fluid stream(s). Additionally, example implementations may allow time for the largest and/or densest solids to settle out from fluids. Example implementations may also allow lower flow rates to assist with the separation. Example implementations may use the sediment separators 290A-290N to allow the largest and/or densest solids to settle out, accumulate and be trapped. Example implementations may include allowing time for lighter fluids and gases to begin to segregate and separate from heavier fluids. Example implementations may include means, methods, and devices to subject one or more fluids to one or more force, acceleration, path (e.g., tortuous path, etc.), velocity, pressure, restriction (e.g., screen opening(s), screen size, nozzle, etc.), time, impulse, change in one or more of the above including step change, gradual change, etc. Example implementations may separate based on at least one of density, size, shape, surface tension, molecular makeup, other chemical, physical, molecular, electron properties, etc.

At block 2420, solids and lighter fluids are accumulated. For example, with reference to FIG. 2, the different sediment separators 290A-290N may accumulate the sediment. The sediment separators may include one or more cyclonic solids separators such as hydrocyclones, helical separators, or any combination thereof. Each of the cyclonic solids separators may be configured to generate a centrifugal movement in the fluid to separate out the sediment from the fluid. The words sediment and solid may be used interchangeably.

Operations of the flowchart 2400 continue at transition point A, which continues at transition point A of FIG. 25. From transition point A of FIG. 25, operations continue at block 2502.

At block 2502, solids are separated and discharged into temporary holding tanks. For example, with reference to FIGS. 1-2, the different sediment separators 290A-290N may include solids accumulators configured with solids movers for storing the separated out solids. Example implementations may include utilizing a solids mover such as an auger, drag chain, an inclined plane, a jetting device, etc. to keep the solids or slurry from accumulating at the discharge end of the solid separation device which may cause the device to plug and become inoperable.

At block 2504, solids are transported for disposal. For example, with reference to FIG. 2, these different collections of the sediment by the different sediment separators 290 may be injected into a same or different line or tubing for disposal to a destination location such as the surface, a location in a bore of a multi-bore well, into the subsurface formation surrounding a bore of a multi-bore well, etc. As shown, the sediment injector(s) 299 are coupled to receive the sediment collected by the different sediment separators 290.

At block 2506, solids are transported to an injector. For example, with reference to FIGS. 1-2, the sediment may be transported to the sediment injectors 299.

At block 2508, solids may be mixed at the injector. For example, with reference to FIG. 2, the sediment 295 may be mixed at the sediment injector 299. For example, the sediment 295 may be mixed with fluid (such as production fluid, nonproduction fluid, etc.). In some implementations, one or more type of mixers may be used. For example, a mechanical mixer, a fluid-type mixer, etc. may be used to mix the sediment 295 with fluid. In some implementations, solids may be stored in or near the sediment injector 299 so that mixing may progress smoothly or consistently at a defined rate. For example, the solids may be stored in an enclosed tank, gravity-fed tank, auger-fed tank, etc. The distance of the sediment injector 299 from the other aforementioned devices may be 0-cm, 1-cm, 1-m, 10-m, 100-m, 500-m or a greater.

At block 2510, solids (or slurry) are injected. For example, with reference to FIGS. 1-2, the sediment injectors 299 may deliver the sediment to a different downhole location (such as a different lateral well, a thief zone (having a high porosity, high permeability downhole zone that may include a low pressure), etc.). In some implementations, sediment may be disposed to different locations depending on their size. For example, for sediment having a size greater than X, such solids may be delivered to the surface of the multilateral well for disposal. For sediment having a size less than X but greater than Y, such sediment may be disposed in a first downhole location (such as a thief zone). For the remaining sediment that have a size less than Y, such solids may be disposed in a second downhole location (such as a lateral well).

In some examples, the sediment (or solid) Y may be larger, or the same size as sediment X. As an example, if the first hole location is very permeable and may accept larger-size solids (or sediments), the larger size solids may be injected or disposed into the first downhole location and the smaller size solids may be either produced to the surface and/or injected or disposed into a second downhole location.

In some examples, X may range from 0.01 mm (10 microns) to larger than 8.00 mm (8000 microns). For example, X may range from medium silt to larger than medium gravel. In some examples, Y may be 0.01 mm (10 microns) or smaller. In some examples, X may range from 0.02 mm (20 microns) to 8.00 mm (8000 microns). For example, X may range from medium silt to larger than medium gravel.

In some examples, Y may be 0.02 mm (20 microns) or smaller. In some examples, Y may be 0.01 mm (10 microns) to 02 mm (20 microns). In some examples, X may range from 0.063 mm to 2.00 mm (63 microns to 2000 microns) (e.g., solids defined as sand per ISO 14688-1:2002). In some examples, Y may be 0.063 mm (63 microns) or smaller. In some examples, Y may be 0.02 mm (20 microns) to 0.063 mm (63 microns). In some examples, X may range from 0.075 mm to greater than 4.75 mm (75 to greater than 4750 microns). In some examples, Y be 0.075 mm (75 microns) or smaller.

In some examples, Y may be 0.02 mm (20 microns) to 0.075 mm (75 microns). In some examples, X may be greater than 4750 microns. In some examples, Y be 4.75 mm (4775 microns) or smaller. In some examples, Y may be 0.02 mm (20 microns) to 4.75 mm (4775 microns). In some examples, X may be greater than 0.6 mm (600 microns) (e.g., coarse sand and larger). In some examples, Y be 7.5 mm (75 microns) or smaller. In some examples, Y may be 0.02 mm (20 microns) to 7.5 mm (75 microns).

At block 2512, solids-laden fluid is transported. For example, with reference to FIGS. 1-2, the sediment injector(s) 299 may dispose of these sediments by injecting them into a tubing for delivery to the surface of the multilateral well. For example, the sediment may be delivered to the surface using the production tubing or a separate tubing. If the production tubing is used, the solids may be included with the production fluid that is being delivered to the surface. In such implementations, separation operations may be performed at the surface to separate out the solids from the production fluid 114. Accordingly, if sediment is being included with the production fluid 114 being delivered to the surface, the production fluid 114 may be delivered to surface equipment that provides for separation of the sediment. Alternatively, during the time when the sediment is not being included with the production fluid 114, the production fluid 114 may be delivered to different surface equipment that does not include such separation of sediment.

In some implementations, the sediment injectors 299 may inject the solids or slurry into a string or tubular (e.g., a production tubing). Timing of the injection may be coordinated with production of production fluid. For example, a pump may switch between pumping (in the production tubing) production fluid to the solid-laden fluid. Example implementations may include communications to the surface regarding the switching, the volume of the solids, fluids, slurry to be pumped, how much has been pumped, how much remains to be pumped, etc. Additionally, some implementations may enable communication from the surface to downhole to control and override the switching.

At block 2514, the injection process is monitored and controlled. For example, with reference to FIGS. 1-2, controllers may be coupled to the sediment injectors 299 for monitoring and controlling the injection and disposal of the sediment (either to the surface of the multilateral wall or to a disposal location downhole). Operations of the flowchart 2500 continue at transition point B, which continues at transition point B of FIG. 24. From transition point B of FIG. 24, operations return to operations at block 2404.

Example Multilateral Wells

Example implementations may be performed in different Technology Advancement of Multilaterals (TAML) Level wells. In particular, multilateral wells are characterized according to definitions established in 1997 during a Technology Advancement of Multilaterals (TAML) Forum held in Aberdeen. These standards classify junctions as TAML Level 1, 2, 3, 4, 5, or 6 based on mechanical complexity, connectivity, and hydraulic isolation. The ascending order of these levels reflects the increasing mechanical and pressure capability of the junction. Consequently, cost, complexity, and risk also generally increase at the higher TAML levels. However, other considerations of the well design also influence the overall complexity of the well—for example, a TAML Level 2 well with an advanced intelligent completion can be more complex and costly than a TAML Level 5 well with a simpler completion system.

In a TAML 1 well, the main bore, lateral, and junction are uncased. This basic lateral is designed to enhance reservoir drainage from consolidated formations. It has the advantage of low drilling and completion costs, but the open hole junction makes reentry into the lateral wellbore and control of flow from the lateral impossible.

Wells that have cased and cemented main bores and open hole laterals are designated TAML Level 2. A cemented main bore significantly reduces the risk of wellbore collapse and provides isolation between laterals. By placing sliding sleeves and packers in the main bore, operators can produce the bores singly or in commingle production.

Placing a liner in the lateral and mechanically connecting it to the cased and cemented main bore results in a TAML Level 3 well. A liner is a string of casing that does not extend to the surface but is anchored or suspended inside a previously run casing string. This TAML Level 3 well includes a lateral that is cased but not cemented at the junction. It is a relatively low-cost option that includes reentry capabilities and a lateral that is better supported than that of Levels 1 and 2. Using sliding sleeves and packer plugs, operators can produce the bores singly or in commingle production. A TAML Level 3 junction does not provide hydraulic isolation, and its use is restricted to consolidated formations.

TAML Level 4 junctions are applicable in both consolidated and unconsolidated formations because both the lateral and the main bore are cased and cemented at the junction. The junction provides full bore access to the lateral, and mechanical support is supplied by the tubulars and cement. However, because the cement can only withstand limited differential pressure, the junction does not provide hydraulic isolation.

TAML Level 5 wells do provide hydraulic isolation at the junction because pressure integrity is provided by the completion, which includes production tubing connecting a packer in the main wellbore above the junction and a packer in the lateral wellbore. Because hydraulic isolation and support are provided by the completion hardware, the junction may be a TAML Level 2, 3, or 4 before the Level 5 completion is installed. TAML Level 6 wells also provide hydraulic isolation at the junction. A well at this level differs from a TAML Level 5 well in that pressure integrity is provided by the main wellbore casing and a cemented or uncemented liner in the lateral. The cost and complexity of creating a single-metal-element dual-bore casing junction downhole has prevented TAML Level 6 wells from being developed. As of today, the category exists as a result of early experiments. Because multilateral wells that have higher TAML designations are generally more complex, they are more costly, and their configurations are more flexible. As they do with multilateral geometry, engineers choose a TAML level junction based primarily on reservoir characteristics, costs, and function.

The ability to reenter the lateral for well intervention operations is another multilateral well design consideration. Because it is a directionally drilled section that has no junction, the lower lateral is almost always easily accessed using standard intervention methods. Operators must make an economics-based decision during the well planning stage to include junctions that allow lateral access after pulling the upper completion, through-tubing access, junctions that can be adopted to allow access after installation or junctions through which no access is possible to main bore, lateral, or both. If the well includes more than one lateral, a selective through-tubing access system would need to be considered. The decision to deploy lateral junctions that allow full bore or restricted access is a function of the overall well design. Engineers usually opt for full bore access if a packer is to be placed below the junction or if an artificial lift system must be located near the lower lateral. In addition, based on their knowledge of the reservoir, operators may require full bore access to perform perforating, stimulation, logging, water shutoff, gravel packing, cleanout, and other remedial operations. Full bore access can be adapted to all TAML level junctions but must be specified before installation; some commercially available junctions allow no access or only restricted access to either the lateral or the main bore and cannot be adapted after installation.

The decision to use a multilateral well system and what type to use are the result of cost benefit analyses. In general, the less-complex junctions present operators with lower risks and costs. But risk mitigation and cost savings must be balanced against individual well and field development expectations. In low-value reservoirs, a simple open hole lateral that has no reentry capability may increase ultimate reserve recovery or accelerate production while having little impact on overall drilling and completion costs. In high-value deepwater plays, installing a hydraulically sealed TAML Level 5 or 6 junction can drive total well costs into millions of dollars and still be a good investment because it may save drilling another well with a complex and tortuous trajectory, preserve a well slot on an existing production platform, or eliminate the need entirely to procure and install additional subsea infrastructure.

In implementations, a multilateral well is drilled and completed with a TAML Level 4 junction. The junction includes a pump and a fluid separator. The pump includes any pump capable of drawing in fluid through the pump intake, pressurizing it, and lifting it to the surface such as an electrical submersible pump, sucker-rod and pump jack, progressive cavity pump, gas lift and intermittent gas lift, reciprocating and jet hydraulic pumping systems, etc. The fluid separator and the pump can be above, at, or below the junction. The upper completion includes a retrievable electrical submersible pump packer while the lower completion has an orientation liner hanger or other orientation device.

While the aspects of the disclosure are described with reference to various implementations and exploitations, it will be understood that these aspects are illustrative and that the scope of the claims is not limited to them. Many variations, modifications, additions, and improvements are possible. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

In some implementations, a mechanical junction (not to be confused with the earthen junction of 2 earthen wellbores) may comprise a junction with a monolithic Y-Block. In some implementations, a monolithic Y-Block may provide for more robust connections to the other components of a junction assembly (i.e., main bore leg, lateral leg, tank, etc.).

Figure 26:
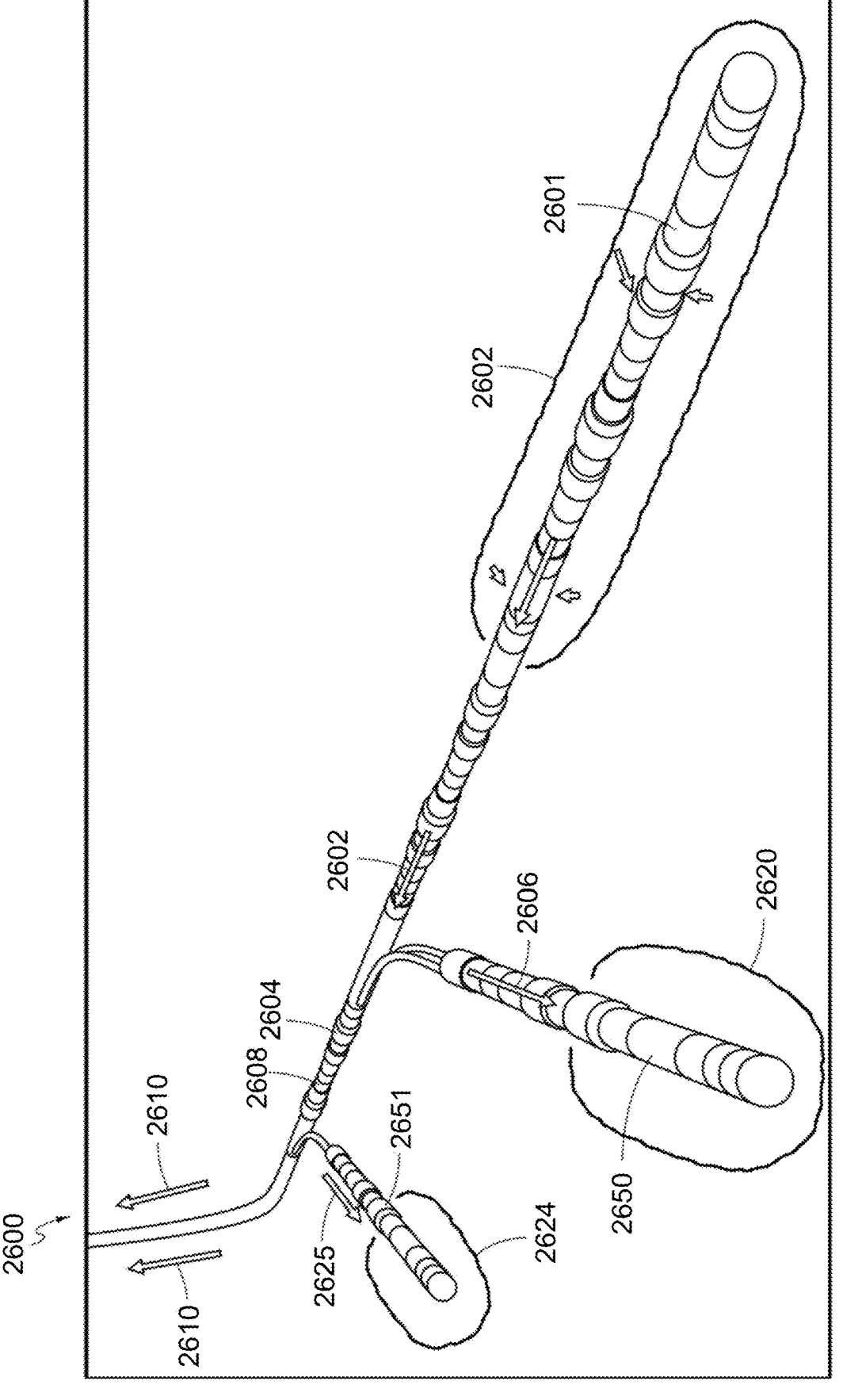
FIG. 26 is a perspective view of an example of a Level 5 (mechanical) junction assembly for use with a downhole oil, water, and solids separator system, according to some implementations.

To illustrate, FIG. 26 is a perspective view of an example of a Level 5 (mechanical) junction assembly for use with a downhole oil, water, and solids separator system, according to some implementations. FIG. 26 depicts a system 2600 having a multilateral well that includes a main bore 2601, a lateral bore 2650, and a lateral bore 2651. Formation fluid 2602 from the surrounding subsurface formation enters the main bore 2601. The formation fluid 2602 is transported through the main bore 2601 uphole to a level 5 monolithic Y-block 2604 and into a DOWSS 2608.

The DOWSS 2608 may process the formation fluid 2602 to separate out nonproduction fluid 2606 from production fluid 2622. The DOWSS 2608 may also process the formation fluid 2602 to separate sediment from at least one of the nonproduction fluid 2606 or the production fluid 2622. The DOWSS 2608 may transport the nonproduction fluid 2606 into the lateral bore 2650 for disposal in a disposal zone 2620 for the nonproduction fluid 2606 in the subsurface formation around the lateral bore 2650. The DOWSS 2608 may also transport sediment 2625 into the lateral bore 2651 for disposal in a disposal zone 2624 for the sediment 2625 in the subsurface formation around the lateral bore 2651. The DOWSS 2608 may also transport the production fluid 2622 and sediment 2625 to a surface of the multilateral well. Accordingly, in this example, the sediment may be disposed downhole into a highly permeable zone downhole and/or may be transported to the surface of the multilateral well.

Figure 27:
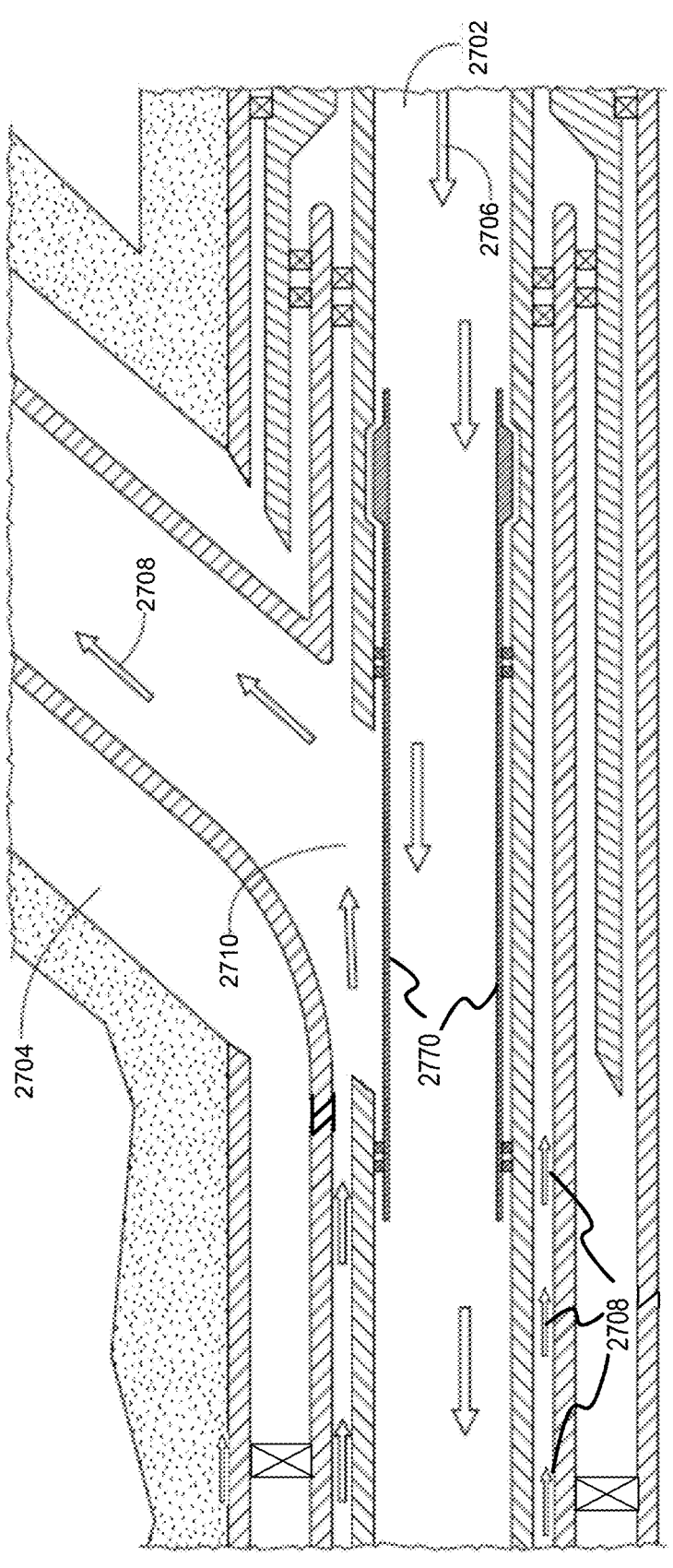
FIG. 27 is a cross-sectional view of an example of a Level 5 junction assembly for use with a downhole oil, water, and solids separator system, according to some implementations.

FIG. 27 is a cross-sectional view of an example of a Level 5 junction assembly for use with a downhole oil, water, and solids separator system, according to some implementations. In this implementation, a main bore junction 2710 is used to provide a main bore 2702 for large tools to be passed through, or landed, in the y-block and/or main bore area of the junction 2710. A lateral bore 2704 is formed off the main bore 2702 at the junction 2710. In the example shown, an isolation sleeve 2770 may be landed in the junction. As shown, the isolation sleeve 2770 may provide pressure isolation between the formation fluids 2706 and the non-production fluids 2708. This main bore junction 2710 may be used with a variety of different Downhole Oil Water Separator Systems (DOWSS) and/or components including the DOWSS and/or its components disclosed within herein. The main bore junction 2710 may have a main bore leg inside diameter (ID) of 30% the outer diameter (OD) of the Junction's Y-Block. The main bore leg's ID may be 40% the OD of the Junction's Y-Block. The main bore leg's ID may be 50%, 53%, 55%, 60%, 67% or more of the Junction's Y-Block OD.

Figure 28A:
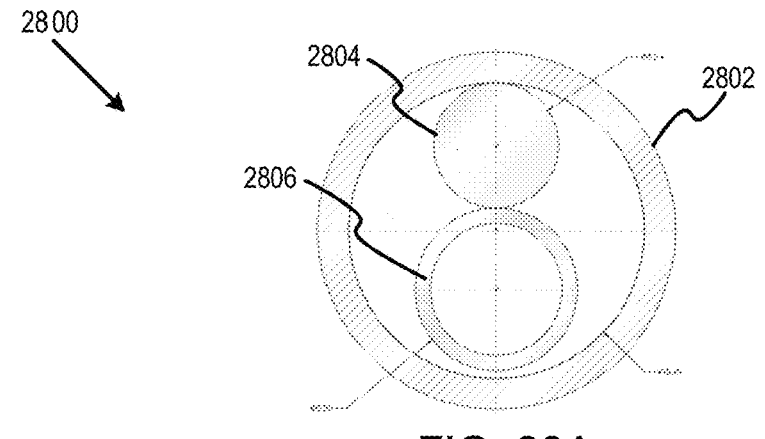
FIGS. 28A-28C are cross-sectional views of an example DOWSS positioned in a casing, according to some implementations.
Figure 28B:
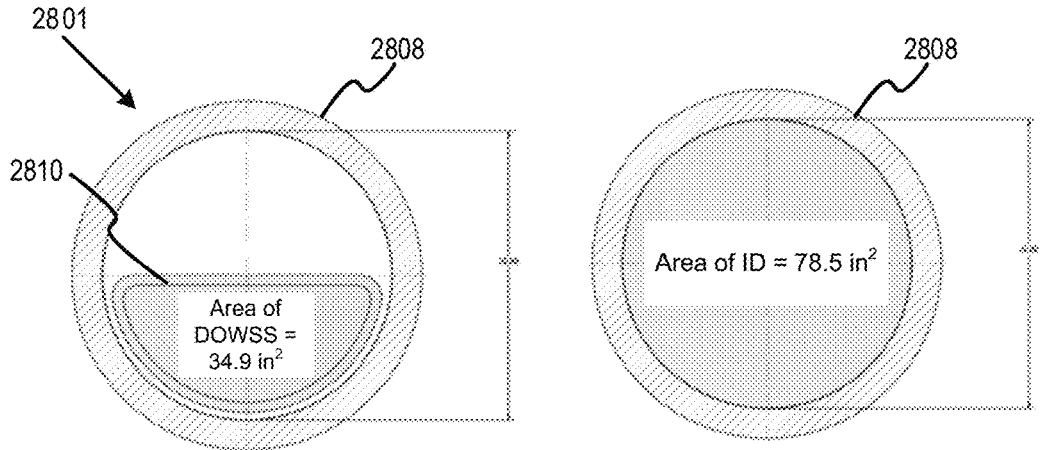
Figure 28C:
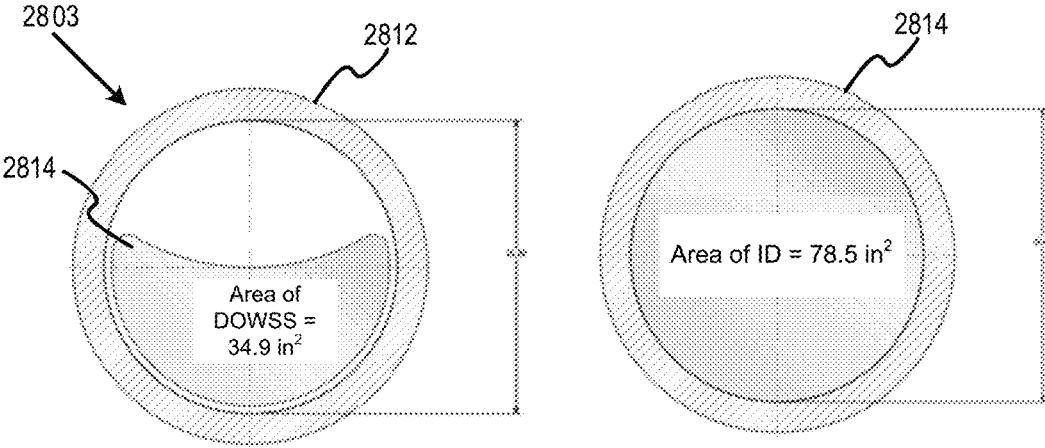

To help illustrate, FIGS. 28A-28C are cross-sectional views of an example DOWSS positioned in a casing, according to some implementations. FIG. 28A includes a DOWSS cross section view 2800 of a DOWSS 2806 in the inner bore of a casing 2802. As shown, the DOWSS 2806 and/or related equipment occupies approximately 55% of the inner diameter of the casing 2802. Accordingly, the remaining diameter may allow for a tool 2804 or to pass by the DOWSS. FIG. 28B includes a DOWSS cross section view 2801 of a DOWSS 2810 in the inner bore of a casing 2808. As shown in this implementation, the inner bore of the casing 2808 is approximately 78.5 square inches and the DOWSS 2810 occupies about 34.9 square inches, or approximately 44% of the flow area. Thus, the remaining area may remain open for tools to pass by the DOWSS 2810 for cleaning, servicing, parts replacement, etc. on the DOWSS 2810, related equipment, or other equipment/areas past the DOWSS 2810 in a well. The DOWSS 2810 may occupy any suitable space of the inner bore of the casing 2808. FIG. 28C includes a DOWSS cross section view 2803 of a DOWSS 2814 in the inner bore of a casing 2812. Similarly to FIG. 28B, the inner bore of the casing 2812 is approximately 78.5 square inches and the DOWSS 2814 occupies about 34.9 square inches, or approximately 44% of the flow area. Thus, the remaining area may remain open for tools to pass by the DOWSS 2814 for cleaning, servicing, parts replacement, etc. on the DOWSS 2814, related equipment, or other equipment/areas past the DOWSS 2814 in a well. In some implementations, the outer profile of the DOWSS 2814 may be shaped to provide functions such as support tools that pass over the DOWSS 2814, provide a sealing surface for service tools to seal against, provide features for the service tools to attach themselves to (such as to replace components, flush debris, lubricate one or more components, etc.), etc.

Figure 29:
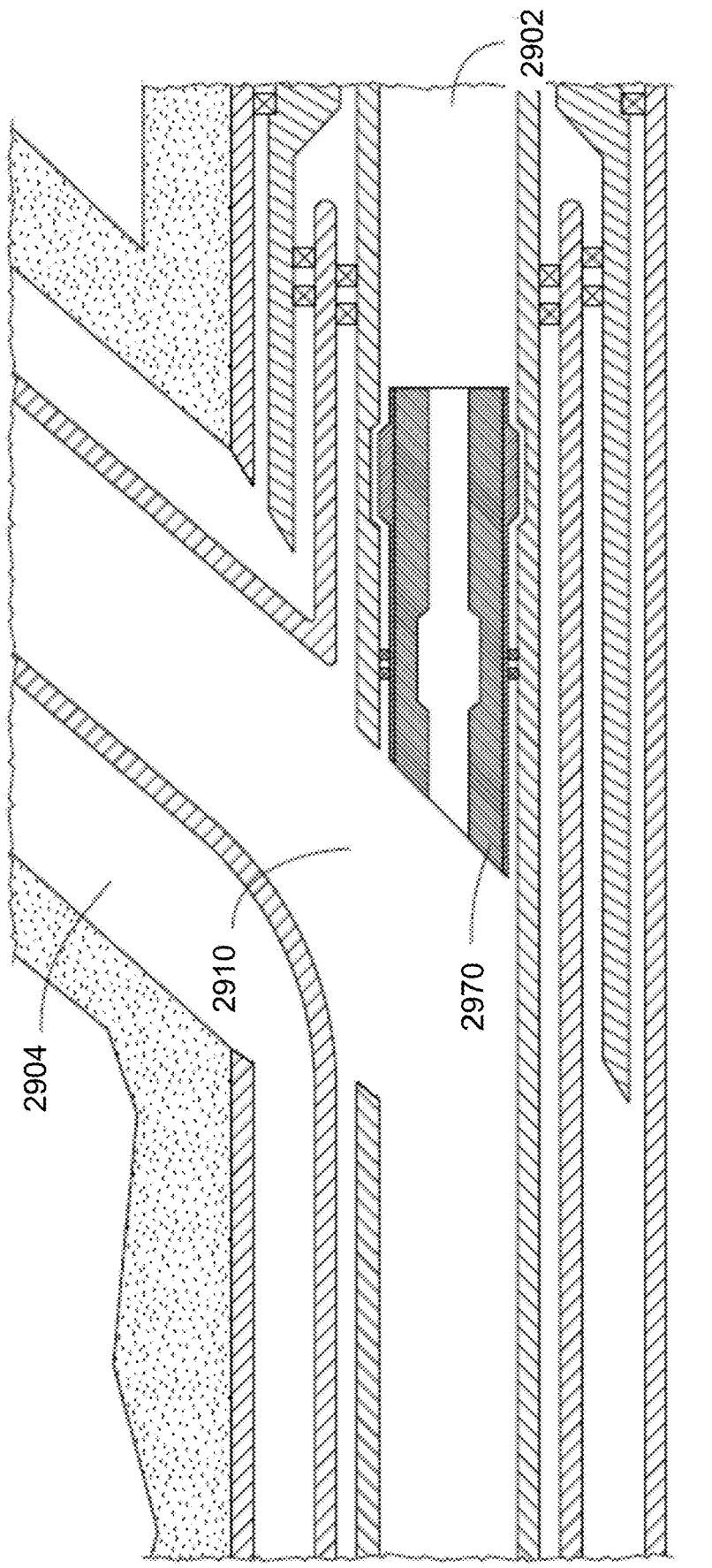
FIG. 29 is a cross-sectional view of an implementation where the isolation sleeve can be shifted out of the way (or retrieved) and a deflection device installed to aid in deflecting one or more tools or devices out into a lateral bore, according to some implementations.

FIG. 29 is a cross-sectional view of an implementation where the isolation sleeve can be shifted out of the way (or retrieved) and a deflection device installed to aid in deflecting one or more tools or devices out into a lateral bore, according to some implementations. FIG. 29 depicts a main bore 2902 and a lateral bore 2904 that is formed off the main bore 2902 at the junction 2910. An isolation sleeve 2970 may be shifted out of the way (or retrieved) to allow for a deflection device to be installed to aid in deflecting one or more tools or devices out into the lateral bore 2904.

Figure 30:
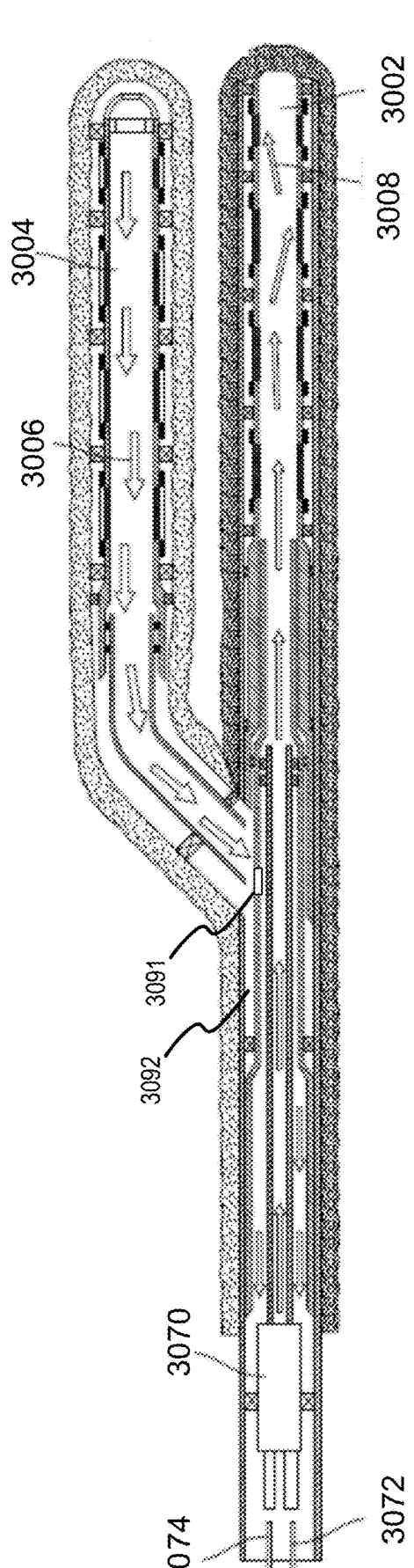
FIG. 30 is a cross-sectional view of a multilateral tool implementation of one or more DOWSS implementations with a non-Level 5 junction, according to some implementations.

FIG. 30 is a cross-sectional view of a multilateral tool implementation of one or more DOWSS implementations with a non-Level 5 junction, according to some implementations. In this example, the multilateral well is producing from a lateral bore 3004 (instead of the main bore 3002) so the earthen junction is not over-pressure by fluid being injected in its surroundings. Formation fluid 3006 is being produced from a subsurface formation surrounding the lateral bore 3004. A DOWSS 3070 may receive the formation fluid 3006 and separate the formation fluid 3006 into a nonproduction fluid 3008, a sediment 3072, and a production fluid 3074. As shown, the nonproduction fluid 3008 may be disposed of downhole by being transported into the main bore 3002 for disposal in the surrounding subsurface formation. The sediment 3072 may be disposed of downhole and/or transported to the surface of the multilateral well. The production fluid 3074 may be transported to the surface of the multilateral well.

The above examples of junctions are provided as non-limiting examples—as other type of junctions may be used. The placement of the DOWSS, the DOWSS components, the tubing/fluid paths are also non-limiting examples—as other placements, components, paths may be used. The terms "downhole" and "below" may or may not be considered equivalent depending on the type of wellbore. For example, "downhole" and "below" may be considered the same for vertical wellbores. However, "downhole" and "below" may be considered different for horizontal wellbores.

Example Subsea DOWSS (Downhole Oil Water Solids Separation)

Example implementations may include Subsea Oil Water Solids Separation (SOWSS). Example implementations may include disposal of solids, storage of water, and oil maybe subsea—on the seafloor or in storage wells or in storage vessels embedded in the seafloor.

Figure 31:
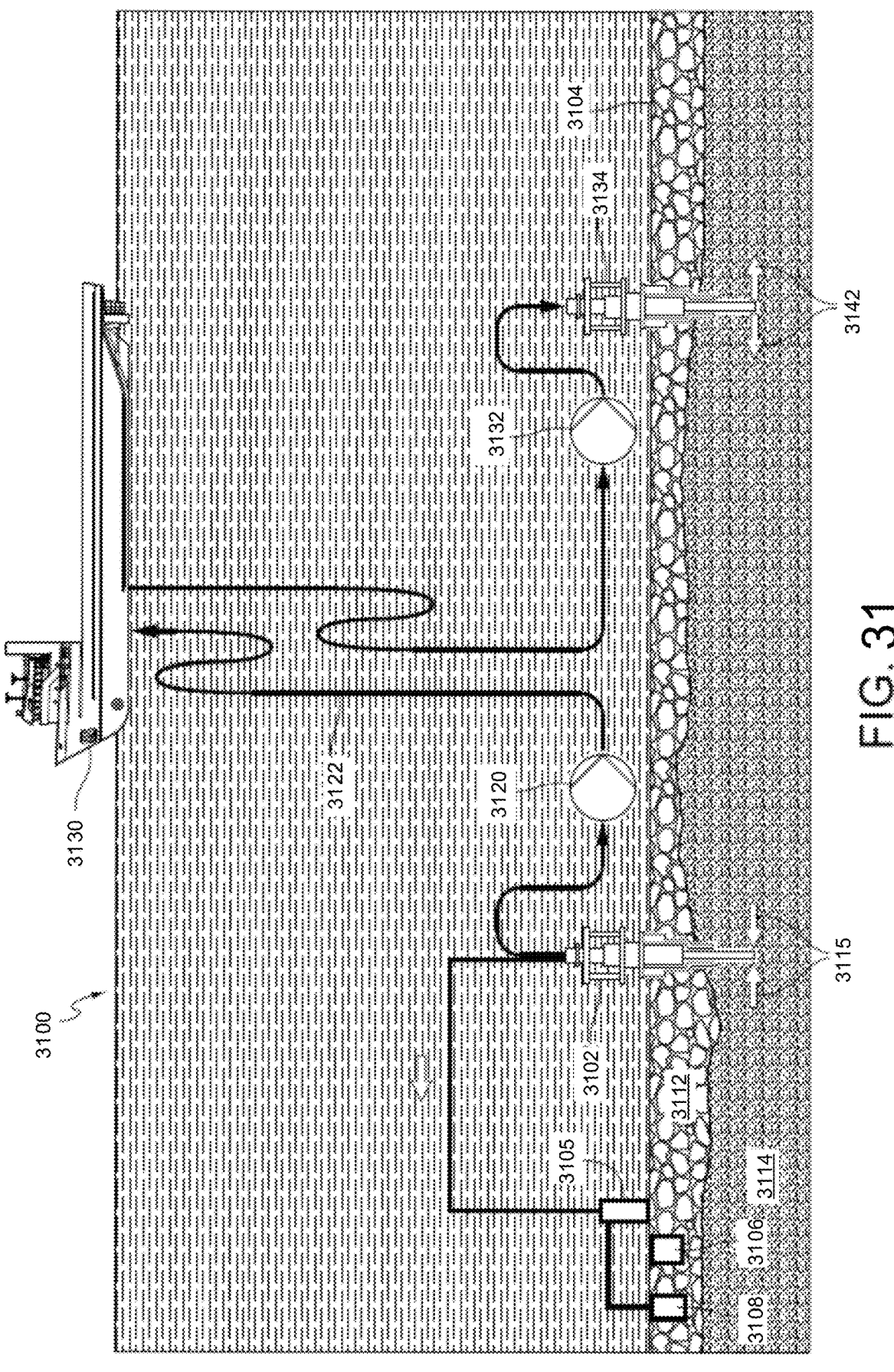
FIG. 31 is a perspective view of a first example subsea DOWSS, according to some implementations.

FIG. 31 is a perspective view of a first example subsea DOWSS, according to some implementations. FIG. 31 includes a subsea DOWSS 3100 that includes a subsea production well 3102 formed in a subsea surface 3104. The subsea production well 3102 may be formed through rock 3112 and a reservoir 3114. As described herein, production fluid (such as hydrocarbons 3115) and possibly nonproduction fluid, sediment, etc. may be transported from downhole to a surface of the subsea production well 3102.

In some implementations, this fluid transported to the surface of the subsea production well 3102 may be transported to a ship 3130 via a multiphase pump 3120 and risers 3122. The ship 3130 may include equipment to separate out nonproduction fluid (such as water) from the production fluid. The ship 3130 may also include storage for the production fluid. As shown, the nonproduction fluid (such as water) separated out from the production fluid by equipment of the ship 3130 may be transported down below to a subsea injection well 3134 via a water injection pump 3132. The water 3142 may be pumped downhole into the subsea injection well 3134. As shown, the water 3142 may be returned for storage in the reservoir 3114.

In some implementations, at least some of the fluid transmitted to the surface of the subsea production well 3102 may remain below (instead of being transported to the ship 3130). For example, after being transported to the surface, the fluid may be transported to a location 3105 at the subsea surface 3104 for processing, separating, pumping, etc. Then, the nonproduction fluid (separated out from this fluid) may be stored below the subsea surface 3104 at a location 3108. Additionally, the production fluid (separated out from this fluid) may be stored below the subsea surface 3104 at a location 3106. In some implementations (even though not shown), sediment (solids) separated out from this fluid may be stored at or under the subsea surface 3104.

Accordingly, fluid from the subsea production well 3102 may be pumped to subsea surface 3104 for processing, temporary storage, transport, water injection to maintain reservoir pressure, water flood from the subsea injection well 3134 to push hydrocarbons to the subsea production well 3102 and/or disposal.

In some implementations, the solids may be flowed to the sea floor and then injected into a disposal well (or other designated well). In some implementations, the solids, non-commercial fluids, a combination of both, etc. may be produced, separated, processed, stored, and then injected into the disposal well (or other designated well).

Figure 32:
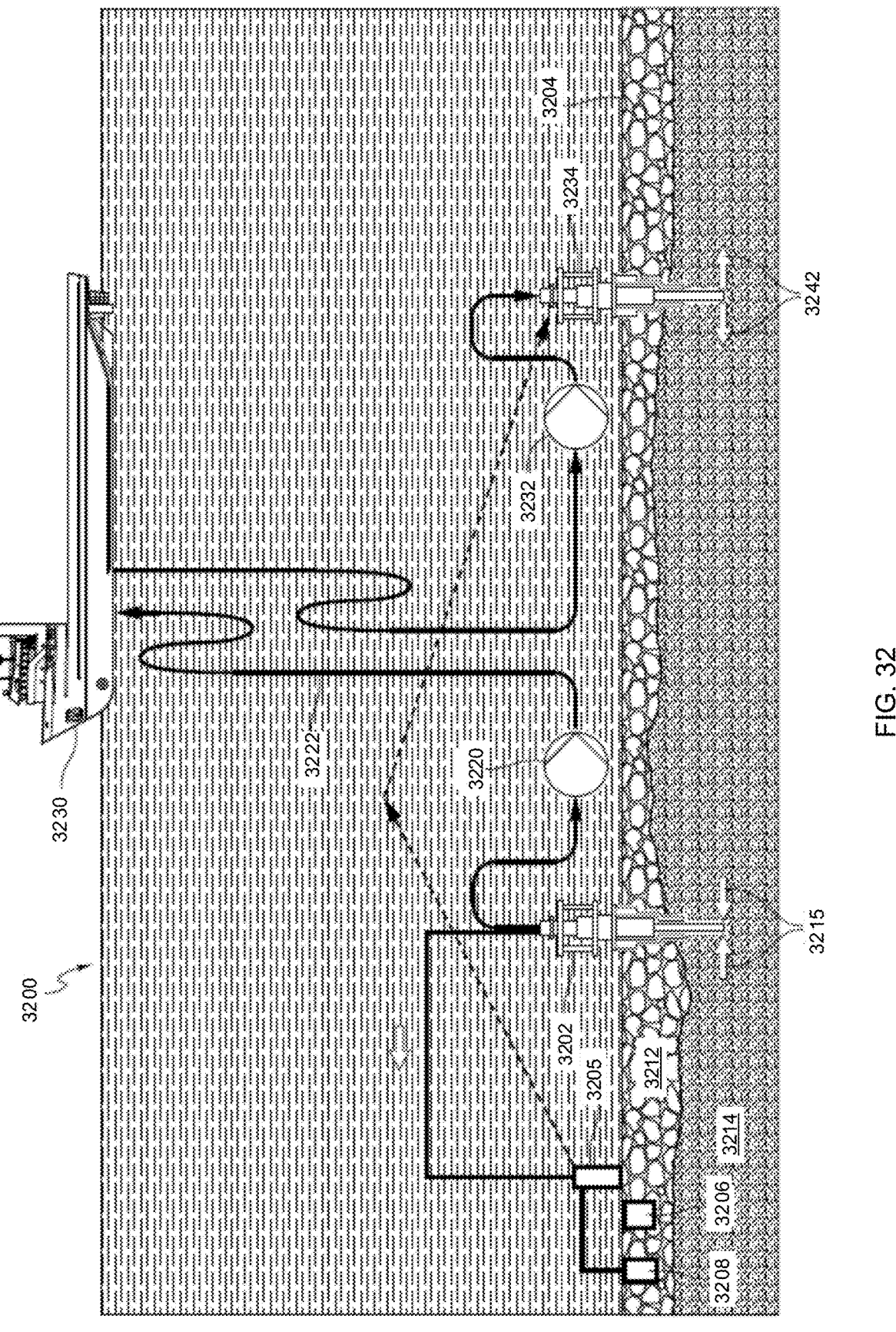
FIG. 32 is a perspective view of a second example subsea DOWSS, according to some implementations.

To illustrate, FIG. 32 is a perspective view of a second example subsea DOWSS, according to some implementations. Offshore drilling rigs (on occasion) inject used drilling mud into a disposal well. FIG. 32 includes a subsea DOWSS 3200 that includes a subsea disposal well 3234 used for injection of used drilling mud (solids (drill cuttings) 3242). The subsea DOWSS 3200 also includes a subsea production well 3202. As shown, the subsea disposal well 3234 and the subsea production well 3202 may be formed in a subsea surface 3204. The subsea disposal well 3234 and the subsea production well 3202 may be formed through rock 3212 and a reservoir 3214. As described herein, production fluid (such as hydrocarbons 3215) and possibly nonproduction fluid, sediment, etc. may be transported from downhole to a surface of the subsea production well 3202.

In some implementations, this fluid transported to the surface of the subsea production well 3202 may be transported to a ship 3230 via a multiphase pump 3220 and risers 3222. The ship 3230 may include equipment to separate out nonproduction fluid (such as water) from the production fluid. The ship 3230 may also include storage for the production fluid. As shown, the solids (drill cuttings) separated out from the production fluid by equipment of the ship 3230 may be transported down below to the subsea disposal well 3234 via a pump 3232. The solids (drill cuttings) 3242 may be pumped downhole into the subsea disposal well 3234 for storage in the reservoir 3214.

In some implementations, at least some of the fluid transmitted to the surface of the subsea production well 3202 may remain below (instead of being transported to the ship 3230). For example, after being transported to the surface, the fluid may be transported to a location 3205 at the subsea surface 3204 for processing, separating, pumping, etc. Then, the nonproduction fluid (separated out from this fluid) may be stored below the subsea surface 3204 at a location 3208. Additionally, the production fluid (separated out from this fluid) may be stored below the subsea surface 3204 at a location 3206. The solids (drill cuttings) separated out from this fluid may be stored downhole in the subsea disposal well 3234.

Figure 33:
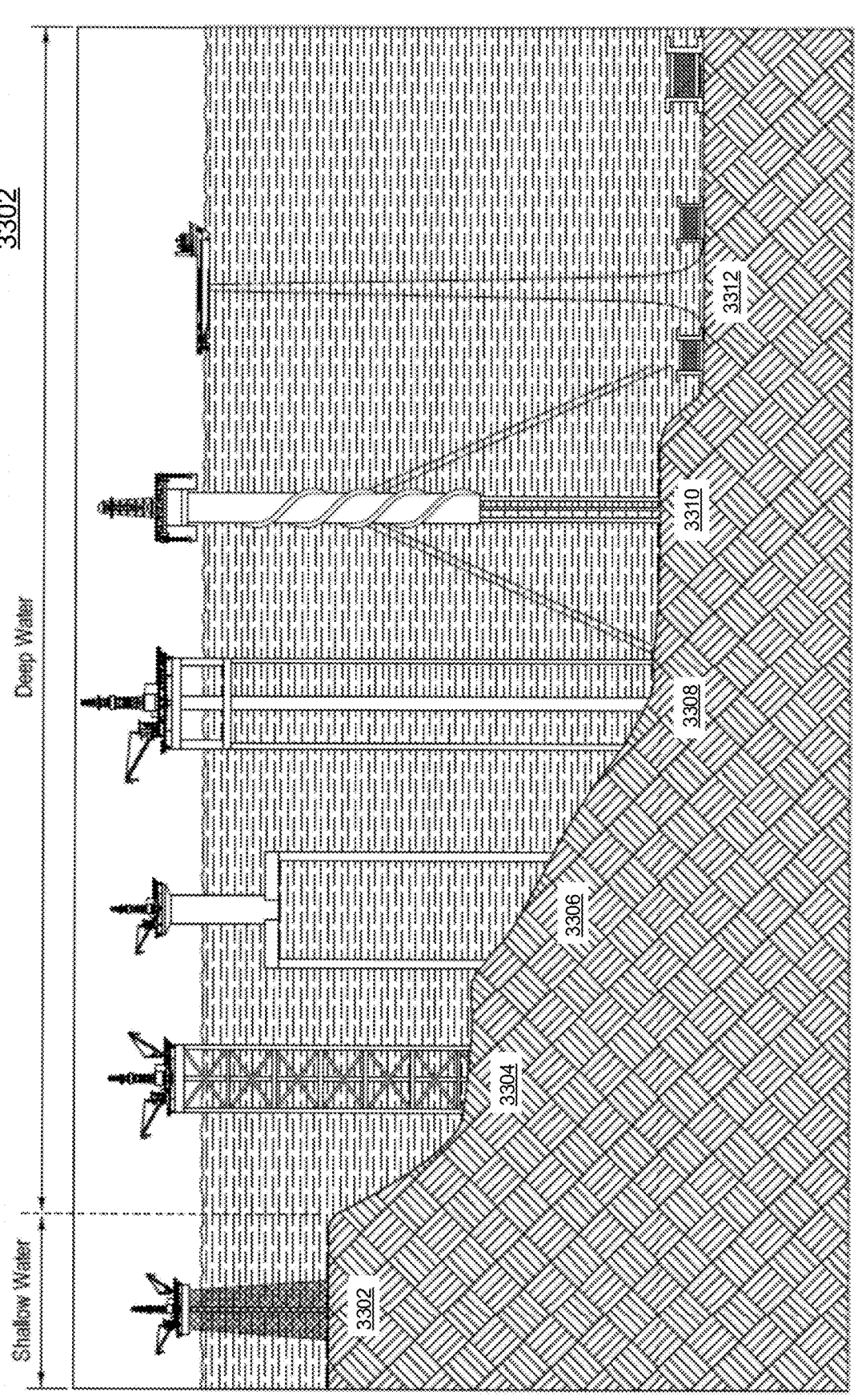
FIG. 33 is a perspective view of types of offshore well that may benefit from example implementations, according to some implementations.

FIG. 33 is a perspective view of types of offshore well that may benefit from example implementations, according to some implementations. The lifting cost of producing formation water from 3000 meters (m) is very costly. The cost of lifting solids in a high-velocity rate is extremely erosive and costly. Separating out the solids and then lifting them at a slower rate will decrease the amount erosion. FIG. 33 depicts a number of offshore wells at different depths. In particular, FIG. 33 depicts a fixed platform well 3302 (that may be used up to 200 m), a compliant piled tower well 3304 (that may be used between 200-500 m), a tension leg platform (TLP) well 3306 (that may be used between 300-1500 m), a semi floating production system (FPS) well 3308 (that may be used between 300-2000 m), a single point anchor reservoir (SPAR) platform well 3310 (that may be used between 300-2000 m), and a floating production systems—FPSO and subsea well 3312 (that may be used up to 3000 m).

Figure 34:
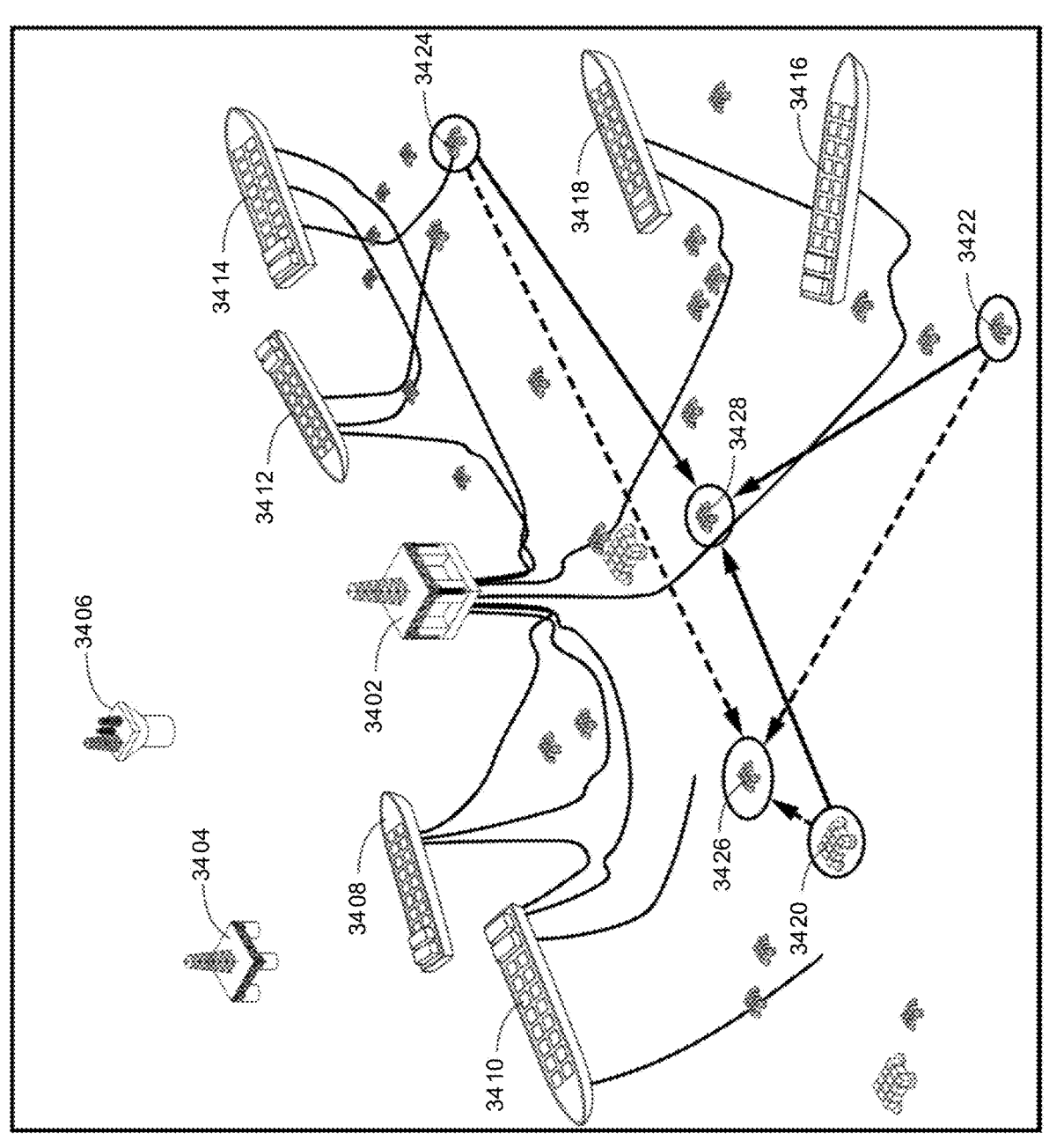
FIG. 34 is a perspective view of an example subsea downhole oil water solids separation, according to some implementations.

FIG. 34 is a perspective view of an example subsea downhole oil water solids separation, according to some implementations. FIG. 34 depicts a number of offshore rigs—an offshore rig 3402, an offshore rig 3404, and an offshore rig 3406. FIG. 34 also depicts a number of ships-a ship 3408, a ship 3410, a ship 3412, a ship 3414, a ship 3416, and a ship 3418. The offshore rigs 3402-3406 and the ships 3408-3418 may include equipment to separate out nonproduction fluid (such as water) from the production fluid. The offshore rigs 3402-3406 and the ships 3408-3418 may also include storage for the production fluid, the nonproduction fluid, etc.

FIG. 34 also depicts a number of production wells-a production well 3420, a production well 3422, and a production well 3424. FIG. 34 also depicts a water disposal well 3426 and a solids disposal well 3428. The fluids/solids from the production wells 3420-3424 may be transported to any of the oil rigs 3402-3406, any of the ships 3408-3418 or another subsurface well. For example, the nonproduction fluid and the solids from the production wells 3420-3424 may be transported to the water disposal well 3426 and the solids disposal well 3428, respectively. Additionally, production fluid processing and separation, nonproduction fluid processing and/or solids processing may occur at one of more of the locations identified in FIG. 34.

Figure 35:
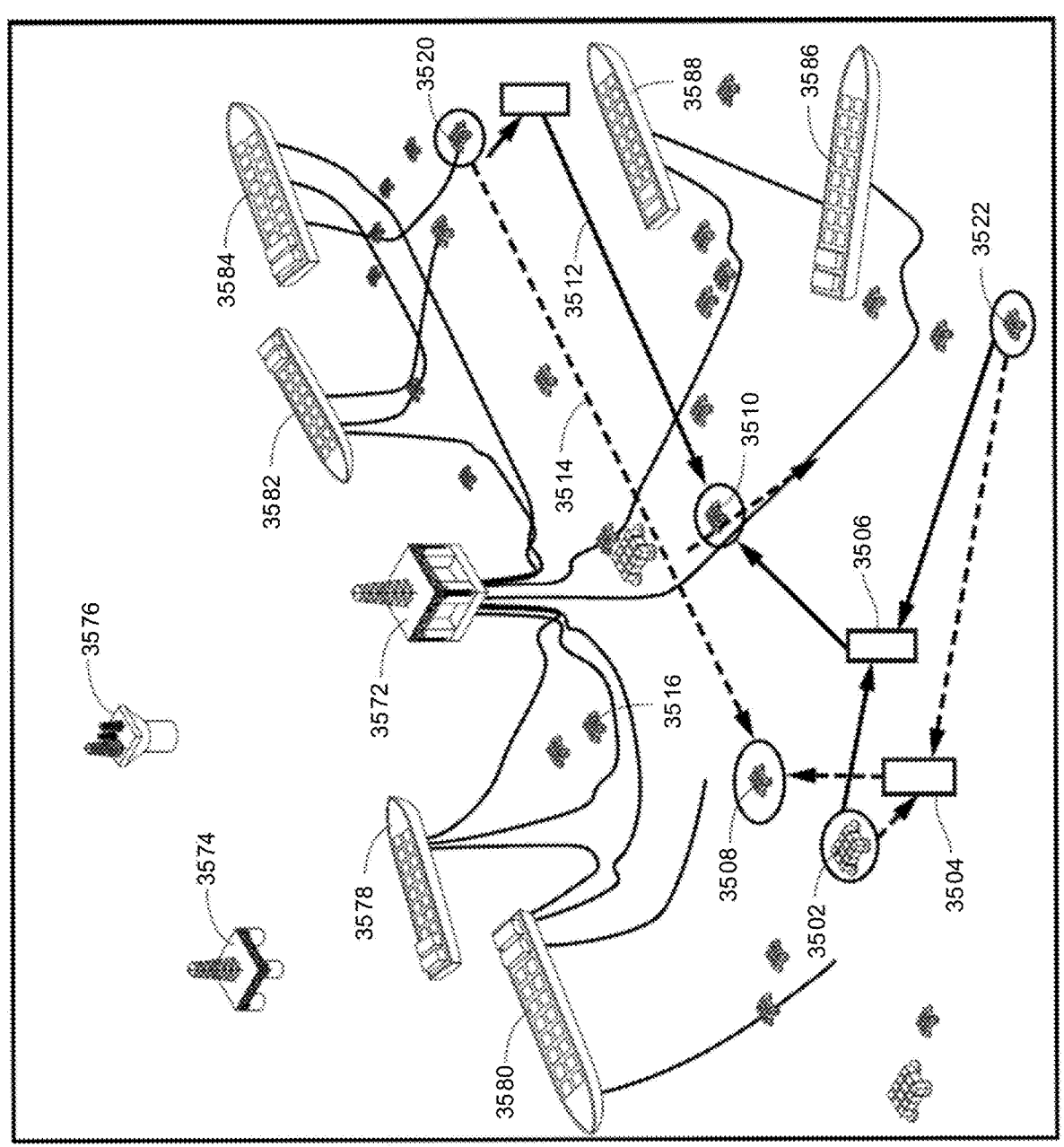
FIG. 35 is a perspective view of example locations in which example implementations may be used.

FIG. 35 is a perspective view of example locations in which example implementations may be used. FIG. 35 includes 11 example locations. A first example location includes a well 3502 where fluids may exit the well or are injected therein. A second example location includes an oil-cut processing unit 3504. For example, a flow diverter may divert oil-cut fluid to an oil-cut processing unit 3504. The oil-cut processing unit 3504 may include a flow diverter to remove more water from an oil-cut fluid. In some implementations, a flow diverter may divert solids, slurry, sludge, etc. to a solids processing unit 3506. Such solids, slurry, sludge, etc. may then be stored in a storage container or disposal well 3510. Flow diverter may be part of the storage container or disposal well 3510 to remove more oil from the slurry. The solids processing unit 3506 may include a flow diverter to remove more oil from the slurry.

FIG. 35 also depicts a number of offshore rigs—an offshore rig 3572, an offshore rig 3574, and an offshore rig 3576. FIG. 35 also depicts a number of ships-a ship 3578, a ship 3580, a ship 3582, a ship 3584, a ship 3586, and a ship 3588. The offshore rigs 3572-3576 and the ships 3578-3588 may include equipment to separate out nonproduction fluid (such as water) from the production fluid. The offshore rigs 3572-3576 and the ships 3578-3588 may also include storage for the production fluid, the nonproduction fluid, etc.

Another example location may include an oil storage and transfer unit 3508. Another example location may include a solids or slurry transfer line 3512. For example, a flow diverter may help mix, remix, stir, or agitate solids to keep them in suspension in the solids or slurry transfer line 3512. Another example location may include a production fluids/ oil-cut fluid/fluid transfer line 3514. For example, a flow diverter may help mix, remix, stir, or agitate solids and the fluids to keep them flowing properly in the production fluids/oil-cut fluid/fluid transfer line 3514. Another example location may include a well 3516 with vertical, inclined, sloped, deviated, tortuous paths.

Another example location may include a multilateral well 3518 (that includes a lateral wellbore, junction, etc. Another example location may include a horizontal well 3520. Another example location may include a main production transfer line 3522 to another subsea pumping, gathering, and/or processing station or to land-based pumping, gathering, and/or processing facility.

Unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

Unless otherwise specified, the phrase cyclonic solids separator, hydrocyclone, hydrocyclone system, desander, desilter, centrifuge, helical separator, or other separating devices that use gravity or artificial gravity shall be construed as a device positioned downhole to separate sediment from a fluid.

It should be noted that the DOWS system and components noted above may be inclusive of all items from the wellhead to the toe of each wellbore. The cables/energy conduits that provide power to the one or more ESPs and/or other pumps and prime movers (downhole and on surface) are inclusive. The surface components that transport the fluids and solids out of the well are included. Subsea trees, subsea DOWS equipment, platform, land-base, jack up, drillship, etc. types of equipment are inclusive. All data lines, data processing, sensors, in the well and outside of the well are inclusive. All fluid processing equipment and processes in the well and outside of the well are inclusive. All solids processing equipment and processes in the well and outside of the well are inclusive. All decision-making, monitoring, and control of process(es) including human, computer, software, logical hardware and/or software, on-rig, remotely, in the cloud, on the edge, downhole, AI-related, Deep Learning, Neural Network, Machine Learning, Fuzzy Logic, etc. may be inclusive.

Other Example Separators

In addition to hydrocyclones and helical separators, other types of separators may be used with example implementations.

For example, one or more centrifuges may be added to the system, integrated into one or more devices of the systems, and/or the concept of a centrifuge may be utilized. A key difference between a centrifuge and a hydrocyclone is that hydrocyclones may function as passive separator packages capable of applying modest amounts of centrifugal force, whereas centrifuges are dynamic separators that are generally able to apply much more centrifugal force than hydrocyclones.

In some implementations, clarifiers may be used. Clarifiers are settling tanks built with mechanical means for continuous removal of solids being deposited by sedimentation. A clarifier is generally used to remove solid particulates or suspended solids from liquid for clarification and/or thickening. In some implementations, one or more clarifiers may be positioned in one or more laterals. The laterals may provide a large area for the clarifiers to function. In some implementations, a clarifier may be located subsea. In some implementations, a clarifier may be located in a shallow well drilled into the sea floor. The clarifier may be located near the well or a distance from the well. For example, it may be beneficial for the clarifier to be located near a water injection or water disposal plant and facility located one km or more from the production well.

Various implementations of a clarifier may be used including inclined plate clarifiers which may provide a large effective settling area for a small footprint. The inlet stream is stilled upon entry into the clarifier. Solid particles begin to settle on the plates and begin to accumulate in collection hoppers at the bottom of the clarifier unit. The sludge is drawn off at the bottom of these hoppers and the clarified liquid exits the unit at the top by weir.

It should be understood that the word "solids" also implies concentrated impurities and may be known as sludge, while the particles that float to the surface of the liquid are called scum.

Conveyor belts may be used for removal and transport of accumulated solids. Scrapers may be used for removal and transport of accumulated solids. Coalescing plates may be used for removing oil droplets from flowing water and/or removing solid particles from a fluid. Baffles may be used to reduce water inlet and outlet velocities to minimize turbulence and promote effective settling throughout available tank volume. Weirs (such as overflow weirs) may be used to uniformly distribute flow from liquid leaving the tank over a wide area of the surface to minimize resuspension of settling particles.

Tube or plate settlers are commonly used in rectangular clarifiers to increase the settling capacity by reducing the vertical distance a suspended particle must travel. Tube settlers are available in many different designs such as parallel plates, chevron shaped, diamond, octagon or triangle shape, and circular shape. High efficiency tube settlers may use a stack of parallel tubes, rectangles or flat corrugated plates separated by a few inches (several centimeters) and sloping upwards in the direction of flow. This structure creates a large number of narrow parallel flow pathways encouraging uniform laminar flow as modeled by Stokes' law. These structures may work in two ways. First, they provide an exceptionally large surface area onto which particles may fall and become stabilized. Second, because flow is temporarily accelerated between the plates and then immediately slows down, this helps to aggregate very fine particles that can settle as the flow exits the plates.

Structures inclined between approximately 45° and 60° may allow gravity drainage of accumulated solids, but shallower angles of inclination may typically require periodic draining and cleaning. Tube settlers may allow the use of a smaller clarifier and may enable finer particles to be separated with residence times less than 10 minutes. Typically, such structures are used for difficult-to-treat waters, especially those containing colloidal materials.

Tube settlers may capture the fine particles allowing the larger particles to travel to the bottom of the clarifier in a more uniform way. The fine particles then build up into a larger mass which then slides down the tube channels. The reduction in solids present in the outflow allows a reduction in the clarifier footprint when designing. Tubes made of PVC plastic may be a minor cost in clarifier design improvements and may lead to an increase of operating rate, such as up to 2 to 4 times.

Another advantage of separating solids upstream (further downhole) is to prevent erosional wear on other DOWS-related equipment (other separators, pumps (ESP, PCP, etc.).

Example Lithium and Other Metal Recovery Operations

Example implementations may also be used in other operations requiring the separation of fluids, solids, gases, minerals, metals, etc. In particular any operations where the work is in an uninhabitable environment and/or remote location where separation, transportation, disposal and/or processing of one or more materials is required.

For example, example implementations may be used in lithium solution mining, borate mining, etc. For example, after dissolving an ore, a saturated borate solution may be pumped into a large settling tank. Borates float on top of the liquor while rock and clay settle to the bottom.

The separation of abrasive particles may accelerate abrasion in cyclones and other separator equipment. For example, the coarse discharge of a hydrocyclone typically will experience more rapid wear than other parts of the cyclone. The use of certain materials (stainless steel, ceramics, tungsten carbide, etc.) may reduce corrosive reactions from occurring.

One or more computers, such as computer 270, and sensors may monitor, control, diagnose, maintain, and repair, etc., the subsea components, subsea systems, junctions (e.g., Level 4, Level 5, etc.) injectors, hydrocyclones, separators, components, devices, systems shown in FIGS. 4-23 in order to prevent premature failure(s) and increase efficiencies as described within.

Example Implementations

Implementation #1: An apparatus comprising: one or more solids separators to be positioned downhole in a well formed in a subsurface formation, wherein each of the one or more solids separators are configured to receive a fluid from the subsurface formation and separate out sediment from the fluid, wherein the sediment is transported after separation to a destination location.

Implementation #2: The apparatus of Implementation #1, wherein the one or more solids separators are configured to generate a centrifugal movement in the fluid to separate out sediment from the fluid.

Implementation #3: The apparatus of any one of Implementations #1-2, wherein the one or more solids separators are configured to separate out sediment from the fluid via gravity.

Implementation #4: The apparatus of any one of Implementations #1-3, wherein the one or more solids separators are positioned in a downhole oil-water separation system in the well, and wherein the one or more solids separators are positioned to tangentially receive the fluid from the downhole oil-water separation system.

Implementation #5: The apparatus of any one of Implementations #1-4, wherein the one or more solids separators are retrievable from the downhole oil-water separation system, wherein the downhole oil-water separation system remains in position in the well when the one or more solids separators or components of the downhole oil-water separation system are retrieved.

Implementation #6: The apparatus of any one of Implementations #1-5, wherein retrieving the one or more solids separators include retrieval via wireline, jointed tubing, and coiled tubing.

Implementation #7: The apparatus of any one of Implementations #1-6 further comprising: one or more solids accumulators configured to temporarily store the sediment discharged from the one or more solids separators.

Implementation #8: The apparatus of any one of Implementations #1-7 further comprising: one or more solids movers positioned in the respective solids accumulators and configured to transport the sediment to the destination location, wherein the one or more solids movers includes an auger or a jetting device.

Implementation #9: The apparatus of any one of Implementations #1-8, wherein the one or more solids accumulators are retrievable from a downhole oil-water separation system while the downhole oil-water separation system remains in position, and wherein the one or more solids movers are retrievable from a downhole oil-water separation system while the downhole oil-water separation system remains in position.

Implementation #10: The apparatus of any one of Implementations #1-9, comprising one or more sensors affixed to one or more solids mover, one or more solids accumulators and or one or more downhole oil-water separation system.

Implementation #11: The apparatus of any one of Implementations #1-10, comprising one or more computer to sense a one or more parameter of the one or more solids mover, and/or one or more solids accumulators or a component thereof, and perform one or more of monitoring, testing, controlling, troubleshooting, adjusting, diagnosing, analyzing, repairing, and/or maintaining a downhole separation system or component thereof.

Implementation #12: The apparatus of any one of Implementations #1-11, wherein a computer may comprise at least an instruction from an Artificial Intelligence processor, an Artificial Intelligence algorithm, a Machine Learning processor, and/or a Machine Learning algorithm.

Implementation #13: The apparatus of any one of Implementations #1-12, wherein the destination location includes surface of the well or another downhole location in the well.

Implementation #14: The apparatus of any one of Implementations #1-13, wherein the one or more solids separators include a hydrocyclone, a helical separator, or any combination thereof.

Implementation #15: The apparatus of any one of Implementations #1-14, wherein the one or more solids separators are oriented with respect to gravity.

Implementation #16: The apparatus of any one of Implementations #1-15, wherein the one or more solids separators are positioned in series or in parallel.

Implementation #17: The apparatus of any one of Implementations #1-16 further comprising: a first solids separator configured to separate first sediment from of the fluid; and a second solids separator positioned downstream of the first solids separator and configured to separate second sediment from the fluid discharged from the first solids separator, wherein the first sediment is larger than the second sediment.

Implementation #18: The apparatus of any one of Implementations #1-17 further comprising: a backpressure device positioned proximate an apex and configured to manage pressure in a respective solids separator.

Implementation #19: The apparatus of any one of Implementations #1-18, wherein the fluid includes a formation fluid, a production fluid, a nonproduction fluid, or any combination thereof.

Implementation #20: A system comprising: a downhole oil-water separation system to be positioned in a well formed in a subsurface formation, wherein the downhole oil-water separation system is configured to receive a fluid from the subsurface formation; and one or more solids separators to be positioned in the downhole oil-water separation system, wherein the one or more solids separators are configured to separate out sediment from the fluid.

Implementation #21: The system of Implementation #20, wherein the downhole oil-water separation system is configured to separate the fluid into a production fluid and a nonproduction fluid, and wherein the one or more solids separators are configured to receive the nonproduction fluid from the downhole oil-water separation system, and wherein the one or more solids separators are configured to separate sediment from the nonproduction fluid.

Implementation #22: The system of any one of Implementations #20-21, wherein the downhole oil-water separation system is configured to separate the fluid into a production fluid and a nonproduction fluid, and wherein the one or more solids separators are configured to receive the production fluid from the downhole oil-water separation system, and wherein the one or more solids separators are configured to separate sediment from the production fluid.

Implementation #23: The system of any one of Implementations #20-22, wherein the one or more solids separators are configured to separate the fluid into a production fluid and a nonproduction fluid.

Implementation #24: The system of any one of Implementations #20-23, wherein a discharge fluid of the one or more solids separators is recirculated into the one or more solids separators to maintain a tangential fluid velocity in the one or more solids separators.

Implementation #25: The system of any one of Implementations #20-24, wherein the sediment is transported after separation to a destination location, wherein the destination location includes surface of the well, another downhole location in the well, or a subsea well.

Implementation #26: The system of any one of Implementations #20-25, wherein the well comprises a multi-bore well, wherein the fluid is to be received from the subsurface formation surrounding a first bore of the multi-bore well.

Implementation #27: The system of any one of Implementations #20-26, wherein transportation of the sediment to a destination location includes circulating to surface, injection into the subsurface formation surrounding a second bore of the multi-bore well, or any combination thereof.

Implementation #28: The system of any one of Implementations #20-27, wherein a nonproduction fluid is injected into the subsurface formation surrounding a third bore of the multi-bore well.

Implementation #29: The system of any one of Implementations #20-28, wherein a computer may sense a one or more parameter of the downhole oil-water separation system, a one or more solids separators, a one or more separators configured to separate a fluid into a production fluid and a nonproduction fluid or a component thereof, and/or a production fluid, a nonproduction fluid, a sediment, a discharge fluid of the one or more solids separators, a sediment that is transported after separation, a multi-bore well fluid received from the subsurface formation, a multi-bore well fluid to be injected into a subsurface formation and perform one or more of monitoring, testing, controlling, troubleshooting, adjusting, diagnosing, analyzing, repairing, and/or maintaining operation on a one or more downhole separation system or component thereof.

Implementation #30: The system of any one of Implementations #20-29, wherein a computer may comprise at least an instruction from an Artificial Intelligence processor, an Artificial Intelligence algorithm, a Machine Learning processor, and/or a Machine Learning algorithm.

Implementation #31: A method comprising: performing a downhole separation of at least one of fluids or solids downhole in a well that is formed in a subsurface formation, the performing comprising, introducing a formation fluid from the subsurface formation into the well, separating the formation fluid into a production fluid and a nonproduction fluid via a downhole oil-water separation system positioned in the well, separating sediment from the nonproduction fluid via one or more solids separators positioned in the downhole oil-water separation system, and transporting the sediment to a destination location.

Implementation #32: The method of Implementation #31 further comprising: temporarily storing the sediment discharged from the one or more solids separators in one or more solids accumulators; removing the sediment from the one or more solids separators, via one more solids movers, to transport the sediment to the destination location.

Implementation #33: The method of any one of Implementations #31-32, wherein the transporting of the sediment to the destination location includes circulating to surface, injection into the subsurface formation surrounding a bore of a multi-bore well, or any combination thereof.

Implementation #34: The method of any one of Implementations #31-33 further comprising: adding the sediment to a flow channel configured to deliver the production fluid to surface.

Implementation #35: The method of any one of Implementations #31-34, wherein the nonproduction fluid is transported to a location downhole in the well after the sediment is removed.

Implementation #36: The method of any one of Implementations #31-35, wherein the nonproduction fluid is transported to surface, and wherein the nonproduction fluid is disposed from the surface into a location beneath the surface, and separate from the well, for storage.

Implementation #37: The method of any one of Implementations #31-36 further comprising; transporting the nonproduction fluid to surface for testing via a flow channel, wherein a flow control device is configured to control flow of the nonproduction fluid into the flow channel.

Implementation #38: The method of any one of Implementations #31-37, wherein the production fluid is transported to surface, and wherein the nonproduction fluid is disposed from the surface into a location beneath the surface, and separate from the well, for storage.

Implementation #39: The method of any one of Implementations #31-38, wherein a computer may sense a one or more parameter of the one or more flow channels, sediment injector, fluid separator, formation fluid, nonproduction fluid, production fluid, or a component thereof, and perform one or more of monitoring, testing, controlling, troubleshooting, adjusting, diagnosing, analyzing, repairing, and/or maintaining a downhole separation system or component thereof.

Implementation #40: The method of any one of Implementations #31-39, wherein a computer may comprise at least an instruction from an Artificial Intelligence processor, an Artificial Intelligence algorithm, a Machine Learning processor, and/or a Machine Learning algorithm.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. An apparatus comprising:
one or more solids separators positioned in a downhole oil-water separation system in a well formed in a subsurface formation, wherein the downhole oil-water separation system is configured to receive a fluid from the subsurface formation, and wherein each of the one or more solids separators are configured to separate out sediment from the fluid, and wherein the sediment is transported after separation to a destination location, and wherein the downhole oil-water separation system is configured to remain in position in the well when the one or more solids separators are retrieved.

2. The apparatus of claim 1, wherein the one or more solids separators are configured to generate a centrifugal movement in the fluid to separate out the sediment from the fluid.

3. The apparatus of claim 1, wherein the one or more solids separators are configured to separate out the sediment from the fluid via gravity.

4. The apparatus of claim 1, wherein the one or more solids separators are positioned in the downhole oil-water separation system in the well, and wherein the one or more solids separators are positioned to tangentially receive the fluid from the downhole oil-water separation system.

5. The apparatus of claim 4, wherein the downhole oil-water separation system remains in position in the well when the one or more solids separators or components of the downhole oil-water separation system are retrieved.

6. The apparatus of claim 5, wherein retrieving the one or more solids separators include retrieval via wireline, jointed tubing, and coiled tubing.

7. The apparatus of claim 1 further comprising:
one or more solids accumulators configured to temporarily store the sediment discharged from the one or more solids separators.

8. The apparatus of claim 7 further comprising:

one or more solids movers positioned in the respective solids accumulators and configured to transport the sediment to the destination location, wherein the one or more solids movers includes an auger or a jetting device.

9. The apparatus of claim 8, wherein the one or more solids accumulators are retrievable from the downhole oil-water separation system while the downhole oil-water separation system remains in position, and wherein the one or more solids movers are retrievable from the downhole oil-water separation system while the downhole oil-water separation system remains in position.

10. The apparatus of claim 9, comprising one or more sensors affixed to the one or more solids movers, the one or more solids accumulators and/or the downhole oil-water separation system.

11. The apparatus of claim 10, comprising one or more computers to sense one or more parameter of the one or more solids mover, and/or the one or more solids accumulators or a component thereof, and perform one or more of monitoring, testing, controlling, troubleshooting, adjusting, diagnosing, analyzing, repairing, and/or maintaining the downhole oil-water separation system or component thereof.

12. The apparatus of claim 11, wherein the one or more computers comprise at least an instruction from an Artificial Intelligence processor, an Artificial Intelligence algorithm, a Machine Learning processor, and/or a Machine Learning algorithm.

13. The apparatus of claim 1, wherein the destination location includes surface of the well or another downhole location in the well.

14. The apparatus of claim 1, wherein the one or more solids separators include a hydrocyclone, a helical separator, or any combination thereof.

15. The apparatus of claim 1, wherein the one or more solids separators are oriented with respect to gravity.

16. The apparatus of claim 1, wherein the one or more solids separators are positioned in series or in parallel.

17. The apparatus of claim 1 further comprising:

a first solids separator configured to separate first sediment from the fluid; and a second solids separator positioned downstream of the first solids separator and configured to separate second sediment from the fluid discharged from the first solids separator, wherein the first sediment is larger than the second sediment.

18. The apparatus of claim 1 further comprising:

a backpressure device positioned proximate an apex and configured to manage pressure in a respective one of the one or more solids separators.

19. The apparatus of claim 1, wherein the fluid includes a formation fluid, a production fluid, a nonproduction fluid, or any combination thereof.

20. A system comprising:

a downhole oil-water separation system to be positioned in a well formed in a subsurface formation, wherein the downhole oil-water separation system is configured to receive a fluid from the subsurface formation; and one or more solids separators to be positioned in the downhole oil-water separation system, wherein the one or more solids separators are configured to separate out sediment from the fluid, and wherein the downhole oil-water separation system is configured to remain in position in the well when the one or more solids separators are retrieved.

21. The system of claim 20, wherein the downhole oil-water separation system is configured to separate the fluid into a production fluid and a nonproduction fluid, and wherein the one or more solids separators are configured to receive the nonproduction fluid from the downhole oil-water separation system, and wherein the one or more solids separators are configured to separate the sediment from the nonproduction fluid.

22. The system of claim 20, wherein the downhole oil-water separation system is configured to separate the fluid into a production fluid and a nonproduction fluid, and wherein the one or more solids separators are configured to receive the production fluid from the downhole oil-water separation system, and wherein the one or more solids separators are configured to separate the sediment from the production fluid.

23. The system of claim 20, wherein the one or more solids separators are configured to separate the fluid into a production fluid and a nonproduction fluid.

24. The system of claim 20, wherein a discharge fluid of the one or more solids separators is recirculated into the one or more solids separators to maintain a tangential fluid velocity in the one or more solids separators.

25. The system of claim 20, wherein the sediment is transported after separation to a destination location, wherein the destination location includes surface of the well, another downhole location in the well, or a subsea well.

26. The system of claim 20, wherein the well comprises a multi-bore well, wherein the fluid is to be received from the subsurface formation surrounding a first bore of the multi-bore well.

27. The system of claim 26, wherein transportation of the sediment to a destination location includes circulating to surface, injection into the subsurface formation surrounding a second bore of the multi-bore well, or any combination thereof.

28. The system of claim 26, wherein a nonproduction fluid is injected into the subsurface formation surrounding a third bore of the multi-bore well.

29. The system of claim 28, wherein a computer is configured to sense a one or more parameter of the downhole oil-water separation system, the one or more solids separators, the downhole oil-water separation system to separate the fluid into a production fluid and a nonproduction fluid or a component thereof, and/or the production fluid, the nonproduction fluid, the sediment, a discharge fluid of the one or more solids separators, the sediment that is transported after separation, a multi-bore well fluid received from the subsurface formation, a multi-bore well fluid to be injected into the subsurface formation and, perform one or more of monitoring, testing, controlling, troubleshooting, adjusting, diagnosing, analyzing, repairing, and/or maintaining operation on a one or more downhole separation system or component thereof.

30. The system of claim 29, wherein the computer comprise at least an instruction from an Artificial Intelligence processor, an Artificial Intelligence algorithm, a Machine Learning processor, and/or a Machine Learning algorithm.

31. A method comprising:

performing a downhole separation of at least one of fluids or solids downhole in a well that is formed in a subsurface formation, the performing comprising, introducing a formation fluid from the subsurface formation into the well, separating the formation fluid into a production fluid and a nonproduction fluid via a downhole oil-water separation system positioned in the well and configured to receive the formation fluid, separating sediment from the nonproduction fluid via one or more solids separators positioned in the downhole oil-water separation system, wherein the sediment discharged from the one or more solids separators is temporarily stored in one or more solids accumulators while the downhole oil-water separation system receives the formation fluid, and transporting the sediment to a destination location.

32. The method of claim 31 further comprising:

removing the sediment from the one or more solids separators, via one more solids movers, to transport the sediment to the destination location.

33. The method of claim 31, wherein the transporting of the sediment to the destination location includes circulating to surface, injection into the subsurface formation surrounding a bore of a multi-bore well, or any combination thereof.

34. The method of claim 31 further comprising:

adding the sediment to a flow channel configured to deliver the production fluid to surface.

35. The method of claim 31, wherein the nonproduction fluid is transported to a location downhole in the well after the sediment is removed.

36. The method of claim 31, wherein the nonproduction fluid is transported to surface, and wherein the nonproduction fluid is disposed from the surface into a location beneath the surface, and separate from the well, for storage.

37. The method of claim 36 further comprising;

transporting the nonproduction fluid to the surface for testing via a flow channel, wherein a flow control device is configured to control flow of the nonproduction fluid into the flow channel.

38. The method of claim 31, wherein the production fluid is transported to surface, and wherein the nonproduction fluid is disposed from the surface into a location beneath the surface, and separate from the well, for storage.

39. The method of claim 38, wherein a computer is configured to sense a one or more parameter of one or more flow channels, sediment injector, fluid separator, the formation fluid, the nonproduction fluid, the production fluid, or a component thereof, and perform one or more of monitoring, testing, controlling, troubleshooting, adjusting, diagnosing, analyzing, repairing, and/or maintaining a downhole separation system or component thereof.

40. The method of claim 39, wherein the computer comprise at least an instruction from an Artificial Intelligence processor, an Artificial Intelligence algorithm, a Machine Learning processor, and/or a Machine Learning algorithm.

* * * * *